(12) United States Patent
Lo et al.

(10) Patent No.: US 12,284,077 B2
(45) Date of Patent: Apr. 22, 2025

(54) METHOD AND APPARATUS FOR REFERENCE SYMBOL PATTERN ADAPTATION

(71) Applicant: Samsung Electronics Co., Ltd., Suwon-si (KR)

(72) Inventors: Caleb K. Lo, San Jose, CA (US); Jeongho Jeon, San Jose, CA (US); Gilwon Lee, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 18/159,660

(22) Filed: Jan. 25, 2023

(65) Prior Publication Data
US 2023/0308349 A1    Sep. 28, 2023

Related U.S. Application Data

(60) Provisional application No. 63/327,688, filed on Apr. 5, 2022, provisional application No. 63/324,895, filed on Mar. 29, 2022, provisional application No. 63/323,823, filed on Mar. 25, 2022, provisional application No. 63/322,764, filed on Mar. 23, 2022.

(51) Int. Cl.
*H04L 41/0816* (2022.01)
*H04B 7/06* (2006.01)
*H04L 41/08* (2022.01)
*H04L 41/16* (2022.01)

(52) U.S. Cl.
CPC ....... *H04L 41/0816* (2013.01); *H04B 7/0686* (2013.01); *H04L 41/0886* (2013.01); *H04L 41/16* (2013.01)

(58) Field of Classification Search
CPC .................................................. H04B 7/0686
See application file for complete search history.

(56) References Cited

U.S. PATENT DOCUMENTS

| | | |
|---|---|---|
| 2021/0064996 A1 | 3/2021 | Wang et al. |
| 2021/0160149 A1 | 5/2021 | Ma et al. |

(Continued)

FOREIGN PATENT DOCUMENTS

| | | |
|---|---|---|
| WO | 2021112360 A1 | 6/2021 |
| WO | 2021256584 A1 | 12/2021 |

OTHER PUBLICATIONS

Barraza, J., et al., "Towards Interpretable Deep Learning: A Feature Selection Framework for Prognostics and Health Management Using Deep Neural Networks", Sensors 2021, vol. 21, No. 17, Sep. 1, 2021, 30 pages.

(Continued)

*Primary Examiner* — Samina F Choudhry

(57) ABSTRACT

Machine learning (ML) adaptation of any one of reference signal (RS) temporal density, RS frequency density, RS spatial density, or number of transmission/reception points (TRPs) that transmit RS provides configuration of lower RS densities or fewer TRPs that transmit RS without significant loss of throughput in appropriate circumstances. Determinations to switch from high density transmission to low density transmission, to reduce the number of antenna ports or TRPs that transmit RS, or to fallback to high density transmission may be made by the ML model, optionally with UE assistance information.

20 Claims, 41 Drawing Sheets

(56) References Cited

U.S. PATENT DOCUMENTS

| | | | |
|---|---|---|---|
| 2021/0409087 A1* | 12/2021 | Horn | H04B 7/0617 |
| 2022/0029688 A1* | 1/2022 | Pezeshki | H04B 7/0695 |
| 2022/0393781 A1 | 12/2022 | Kim et al. | |
| 2023/0231653 A1 | 7/2023 | Shin et al. | |

OTHER PUBLICATIONS

Zhou, Y., et al., "Incorporating side-channel information into convolutional neural networks for robotic tasks", 2017 IEEE International Conference on Robotics and Automation (ICRA), May 29, 2017, 7 pages.

"tf.keras.layers.ConvLSTM2D", TensorFlow, API, TensorFlow v2.10.1, Python, Oct. 25, 2022, 6 pages. https://www.tensorflow.org/api_docs/python/tf/keras/layers/ConvLSTM2D.

Ballas, N., et al., "Delving deeper into convolutional networks for learning video representations", Published as a conference paper at ICLR 2016, arXiv:1511.06432v4 [cs.CV], Mar. 1, 2016, 11 pages.

"5G; NR; Physical channels and modulation (3GPP TS 38.211 version 15.10.0 Release 15)", ETSI TS 138 211 V15.10.0, Jan. 2022, 101 pages.

"5G; NR; Physical channels and modulation (3GPP TS 38.211 version 16.8.0 Release 16)", ETSI TS 138 211 V16.8.0, Jan. 2022, 138 pages.

"3rd Generation Partnership Project; Technical Specification Group Radio Access Network; NR; Physical channels and modulation (Release 17)", 3GPP TS 38.211 V17.0.0, Dec. 2021, 134 pages.

"5G; NR; Physical layer procedures for data (3GPP TS 38.214 version 15.15.0 Release 15)", ETSI TS 138 214 V15.15.0, Jan. 2022, 110 pages.

"5G; NR; Physical layer procedures for data (3GPP TS 38.214 version 16.8.0 Release 16)", ETSI TS 138 214 V16.8.0, Jan. 2022, 177 pages.

"3rd Generation Partnership Project; Technical Specification Group Radio Access Network; NR; Physical layer procedures for data (Release 17)", 3GPP TS 38.214 V17.0.0, Dec. 2021, 217 pages.

"5G; Nr; Medium Access Control (MAC) protocol specification (3GPP TS 38.321 version 15.11.0 Release 15)", ETSI TS 138 321 V15.11.0, Jan. 2021, 81 pages.

"5G; NR; Medium Access Control (MAC) protocol specification (3GPP TS 38.321 version 16.7.0 Release 16)", ETSI TS 138 321 V16.7.0, Jan. 2022, 160 pages.

"5G; NR; Radio Resource Control (RRC); Protocol specification (3GPP TS 38.331 version 15.16.0 Release 15)", ETSI TS 138 331 V15.16.0, Jan. 2022, 537 pages.

"5G; NR; Radio Resource Control (RRC); Protocol specification (3GPP TS 38.331 version 16.7.0 Release 16)", ETSI TS 138 331 V16.7.0, Jan. 2022, 950 pages.

International Search Report and Written Opinion issued Jun. 7, 2023 regarding International Application No. PCT/KR2023/003848, 6 pages.

"3rd Generation Partnership Project; Technical Specification Group Services and System Aspects; Management and orchestration; Artificial Intelligence / Machine Learning (AI/ML) management (Release 17)", 3GPP TS 28.105 V1.0.0, Mar. 2022, 17 pages.

* cited by examiner

METHOD AND APPARATUS FOR REFERENCE SYMBOL PATTERN ADAPTATION

CROSS-REFERENCE TO RELATED APPLICATION AND CLAIM OF PRIORITY

This application claims priority under 35 U.S.C. § 119(e) to U.S. Provisional Patent Application No. 63/322,764 filed Mar. 23, 2022, U.S. Provisional Patent Application No. 63/323,823 filed Mar. 25, 2022, U.S. Provisional Patent Application No. 63/324,895 filed Mar. 29, 2022, and U.S. Provisional Patent Application No. 63/327,688 filed Apr. 5, 2022. The content of the above-identified patent document(s) is incorporated herein by reference.

TECHNICAL FIELD

The present disclosure relates generally to application of machine learning models to selection of reference signal transmission pattern(s), and more specifically to reducing bandwidth usage for reference signal transmission when possible.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

SUMMARY

Machine learning (ML) adaptation of any one of reference signal (RS) temporal density, RS frequency density, RS spatial density, or number of transmission/reception points (TRPs) that transmit RS provides configuration of lower RS densities or fewer TRPs without significant loss of throughput in appropriate circumstances. Determinations to switch from high-density transmission to low-density transmission, to reduce the number of antenna ports or TRPs that transmit RS, or to fallback to high-density transmission may be made by the ML model, optionally with UE assistance information.

In a first embodiment, a method includes information indicating capability of a UE to support machine learning (ML) adaptation of reference signal (RS) density in a domain. The method also includes receiving a first configuration information from the BS, the first configuration information indicating one or more of enabling or disabling of ML adaptation of the RS density in the domain, an ML model used for adaptation of the RS density in the domain, updated model parameters for the ML model, or whether model parameters received from the UE will be used for ML adaptation of the RS density in the domain. The method further includes receiving a second configuration information from the BS, the second configuration information indicating a first RS density in the domain, receiving an RS with the first density in the domain, and transmitting, to the BS, assistance information. In response to transmitting the assistance information, the method includes receiving, from the BS, a third configuration information indicating a second RS density in the domain, wherein the first RS density in the domain is larger than the second RS density in the domain. Finally, the method includes receiving an RS with the second RS density in the domain.

In a second embodiment, a user equipment (UE) includes a processor and a transceiver operably coupled to the processor. The transceiver is configured to transmit, to a base station (BS), information indicating capability of a UE to support machine learning (ML) adaptation of reference signal (RS) density in a domain. The transceiver is further configured to receive a first configuration information from the BS, the first configuration information indicating one or more of enabling or disabling of ML adaptation of the RS density in the domain, an ML model used for adaptation of the RS density in the domain, updated model parameters for the ML model, or whether model parameters received from the UE will be used for ML adaptation of the RS density in the domain. The transceiver is further configured to receive a second configuration information from the BS, the second configuration information indicating a first RS density in the domain, receive an RS with the first RS density in the domain, and transmit, to the BS, assistance information. In response to transmitting the assistance information, the transceiver is configured to receive, from the BS, a third configuration information indicating a second RS density in the domain, wherein the first RS density in the domain is larger than the second RS density in the domain. The transceiver is also configured to receive an RS with the second RS density in the domain.

In a third embodiment, a base station (BS) includes a processor and a transceiver operably coupled to the processor. The transceiver is configured to receive, from a user equipment (UE), information indicating capability of a UE to support machine learning (ML) adaptation of reference signal (RS) density in a domain. The transceiver is further configured to transmit a first configuration information to the UE, the first configuration information indicating one or more of enabling or disabling of ML adaptation of the RS density in the domain, an ML model used for adaptation of the RS density in the domain, updated model parameters for the ML model, or whether model parameters received from the UE will be used for ML adaptation of the RS density in the domain. The transceiver is further configured to transmit a second configuration information to the UE, the second configuration information indicating a first RS density in the domain, transmit an RS with the first RS density in the domain, and receive, from the UE, assistance information. In response to receiving the assistance information, the transceiver is configured to transmit, to the UE, a third configuration information indicating a second RS density in the domain, wherein the first RS density in the domain is larger than the second RS density in the domain. The transceiver is also configured to transmit an RS with the second RS density in the domain.

In any of the preceding embodiments, the domain may be one of a time domain, a frequency domain, or a spatial domain.

In any of the preceding embodiments, a fallback request transmitted to the BS may indicate an RS density in the domain, a fourth configuration transmitted by the BS may indicate a third RS density in the domain, and an RS may then be received with the third RS density in the domain.

In the preceding embodiment, the third RS density in the domain may be larger than the second RS density in the domain.

In any of the preceding embodiments, a received information element may indicate one of an RS frequency or time density value for consecutive resources or a number of resources mapped to antenna ports configured for the RS, and the RS may then be received in the resources by switching between the first RS density in the domain and the second RS density in the domain, based on the information element.

In any of the preceding embodiments, the assistance information may comprise one or more of block error rate, UE speed, UE acceleration, or recommended RS density in the domain.

In any of the preceding embodiments, a configuration disabling the RS density in the domain may be received from the BS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
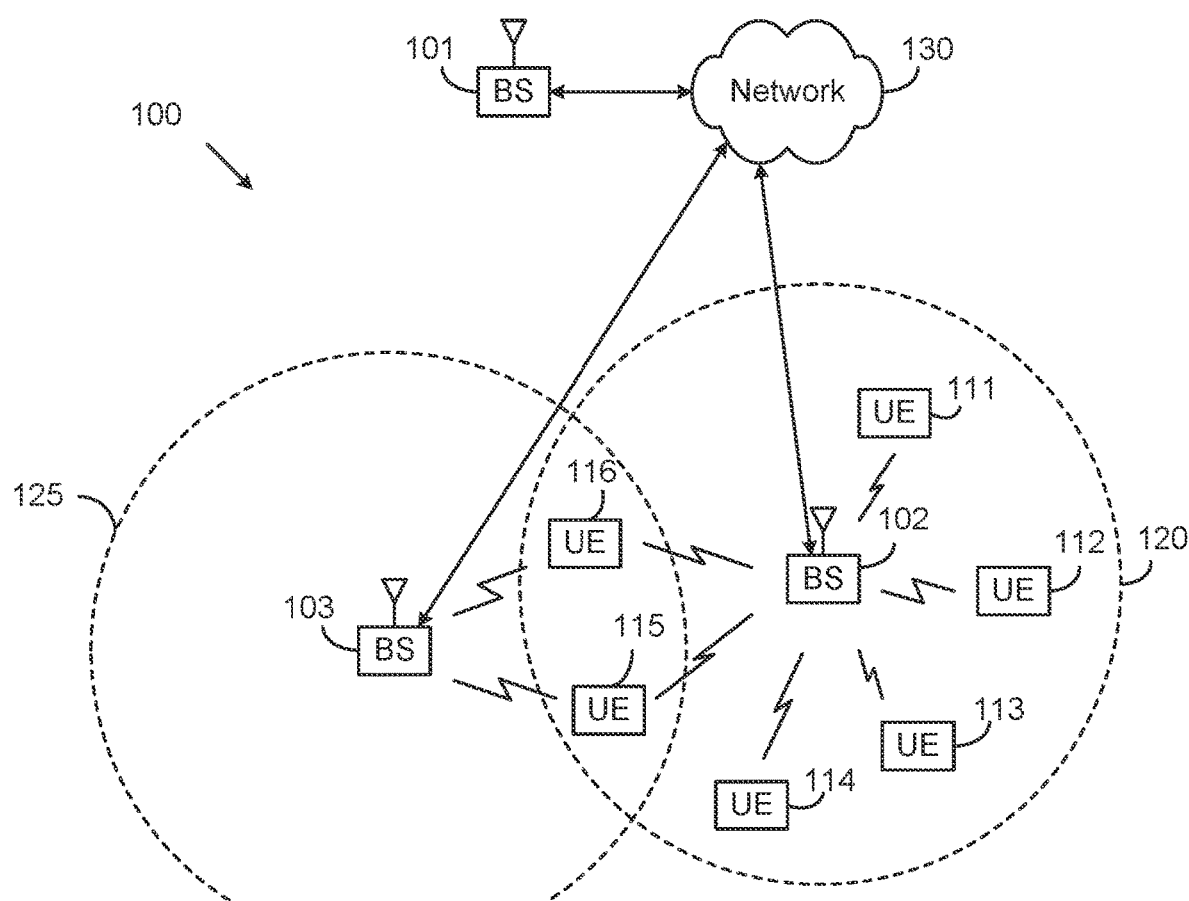
FIG. 1 illustrates an exemplary networked system utilizing reference signal temporal density configuration according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES:
[1] 3GPP, TS 38.211, 5G; NR; Physical channels and modulation
[2] 3GPP, TS 38.331, 5G; NR; Radio Resource Control (RRC); Protocol specification
[3] 3GPP, TS 38.321, 5G; NR; Medium Access Control (MAC); Protocol specification
[4] https://www.tensorflow.org/api_docs/python/tf/keras/layers/ConvLSTM2D
[5] N. Ballas, L. Yao, C. Pal, and A. Courville, "Delving deeper into convolutional networks for learning video representations," https://arxiv.org/pdf/1511.06432.pdf
[6] Y. Zhou and K. Hauser, "Incorporating side-channel information into convolutional neural networks for robotic tasks," http://motion.pratt.duke.edu/sidechannel/pdf/icra2017incorporating.pdf
[7] 3GPP, TS 38.214, 5G; NR; Physical layer procedures for data
[8] J. Figueroa Barraza, E. López Droguett, and M. R. Martins, "Towards interpretable deep learning: A feature selection framework for prognostics and health management using deep neural networks", Sensors, vol. 21, no. 17, pp. 5888.

The above-identified references are incorporated herein by reference.

Abbreviations:
3GPP 3rd Generation Partnership Project
4G Fourth Generation
5G Fifth Generation
AI Artificial Intelligence
BS Base Station
BWP Bandwidth part
C-RNTI Cell-Radio Network Temporary Identifier
CDM Code Division Multiplexing
CE Control Element
CNN Convolutional Neural Network
CORESET Control Resource Set
CRNN Convolutional Recurrent Neural Network
CSI Channel State Information
CQI Channel Quality Indicator
DCI Downlink Control Information
DL Downlink
DMRS Demodulation Reference Signal
gNB gNodeB (BS)
GRU Gated Recurrent Unit
LSTM Long Short Term Memory
MAC Medium Access Control
ML Machine Learning
NC-JT Non-Coherent Joint Transmission
NR New Radio
OFDM Orthogonal Frequency Division Multiplexing
PDSCH Physical Downlink Shared Channel
PMI Precoding Matrix Indicator
PUCCH Physical Uplink Control Channel
PUSCH Physical Uplink Shared Channel
QCL Quasi Co-Located
RE Resource Element
RRC Radio Resource Control
RS Reference Signal
SB Subband
SRS Sounding Reference Signal
TCI Transmission Configuration Indication
TRP Transmission/Reception Point
UE User Equipment
UL Uplink In 5G NR, several types of RSs have been defined. For example, CSI-RS is used for DL communication between a gNB and a UE, where the UE uses received CSI-RS to measure DL CSI and report those measurements to the gNB. Also, DMRS is used by a receiver (either for DL or UL communications) to estimate CSI; this estimate is used to demodulate received data.

A time-frequency mapping function is applied to RSs such as CSI-RS and DMRS before they are transmitted, yielding a particular RS pattern. The RS pattern depends on parameters such as transmit antenna port, CDM type, and whether or not frequency hopping is enabled.

It may be advantageous to vary the temporal density of the RS pattern based on the statistics of an underlying randomly-varying wireless channel. For example, if the channel selectivity in time decreases, then decreasing the temporal density of the RS pattern could have a negligible effect on the CSI estimation error—while reducing the signaling overhead. As another example, if the channel is static, then RS signaling can be (at least temporarily) disabled, assuming that the receiver maintains the current channel state in its memory.

5G NR supports flexibility in the selection of an RS pattern, where the selection of an RS pattern is based on the statistics of the underlying randomly-varying wireless channel. For example, the parameter dmrs-AdditionalPosition can be used to increase the number of DMRS in a given slot in high-mobility scenarios. As another example, the parameters periodicityAndOffset-p and periodicityAndOffset-sp can be used to vary the periodicity (and slot offset) of SRS. The details of the algorithm for selecting an RS pattern are typically left to the network.

The present disclosure describes a framework for supporting AI/ML techniques for RS temporal density adaptation based on the statistics of the underlying randomly-varying wireless channel. The corresponding signaling details are discussed in this disclosure. This disclosure addresses the issue that RS temporal density adaptation is currently left up to network implementation.

The disclosure provides methods that the network can use to configure the temporal density of an RS pattern using AI/ML-based solutions. This disclosure also provides a framework for adapting the temporal density of an RS pattern based on UE inference and information. Details on the support of AI/ML techniques for RS temporal density adaptation are disclosed, including information elements to be exchanged between a transmitter and a receiver.

Figure 2:
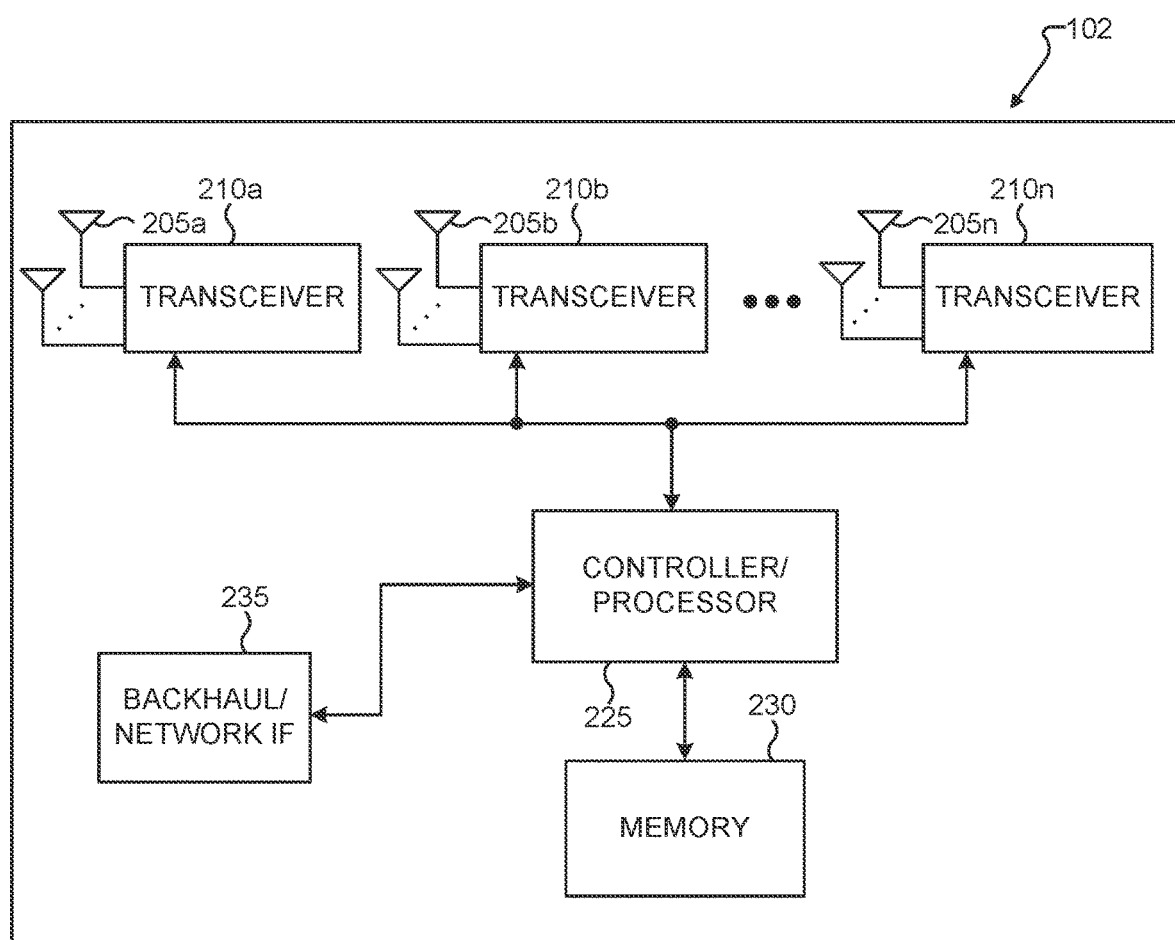
FIG. 2 illustrates an exemplary base station (BS) utilizing reference signal temporal density configuration according to various embodiments of this disclosure.
Figure 3:
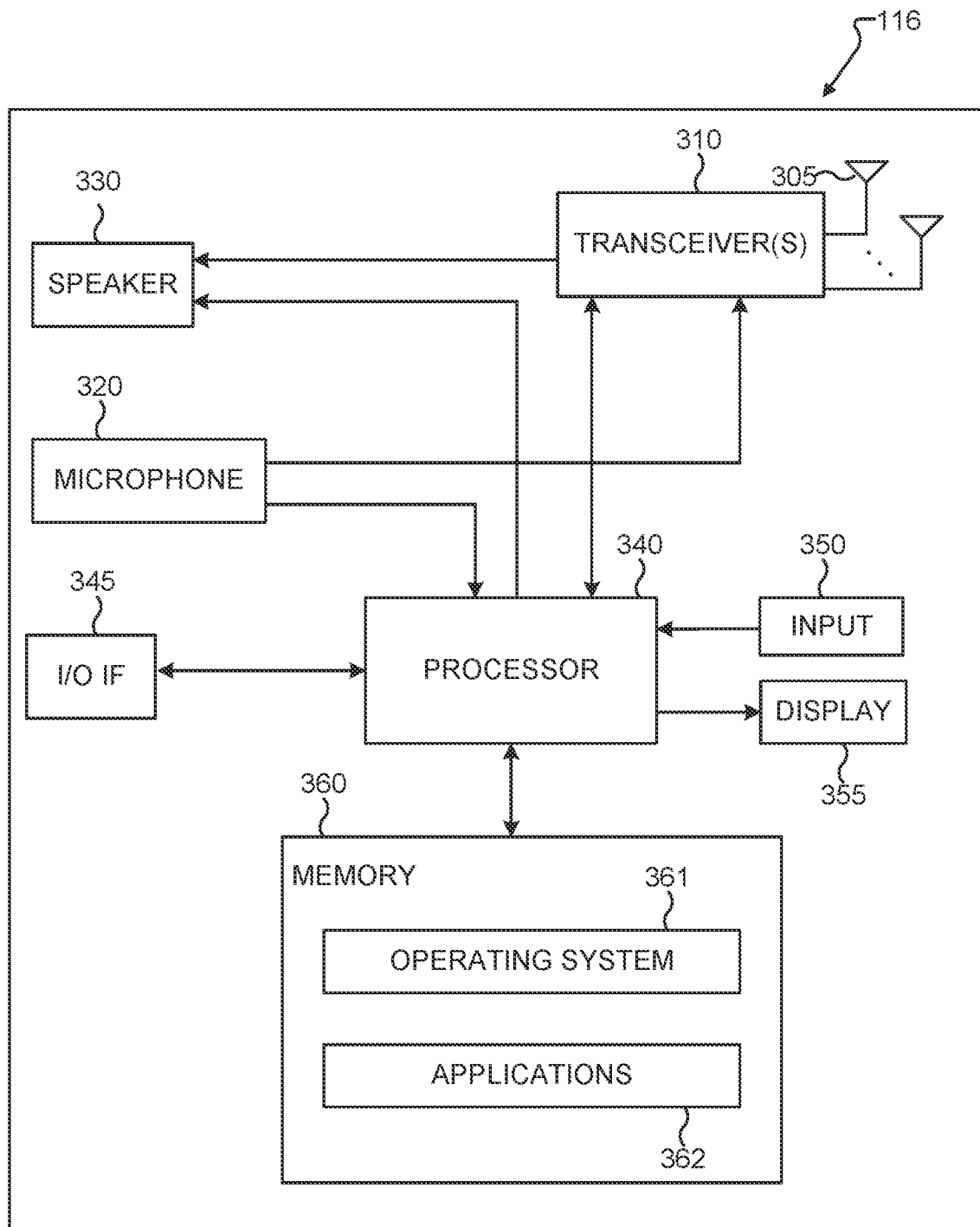
FIG. 3 illustrates an exemplary electronic device for communicating in the networked computing system utilizing reference signal temporal density configuration according to various embodiments of this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an exemplary networked system utilizing reference signal temporal density configuration according to various embodiments of this disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an exemplary base station (BS) utilizing reference signal temporal density configuration according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an exemplary electronic device for communicating in the networked computing system utilizing reference signal temporal density configuration according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
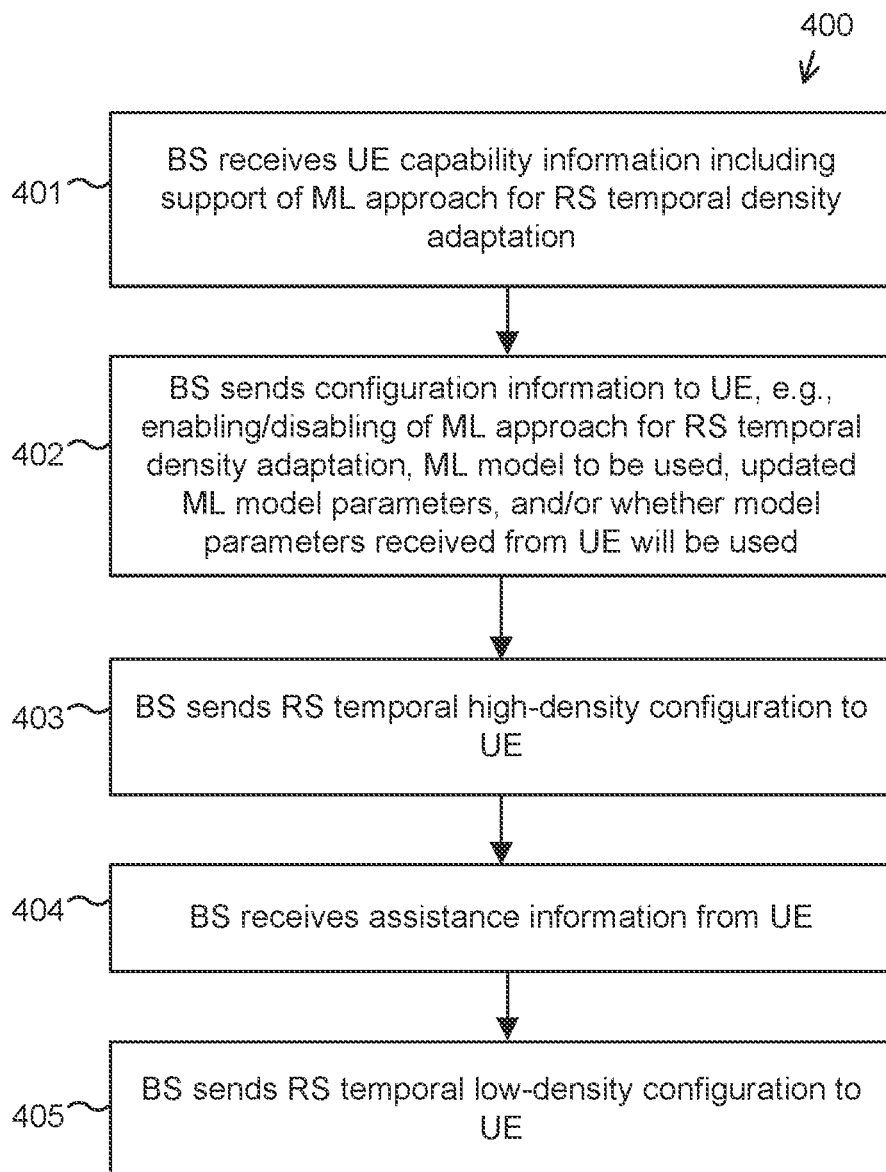
FIG. 4 illustrates a high-level flowchart for an example of BS operation to support RS temporal density adaptation according to various embodiments of this disclosure.

FIG. 4 illustrates a high-level flowchart for an example of BS operation to support RS temporal density adaptation according to various embodiments of this disclosure. The embodiment of FIG. 4 is for illustration only. Other embodiments of the process 400 could be used without departing from the scope of this disclosure.

FIG. 4 is an example of a method 400 for operations at a BS to support AI/ML techniques for RS temporal density adaptation. At operation 401, a BS receives UE capability information from a UE, including the support of an ML approach for RS temporal density adaptation. At operation 402, a BS sends configuration information to a UE, which can include ML-related configuration information such as enabling/disabling of an ML approach for RS temporal density adaptation, an ML model to be used, trained model parameters, and/or whether model parameter updates reported by a UE will be used or not. At operation 403, a BS sends an RS temporal high-density configuration message to a UE. At operation 404, a BS receives assistance information from a UE, where the assistance information can include a recommended RS temporal density, which will be described below. At operation 405, a BS sends an RS temporal low-density configuration message to a UE.

Figure 5:
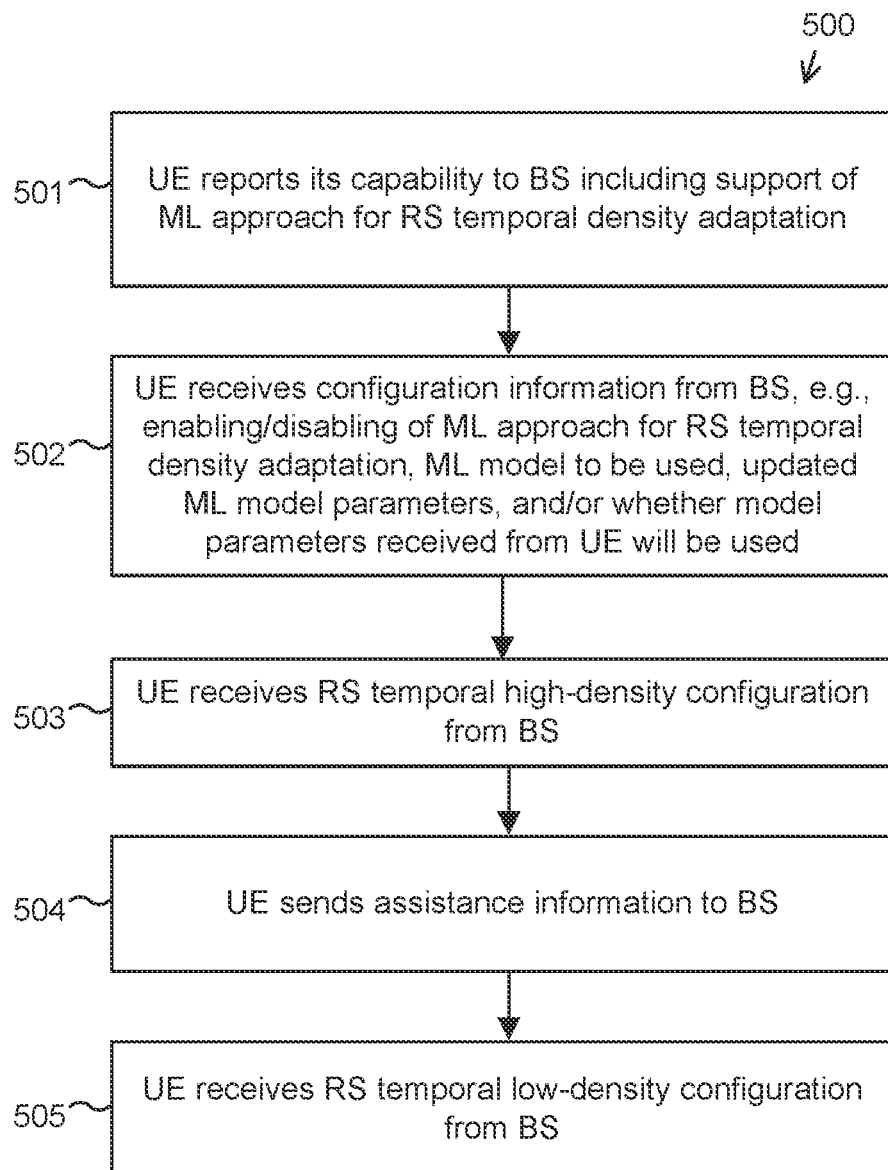
FIG. 5 illustrates a high-level flowchart for an example of UE operation to support RS temporal density adaptation according to various embodiments of this disclosure.

FIG. 5 illustrates a high-level flowchart for an example of UE operation to support RS temporal density adaptation according to various embodiments of this disclosure. The embodiment of FIG. 5 is for illustration only. Other embodiments of the process 500 could be used without departing from the scope of this disclosure.

FIG. 5 is an example of a method 500 for operations at a UE to support AI/ML techniques for RS temporal density adaptation. At operation 501, a UE reports capability information to a BS, including the support of an ML approach for RS temporal density adaptation. At operation 502, a UE receives configuration information from a BS, which can include ML-related configuration information such as enabling/disabling of an ML approach for RS temporal density adaptation, an ML model to be used, trained model parameters, and/or whether model parameter updates reported by a UE will be used or not. At operation 503, a UE receives an RS temporal high-density configuration message from a BS. At operation 504, a UE sends assistance information to a BS; the assistance information can include a recommended RS temporal density, which will be described below. At operation 505, a UE receives an RS temporal low-density configuration message from a BS.

Figure 6:
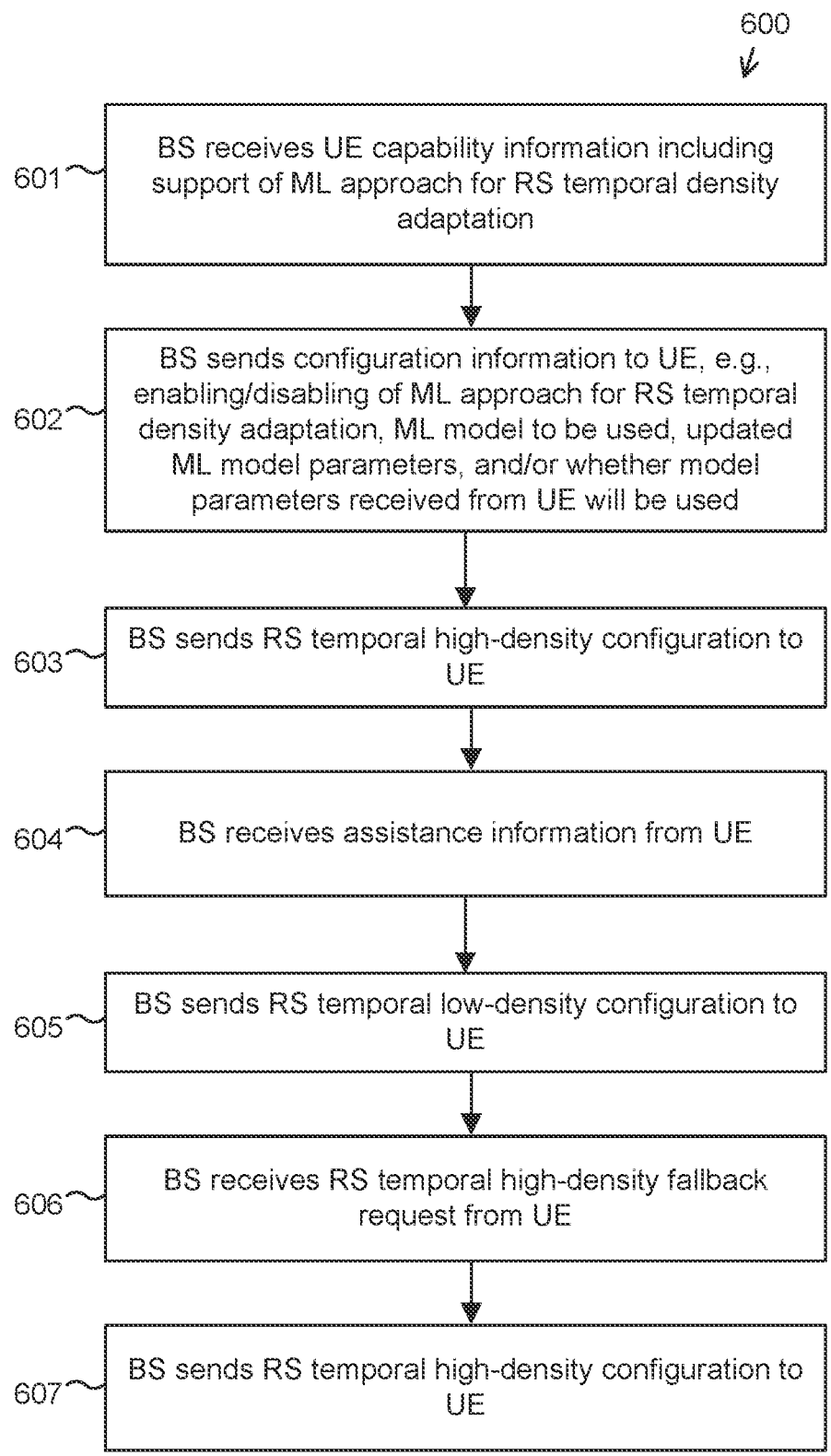
FIG. 6 illustrates a high-level flowchart for an example of BS operation to support fallback to an RS temporal high-density configuration according to various embodiments of this disclosure.

FIG. 6 illustrates a high-level flowchart for an example of BS operation to support fallback to an RS temporal high-density configuration according to various embodiments of this disclosure. The embodiment of FIG. 6 is for illustration only. Other embodiments of the process 600 could be used without departing from the scope of this disclosure.

FIG. 6 is an example of a method 600 for operations at a BS to support a request to fall back from an RS temporal low-density pattern to an RS temporal high-density pattern. At operation 601, a BS receives UE capability information from a UE, including the support of an ML approach for RS temporal density adaptation. At operation 602, a BS sends configuration information to a UE, which can include ML-related configuration information such as enabling/disabling of an ML approach for RS temporal density adaptation, an ML model to be used, trained model parameters, and/or whether model parameter updates reported by a UE will be used or not. At operation 603, a BS sends an RS temporal high-density configuration message to a UE. At operation 604, a BS receives assistance information from a UE; the assistance information can include a recommended RS temporal density, which will be described below. At operation 605, a BS sends an RS temporal low-density configuration message to a UE. At operation 606, a BS receives a request from a UE to fall back to an RS temporal high-density pattern. This request will be described in further detail below. At operation 607, a BS sends an RS temporal high-density configuration message to a UE.

Figure 7:
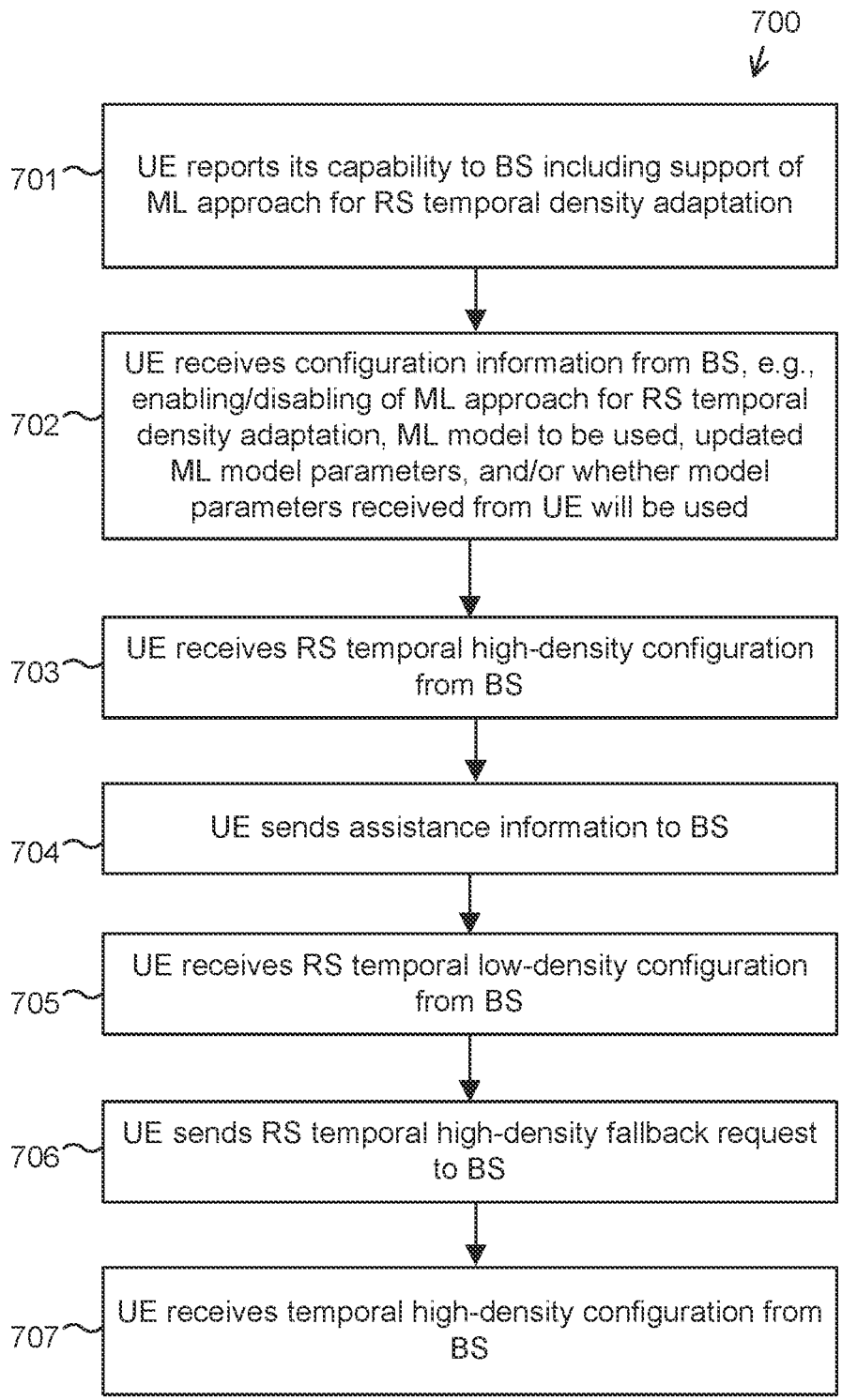
FIG. 7 illustrates a high-level flowchart for an example of UE operation to support fallback to an RS temporal high-density configuration according to various embodiments of this disclosure.

FIG. 7 illustrates a high-level flowchart for an example of UE operation to support fallback to an RS temporal high-density configuration according to various embodiments of this disclosure. The embodiment of FIG. 7 is for illustration only. Other embodiments of the process 700 could be used without departing from the scope of this disclosure.

FIG. 7 is an example of a method 700 for operations at a UE to support a request to fall back from an RS temporal low-density pattern to an RS temporal high-density pattern. At operation 701, a UE reports capability information to a BS, including the support of an ML approach for RS temporal density adaptation. At operation 702, a UE receives configuration information from a BS, which can include ML-related configuration information such as enabling/disabling of an ML approach for RS temporal density adaptation, an ML model to be used, trained model parameters, and/or whether model parameter updates reported by a UE will be used or not. At operation 703, a UE receives an RS temporal high-density configuration message from a BS. At operation 704, a UE sends assistance information to a BS; the assistance information can include a recommended RS temporal density, which will be described below. At operation 705, a UE receives an RS temporal low-density configuration message from a BS. At operation 706, a UE sends a request to a BS to fall back to an RS temporal high-density pattern. This request will be described in further detail below. At operation 707, a UE receives an RS temporal high-density configuration message from a BS.

Figure 8:
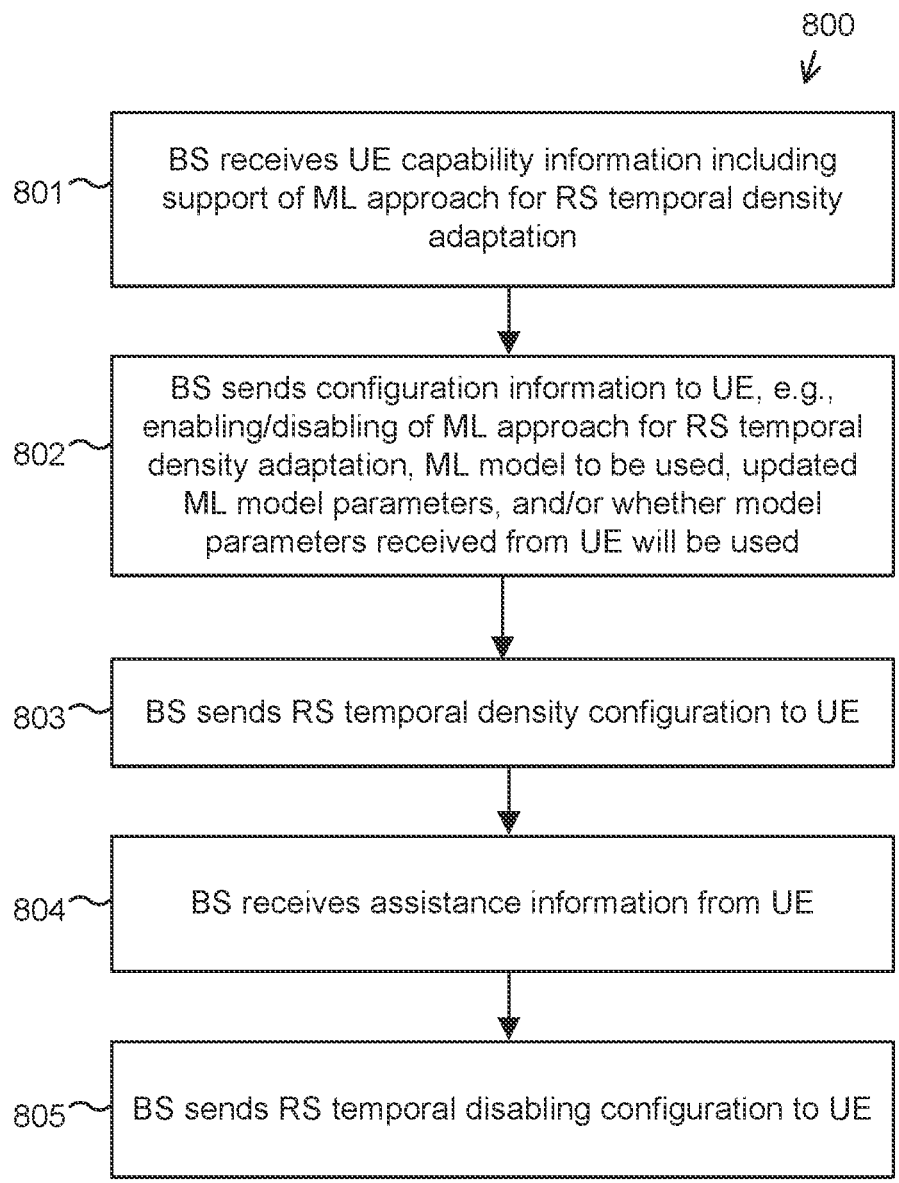
FIG. 8 illustrates a high-level flowchart for an example of BS operation to support RS temporal disabling according to various embodiments of this disclosure.

FIG. 8 illustrates a high-level flowchart for an example of BS operation to support RS temporal disabling according to various embodiments of this disclosure. The embodiment of FIG. 8 is for illustration only. Other embodiments of the process 800 could be used without departing from the scope of this disclosure.

FIG. 8 is an example of a method 800 for operations at a BS to support AI/ML techniques for RS temporal disabling. At operation 801, a BS receives UE capability information from a UE, including the support of an ML approach for RS temporal density adaptation. At operation 802, a BS sends configuration information to a UE, which can include ML-related configuration information such as enabling/disabling of an ML approach for RS temporal density adaptation, an ML model to be used, trained model parameters, and/or whether model parameter updates reported by a UE will be used or not. At operation 803, a BS sends an RS temporal density configuration message to a UE. At operation 804, a BS receives assistance information from a UE. The assistance information can include a recommendation for RS temporal disabling, which will be described below. At operation 805, a BS sends an RS temporal disabling configuration message to a UE.

Figure 9:
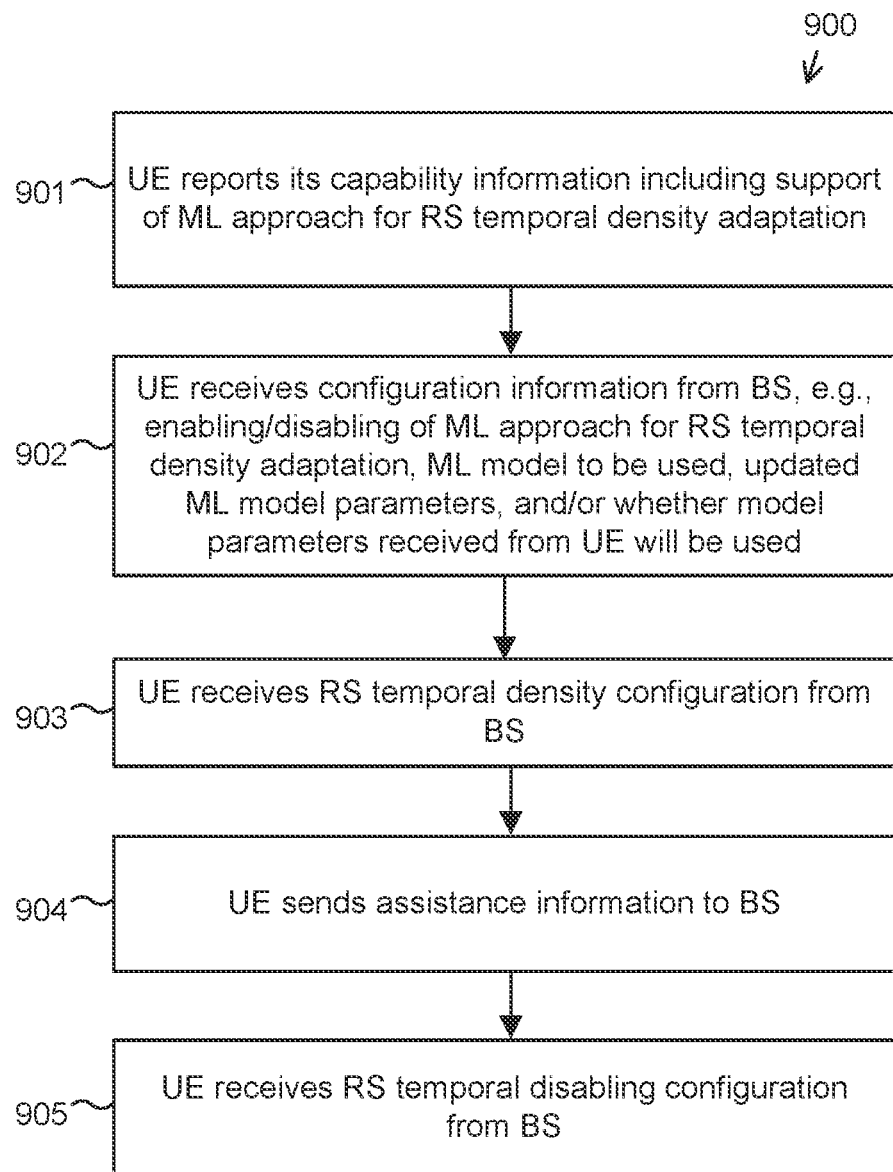
FIG. 9 illustrates a high-level flowchart for an example of UE operation to support RS temporal disabling according to various embodiments of this disclosure.

FIG. 9 illustrates a high-level flowchart for an example of UE operation to support RS temporal disabling according to various embodiments of this disclosure. The embodiment of FIG. 9 is for illustration only. Other embodiments of the process 900 could be used without departing from the scope of this disclosure.

FIG. 9 is an example of a method 900 for operations at a UE to support AI/ML techniques for RS temporal disabling. At operation 901, a UE reports capability information to a BS, including the support of an ML approach for RS temporal density adaptation. At operation 902, a UE receives configuration information from a BS, which can include ML-related configuration information such as enabling/disabling of an ML approach for RS temporal density adaptation, an ML model to be used, trained model parameters, and/or whether model parameter updates reported by a UE will be used or not. At operation 903, a UE receives an RS temporal density configuration message from a BS. At operation 904, a UE sends assistance information to a BS. The assistance information can include a recommendation for RS temporal disabling, which will be described in further detail below. At operation 905, a UE receives an RS temporal disabling configuration message from a BS.

Figure 10:
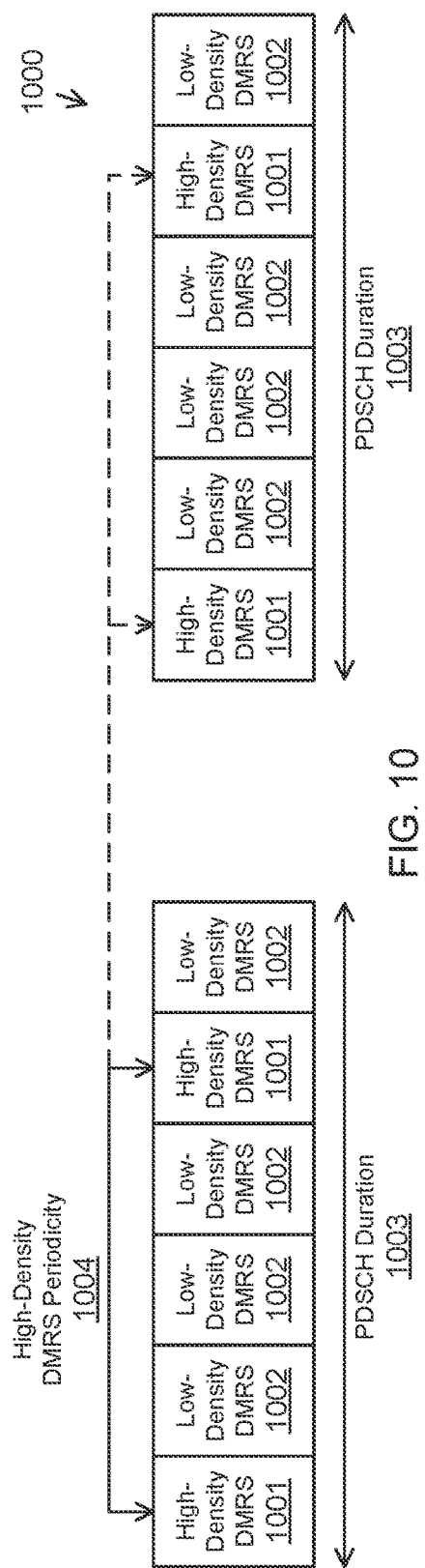
FIG. 10 illustrates an example of RS temporal density adaptation according to various embodiments of this disclosure.

FIG. 10 illustrates an example of RS temporal density adaptation according to various embodiments of this disclosure. The embodiment of FIG. 10 is for illustration only. Other embodiments could be used without departing from the scope of this disclosure.

In 5G NR, a slot consists of 14 OFDM symbols. For example, in the time domain, a "time resource" can correspond to an OFDM symbol, or to a slot, a subframe, a radio frame, etc. An example 1000 of RS temporal density adaptation is shown in FIG. 10, where the rectangles represent slots. Within a slot, a certain number of symbols can contain DMRS, where the ratio of that number to 14 can represent the DMRS temporal density. In this example, slots 1001 with a high DMRS temporal density can be configured with a certain periodicity 1004. Other slots 1002 within the duration of a PDSCH transmission 1003 can be configured with a low DMRS temporal density.

In one embodiment, a BS can configure a UE with a DMRS temporal density via PDCCH signaling. In another example, a BS can configure a UE with a DMRS temporal density via RRC configuration. TABLE 1 is an example of defining an information element (IE) DMRS-DownlinkConfigH to configure DMRS with a high temporal density. In this example, this DMRS pattern can be configured to be periodic, semi-persistent, or aperiodic. DMRS-Sym represents a tuple of (OFDM symbol index, frequency density) values, and one tuple is specified for each OFDM symbol in a slot. Similarly, an IE DMRS-DownlinkConfigL can be defined to configure DMRS with a low temporal density. These IEs can facilitate switching between DMRS patterns with high and low temporal densities in consecutive slots. For example, if a DMRS pattern with a high temporal density is configured to be periodic, then a UE can expect to receive that pattern in certain slots. In other slots within the duration of a PDSCH transmission, a UE can expect to receive a DMRS pattern with low temporal density, assuming that pattern has been configured to be semi-persistent.

ping to configure the temporal density of CSI-RS. In this example, densityH and densityL represent pre-defined temporal density values (in addition to the values of 0.5, 1, and 3 that have already been defined in this IE). This IE can facilitate switching between CSI-RS patterns with high and low temporal densities in consecutive slots, as the information is contained in an IE NZP-CSI-RS-Resource. An NZP-CSI-RS-Resource IE can configure a CSI-RS pattern to be periodic, semi-persistent, or aperiodic. For example, if a CSI-RS pattern with high temporal density is configured to be periodic, then a UE can expect to receive that pattern in certain slots. In other slots, a UE can expect to receive a CSI-RS pattern with low temporal density, assuming that pattern has been configured to be semi-persistent. For

TABLE 1

An example of IE DMRS-DownlinkConfigH to configure DMRS with a high temporal density

```
DMRS-DownlinkConfigH : :=     SEQUENCE {
   dmrs-Type                  ENUMERATED {type2} OPTIONAL, -- Need S
   ...,
   resourceType               CHOICE {
     aperiodic                  SEQUENCE {
       slotOffset                 INTEGER   (1...32) OPTIONAL, --
          Need S
     },
     semi-persistent            SEQUENCE {
       slotOffset                 INTEGER   (1...32) OPTIONAL , --
          Need S
       periodicity                INTEGER      (1...maxPeriodicity)
          OPTIONAL, -- Need S
     },
     periodic                   SEQUENCE {
       slotOffset                 INTEGER   (1...32) OPTIONAL, --
          Need S
       periodicity                INTEGER      (1...maxPeriodicity)
          OPTIONAL, -- Need S
     }
   },
   timeFreqAllocation         SEQUENCE (SIZE (1..numSymInSlot) )
     OF DMRS-Sym,
}
```

In another embodiment, a BS can configure a UE with a CSI-RS temporal density via RRC configuration. TABLE 2 is an example of modifying an IE CSI-RS-ResourceMapping to configure the temporal density of CSI-RS.

example, in the time domain, a "time resource" can correspond to an OFDM symbol, a slot, a subframe, a radio frame, etc.

TABLE 2

An example of IE CSI-RS-ResourceMapping modification to configure CSI-RS temporal density

```
CSI-RS-ResourceMapping ::=      SEQUENCE {
   frequencyDomainAllocation      CHOICE {
     row1                           BIT STRING (SIZE (4)),
     row2                           BIT STRING (SIZE (12)),
     row3                           BIT STRING (SIZE (3)),
     row4                           BIT STRING (SIZE (6)),
   },
   nrofPorts                      ENUMERATED
     (p1,p2,p4,p8,p12,p16,p24,p32},
   firstOFDMSymbolInTimeDomain    INTEGER (0..13) ,
   firstOFDMSymbolInTimeDomain2   INTEGER (2..12) OPTIONAL, -- Need R
   cdm-Type                       ENUMERATED {noCDM, fd-CDM2, cdm4-FD2-
     TD2, cdm8-FD2-TD4},
   density                        CHOICE {
     dot 5                          ENUMERATED (evenPRBs, oddPRBs) ,
     one                            NULL,
     three                          NULL,
     densityH                       NULL,
     densityL                       NULL,
```

TABLE 2-continued

An example of IE CSI-RS-ResourceMapping modification to configure CSI-RS temporal density

| | |
|---|---|
| spare | NULL |
| }, | |
| freqBand | CSI-FrequencyOccupation |
| ... | |
| } | |

As another example, a BS can configure a UE to (at least temporarily) disable DMRS in subsequent slots. TABLE 3 is an example of modifying an IE DMRS-DownlinkConfig to disable DMRS in subsequent slots. In another example, a new DCI format can be defined to support DMRS temporal disabling. For this DCI format, the CRC can be scrambled by the C-RNTI of this UE. This DCI format can consist of a DMRS temporal disabling indication for this UE.

TABLE 3

An example of IE DMRS-DownlinkConfig modification to support DMRS temporal disabling

| | |
|---|---|
| DMRS-DownlinkConfig ::= | SEQUENCE { |
| dmrs-Type | ENUMERATED (type2) OPTIONAL, -- Need S |
| dmrs-AdditionalPosition -- Need S | ENUMERATED (pos0, pos1, pos3) OPTIONAL, |
| maxLength | ENUMERATED (len2) OPTIONAL, -- Need S |
| scramblingID0 | INTEGER (0..65535) OPTIONAL, -- Need S |
| scramblingID1 | INTEGER (0..65535) OPTIONAL, -- Need S |
| phaseTrackingRS OPTIONAL, -- Need M | SetupRelease { PTRS-DownlinkConfig } |
| ..., | |
| dmrs-Disable | BOOLEAN |
| [[ | |
| dmrs-Downlink-r16 R | ENUMERATED (enabled) OPTIONAL, -- Need |
| ]] | |
| } | |

In one embodiment, a new MAC CE can be defined for the UE assistance information report. This MAC CE can be identified by a MAC subheader with a logical channel ID that can be specified in Table 6.2.1-2 in [3]. This MAC CE can have a variable size and consist of the following fields:
  Block Error Rate: This field indicates the observed block error rate of the UE, e.g., the block error rate that has been computed over the last 1000 received transport blocks.
  Throughput: This field indicates the observed throughput of the UE, e.g., the throughput in megabits/second that has been computed over the last 1000 received transport blocks.
  UE Speed: This field indicates the UE's measurement of its speed in meters/second.
  UE Acceleration: This field indicates the UE's measurement of its acceleration in meters/(second*second).
  IR: This field indicates the presence of the octet containing the Recommended DMRS Temporal Density field. If the IR field is set to 1, the octet containing the Recommended DMRS Temporal Density field is present. If the IR field is set to 0, the octet containing the Recommended DMRS Temporal Density field is not present.
  Recommended DMRS Temporal Density: This field indicates the UE's recommended DMRS temporal density, e.g., an index to a table of DMRS temporal density values.

If the recommended DMRS temporal density is equal to 0, then this message can function as a recommendation for DMRS temporal disabling.

Figure 11:
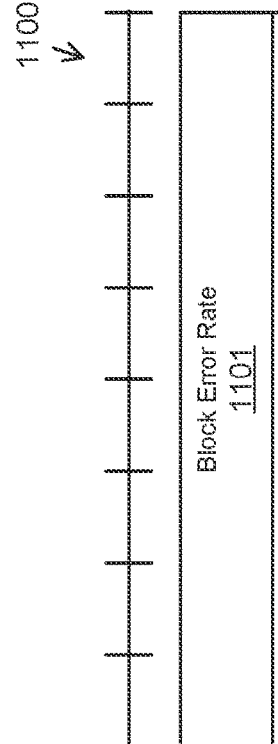
FIG. 11 illustrates an example of a new MAC CE for the UE assistance information report according to various embodiments of this disclosure.

FIG. 11 illustrates an example of a new MAC CE for the UE assistance information report according to various embodiments of this disclosure. The embodiment of FIG. 11 is for illustration only. Other embodiments could be used without departing from the scope of this disclosure.

FIG. 11 shows an example of a new MAC CE 1100 for the UE assistance information report, where the Block Error Rate 1101, the UE Throughput field 1102, the UE Speed field 1103, and the UE Acceleration field 1104 each have a length of 8 bits. An Indicator of Recommendation (IR) bit 1105 is included in the last byte, with the Recommended DMRS Temporal Density field 1106 (which has a length of 7 bits).

In one embodiment, a new MAC CE can be defined for the RS temporal high-density fallback request. This MAC CE can be identified by a MAC subheader with a logical channel ID that can be specified in Table 6.2.1-2 in [3]. This MAC CE can have a variable size and consist of the following field:
  DMRS Temporal High-Density Fallback: This field indicates that the UE is requesting that the BS fall back to a DMRS temporal high-density pattern, e.g., the index of that pattern in a table of DMRS temporal density values.

Figure 12:
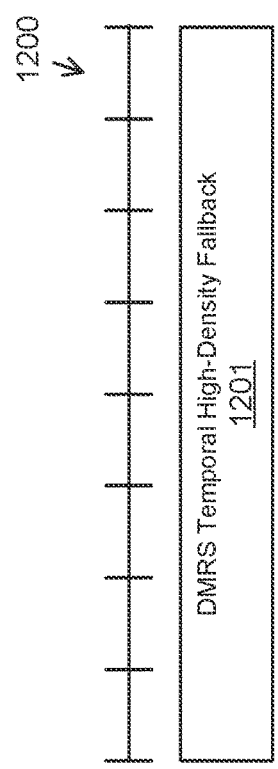
FIG. 12 illustrates an example of a new MAC CE for the RS temporal high-density fallback request according to various embodiments of this disclosure.

FIG. 12 illustrates an example of a new MAC CE for the RS temporal high-density fallback request according to various embodiments of this disclosure. The embodiment of FIG. 12 is for illustration only. Other embodiments could be used without departing from the scope of this disclosure.

FIG. 12 shows an example of a new MAC CE for the RS temporal high-density fallback request 1200, where the DMRS Temporal High-Density Fallback field 1201 has a length of 8 bits.

Figure 13:
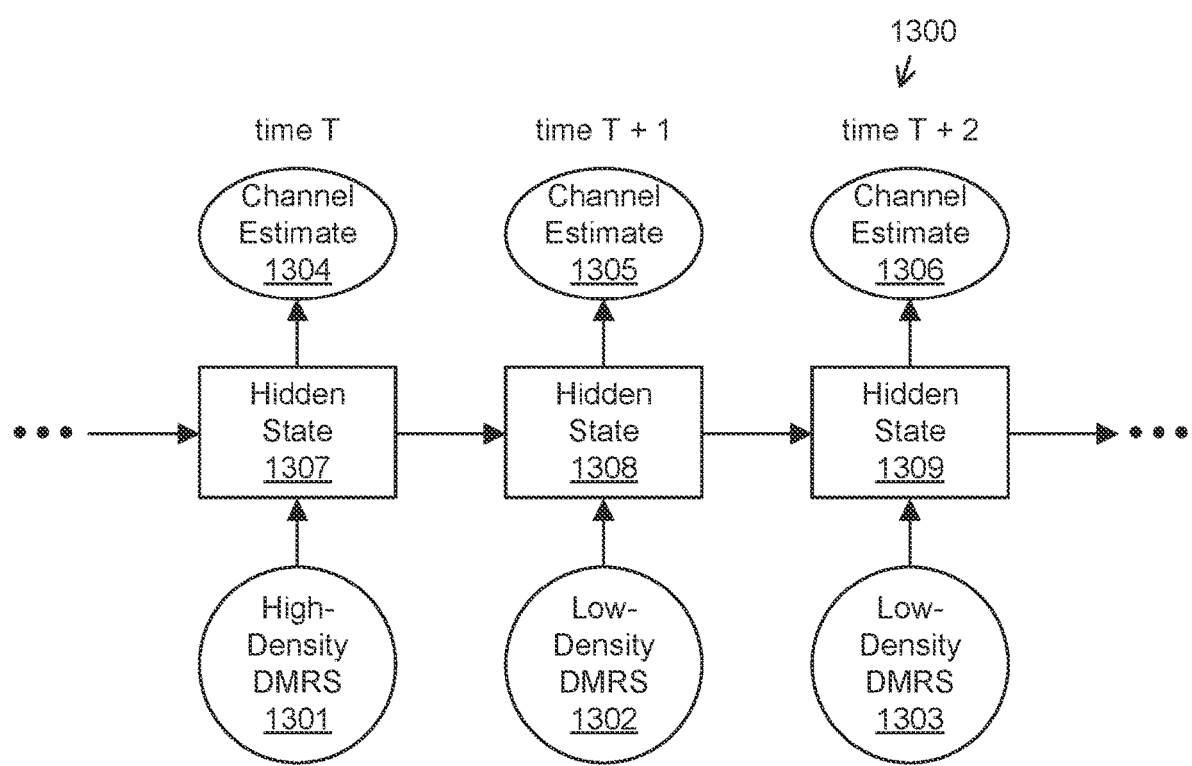
FIG. 13 illustrates an example of an AI/ML model architecture to support RS temporal density adaptation according to various embodiments of this disclosure.

FIG. 13 illustrates an example of an AI/ML model architecture to support RS temporal density adaptation according to various embodiments of this disclosure. The embodiment of FIG. 13 is for illustration only. Other embodiments could be used without departing from the scope of this disclosure.

FIG. 13 shows an example of an AI/ML model architecture 1300 that can support RS temporal density adaptation. In this example, a DMRS high-density pattern 1301 in one slot (e.g., time T) can be combined with DMRS low-density patterns 1302, 1303 in subsequent slots (e.g., time T+1, time T+2) and used (based on channel estimate 1304) to infer channel estimates 1305, 1306 in those subsequent slots. A CRNN can be used in this example, where the hidden state 1307, 1308, 1309 in each slot can be a function of previously received DMRS patterns. In each slot, the full two-dimensional channel over all subcarriers and OFDM symbols is provided as input to the CRNN, where all REs that do not contain DMRS are filled with zeros. Examples of CRNNs include convolutional LSTMs [4] and convolutional GRUs [5].

Examples of inputs to an AI/ML model that can support RS temporal density adaptation include:
- Full two-dimensional received channel over all subcarriers and OFDM symbols for one slot.
  - All REs that do not contain RS are filled with zeros.
- Ground truth of full two-dimensional channel over all subcarriers and OFDM symbols for one slot.
  - This can be a training label.
- Auxiliary information:
  - UE speed.
  - UE trajectory.
  - UE location.
  - Coherence time.
  - Coherence bandwidth.
  - Delay spread.
  - Doppler spread.
  - Block error rate.
  - Throughput.

Examples of outputs from an AI/ML model that can support RS temporal density adaptation include:
- Full two-dimensional estimated channel over all subcarriers and OFDM symbols for one slot.
- Value of (inferred) RS temporal density.

As noted above, if the channel is static over frequency, then RS signaling can be (at least temporarily) disabled in certain SBs and/or BWPs, assuming that the receiver can estimate the channel in at least one other SB and/or BWP. The present disclosure describes a framework for supporting AI/ML techniques for RS frequency density adaptation based on the statistics of the underlying randomly-varying wireless channel. The corresponding signaling details are discussed in this disclosure.

The embodiments below address the issue that RS frequency density adaptation is currently left up to network implementation. This disclosure provides methods that the network can use to configure the frequency density of an RS pattern using AI/ML-based solutions. This disclosure also provides a framework for adapting the frequency density of an RS pattern based on UE inference and information. Details on the support of AI/ML techniques for RS frequency density adaptation are disclosed, including information elements to be exchanged between a transmitter and a receiver.

Figure 14:
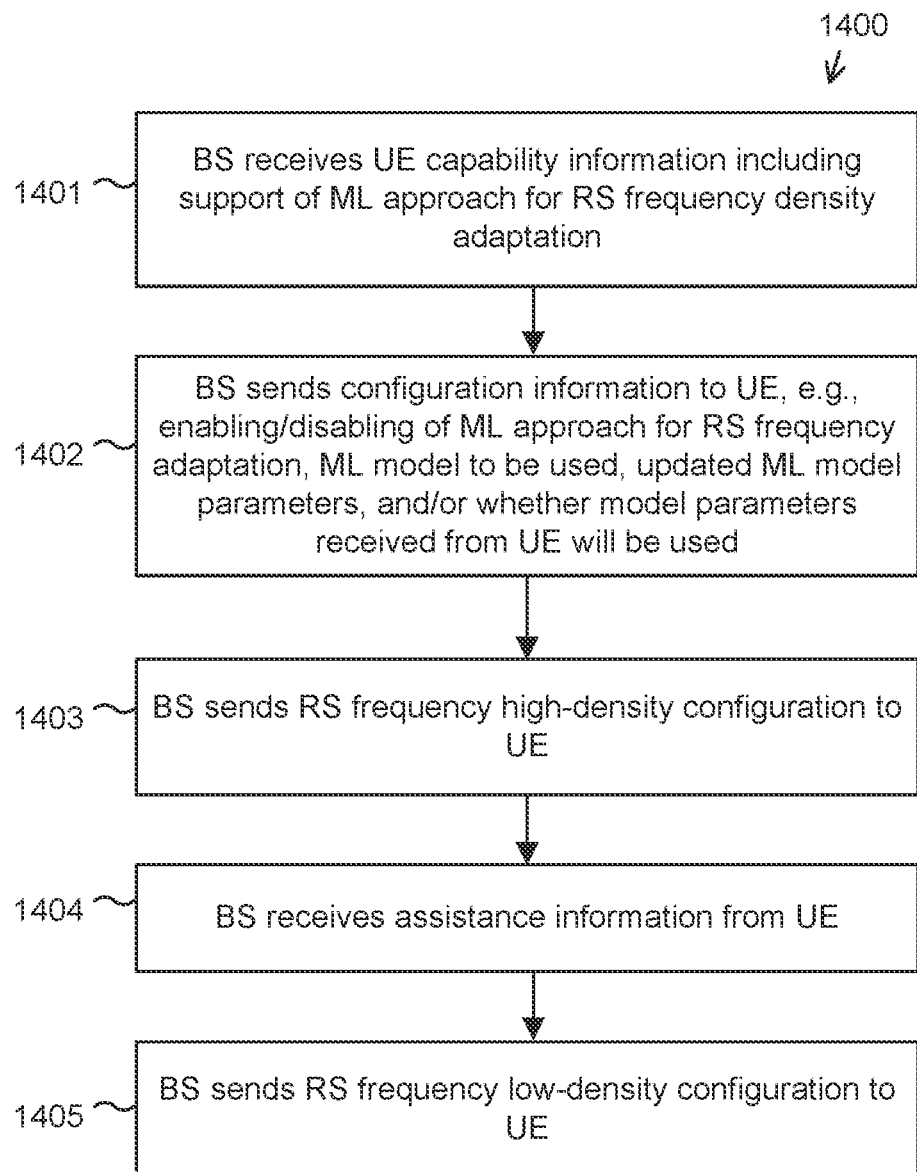
FIG. 14 illustrates a high-level flowchart for an example of BS operation to support RS frequency density adaptation according to various embodiments of this disclosure.

FIG. 14 illustrates a high-level flowchart for an example of BS operation to support RS frequency density adaptation according to various embodiments of this disclosure. The embodiment of FIG. 14 is for illustration only. Other embodiments of the process 1400 could be used without departing from the scope of this disclosure.

FIG. 14 is an example of a method 1400 for operations at a BS to support AI/ML techniques for RS frequency density adaptation. At operation 1401, a BS receives UE capability information from a UE, including the support of an ML approach for RS frequency density adaptation. At operation 1402, a BS sends configuration information to a UE, which can include ML-related configuration information such as enabling/disabling of an ML approach for RS frequency density adaptation, an ML model to be used, trained model parameters, and/or whether model parameter updates reported by a UE will be used or not. At operation 1403, a BS sends an RS frequency high-density configuration message to a UE. In one example, this message can correspond to one SB A. At operation 1404, a BS receives assistance information from a UE, where the assistance information can include a recommended RS frequency density for a second SB B. At operation 1405, a BS sends an RS temporal low-density configuration message to a UE. In one example, this message can correspond to SB B.

Figure 15:
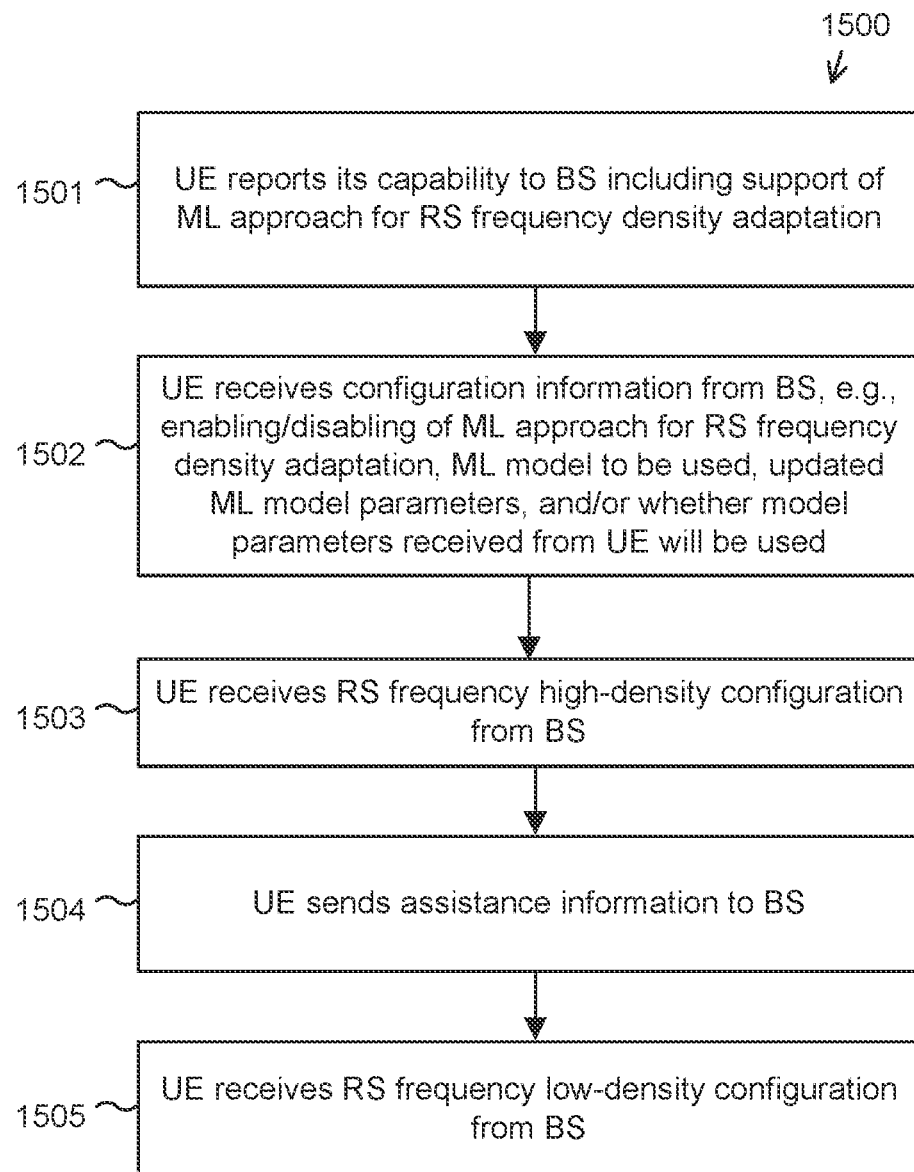
FIG. 15 illustrates a high-level flowchart for an example of UE operation to support RS frequency density adaptation according to various embodiments of this disclosure.

FIG. 15 illustrates a high-level flowchart for an example of UE operation to support RS frequency density adaptation according to various embodiments of this disclosure. The embodiment of FIG. 15 is for illustration only. Other embodiments of the process 1500 could be used without departing from the scope of this disclosure.

FIG. 15 is an example of a method 1500 for operations at a UE to support AI/ML techniques for RS frequency density adaptation. At operation 1501, a UE reports capability information to a BS, including the support of an ML approach for RS frequency density adaptation. At operation 1502, a UE receives configuration information from a BS, which can include ML-related configuration information such as enabling/disabling of an ML approach for RS frequency density adaptation, an ML model to be used, trained model parameters, and/or whether model parameter updates reported by a UE will be used or not. At operation 1503, a UE receives an RS frequency high-density configuration message from a BS. In one example, this message can correspond to one SB A. At operation 1504, a UE sends assistance information to a BS; the assistance information can include a recommended RS frequency density for a second SB B. At operation 1505, a UE receives an RS frequency low-density configuration message from a BS. In one example, this message can correspond to SB B.

Figure 16:
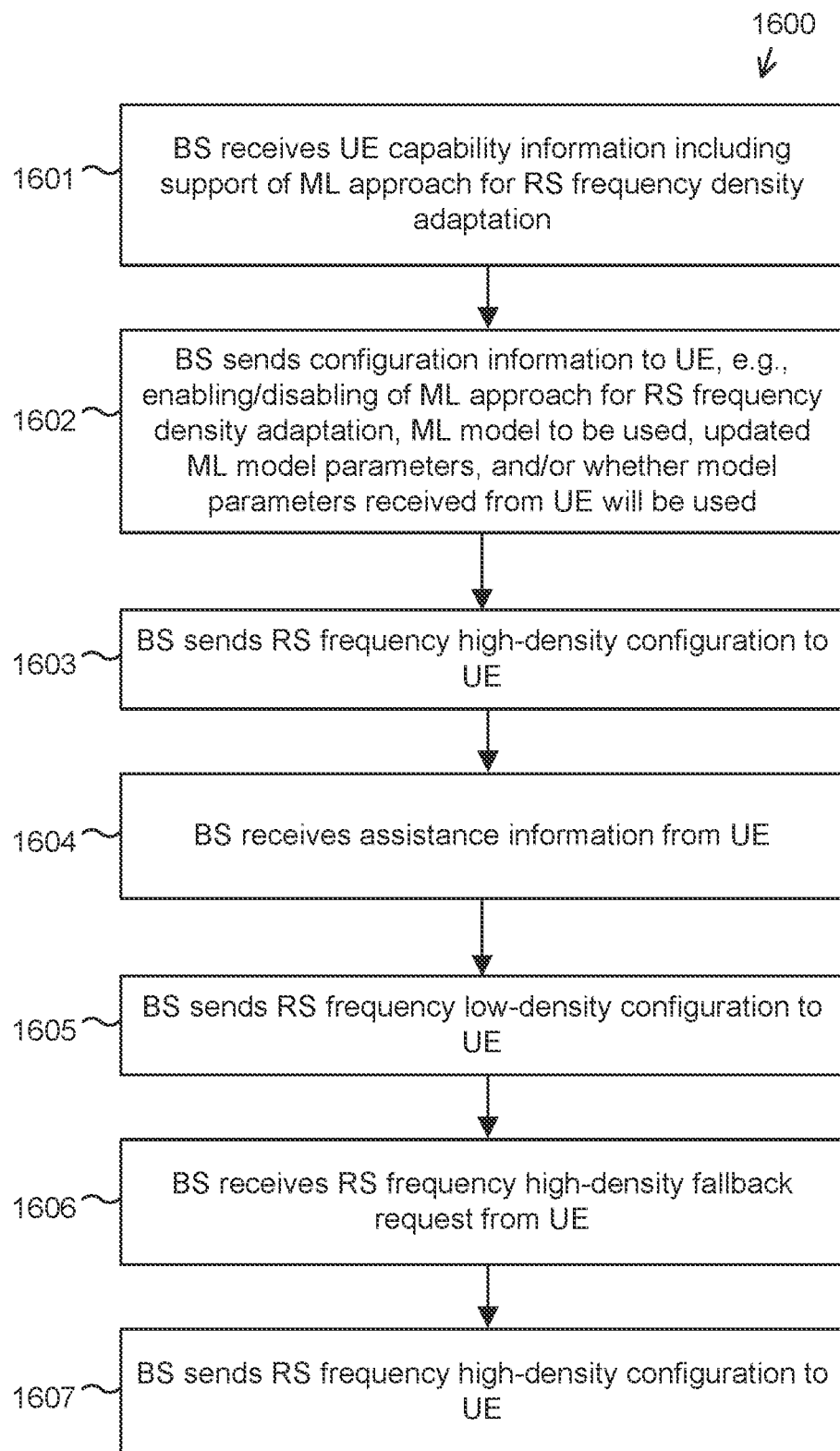
FIG. 16 illustrates a high-level flowchart for an example of BS operation to support fallback to an RS frequency high-density configuration according to various embodiments of this disclosure.

FIG. 16 illustrates a high-level flowchart for an example of BS operation to support fallback to an RS frequency high-density configuration according to various embodiments of this disclosure. The embodiment of FIG. 16 is for illustration only. Other embodiments of the process 1600 could be used without departing from the scope of this disclosure.

FIG. 16 is an example of a method 1600 for operations at a BS to support a request to fall back from an RS frequency low-density pattern to an RS frequency high-density pattern. At operation 1601, a BS receives UE capability information from a UE, including the support of an ML approach for RS frequency density adaptation. At operation 1602, a BS sends configuration information to a UE, which can include ML-related configuration information such as enabling/disabling of an ML approach for RS frequency density adaptation, an ML model to be used, trained model parameters, and/or whether model parameter updates reported by a UE will be used or not. At operation 1603, a BS sends an RS frequency high-density configuration message to a UE. In one example, this message can correspond to one SB A. At operation 1604, a BS receives assistance information from a UE; the assistance information can include a recommended RS frequency density for a second SB B. At operation 1605, a BS sends an RS frequency low-density configuration message to a UE. In one example, this message can correspond to SB B. At operation 1606, a BS receives a request from a UE to fall back to an RS frequency high-density pattern. At operation 1607, a BS sends an RS frequency high-density configuration message to a UE. In one example, this message can correspond to SB B.

Figure 17:
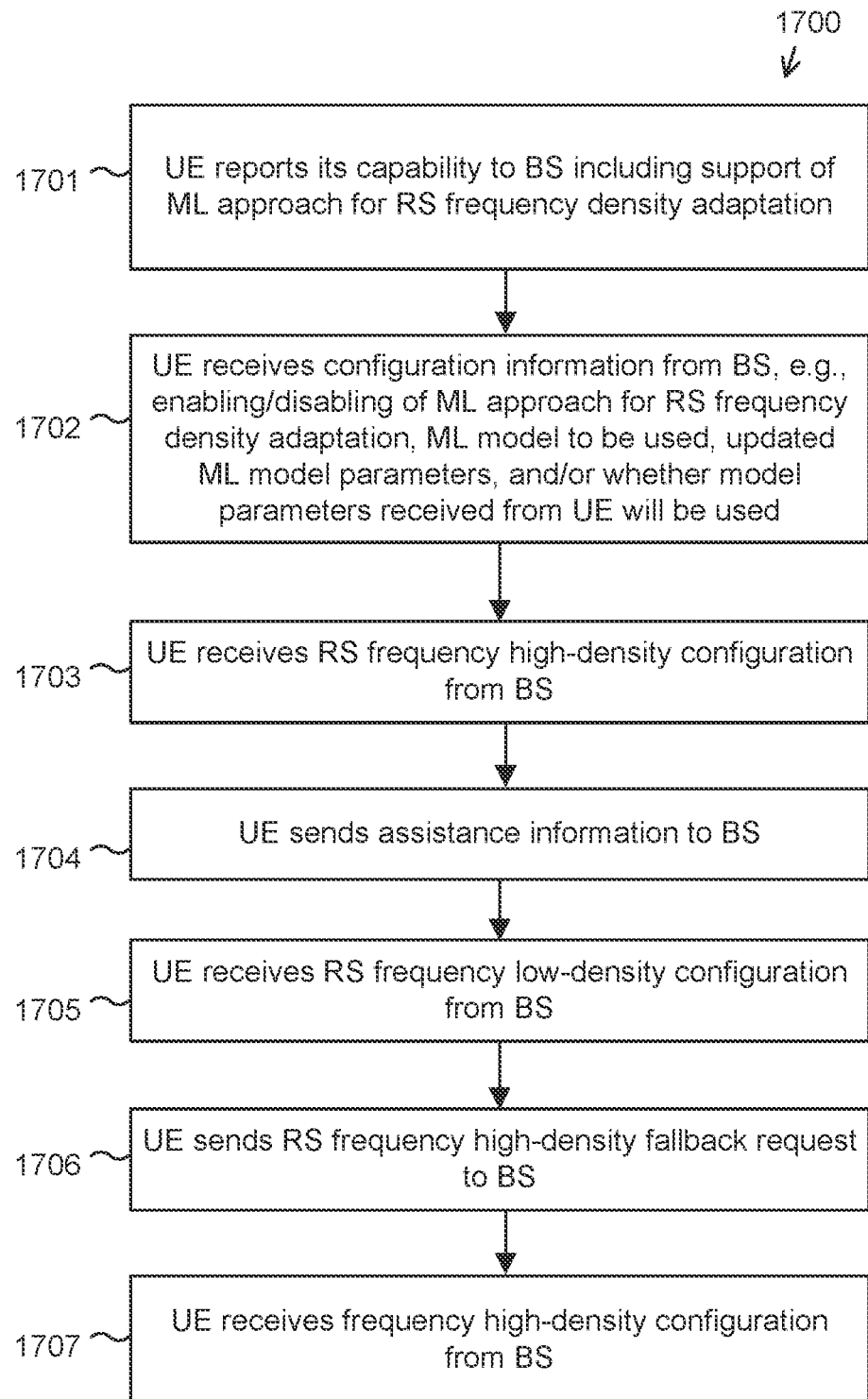
FIG. 17 illustrates a high-level flowchart for an example of UE operation to support fallback to an RS frequency high-density configuration according to various embodiments of this disclosure.

FIG. 17 illustrates a high-level flowchart for an example of UE operation to support fallback to an RS frequency high-density configuration according to various embodiments of this disclosure. The embodiment of FIG. 17 is for illustration only. Other embodiments of the process 1700 could be used without departing from the scope of this disclosure.

FIG. 17 is an example of a method 1700 for operations at a UE to support a request to fall back from an RS frequency low-density pattern to an RS frequency high-density pattern. At operation 1701, a UE reports capability information to a BS, including the support of an ML approach for RS frequency density adaptation. At operation 1702, a UE receives configuration information from a BS, which can include ML-related configuration information such as enabling/disabling of an ML approach for RS frequency density adaptation, an ML model to be used, trained model parameters, and/or whether model parameter updates reported by a UE will be used or not. At operation 1703, a UE receives an RS frequency high-density configuration message from a BS. In one example, this message can correspond to one SB A. At operation 1704, a UE sends assistance information to a BS; the assistance information can include a recommended RS frequency density for a second SB B. At operation 1705, a UE receives an RS frequency low-density configuration message from a BS. In one example, this message can correspond to SB B. At operation 1706, a UE sends a request to a BS to fall back to an RS frequency high-density pattern. At operation 1707, a UE receives an RS frequency high-density configuration message from a BS. In one example, this message can correspond to SB B.

Figure 18:
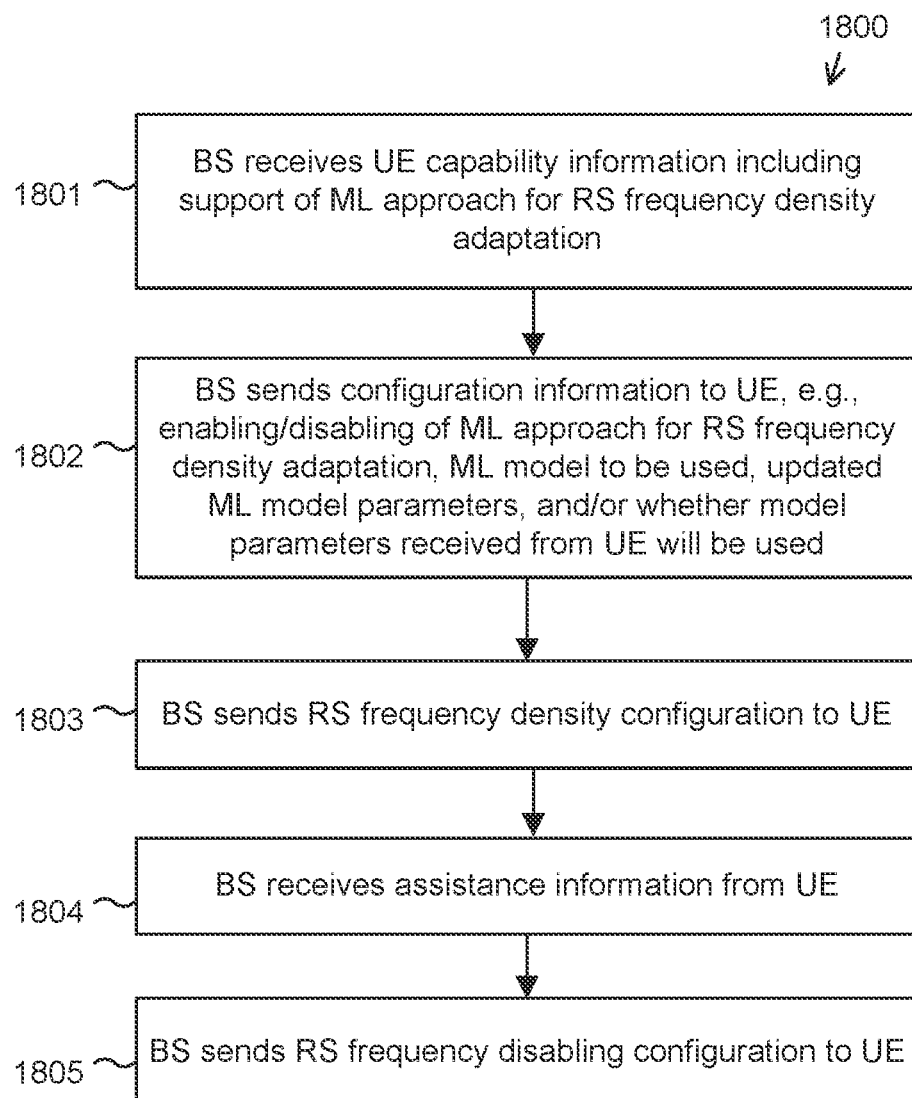
FIG. 18 illustrates a high-level flowchart for an example of BS operation to support RS frequency disabling according to various embodiments of this disclosure.

FIG. 18 illustrates a high-level flowchart for an example of BS operation to support RS frequency disabling according to various embodiments of this disclosure. The embodiment of FIG. 18 is for illustration only. Other embodiments of the process 1800 could be used without departing from the scope of this disclosure.

FIG. 18 is an example of a method 1800 for operations at a BS to support AI/ML techniques for RS frequency disabling. At operation 1801, a BS receives UE capability information from a UE, including the support of an ML approach for RS frequency density adaptation. At operation 1802, a BS sends configuration information to a UE, which can include ML-related configuration information such as enabling/disabling of an ML approach for RS frequency density adaptation, an ML model to be used, trained model parameters, and/or whether model parameter updates reported by a UE will be used or not. At operation 1803, a BS sends an RS frequency density configuration message to a UE. In one example, this message can correspond to one SB A. At operation 1804, a BS receives assistance information from a UE; the assistance information can include a recommendation for RS frequency disabling. At operation 1805, a BS sends an RS frequency disabling configuration message to a UE. In one example, this message can correspond to SB A.

Figure 19:
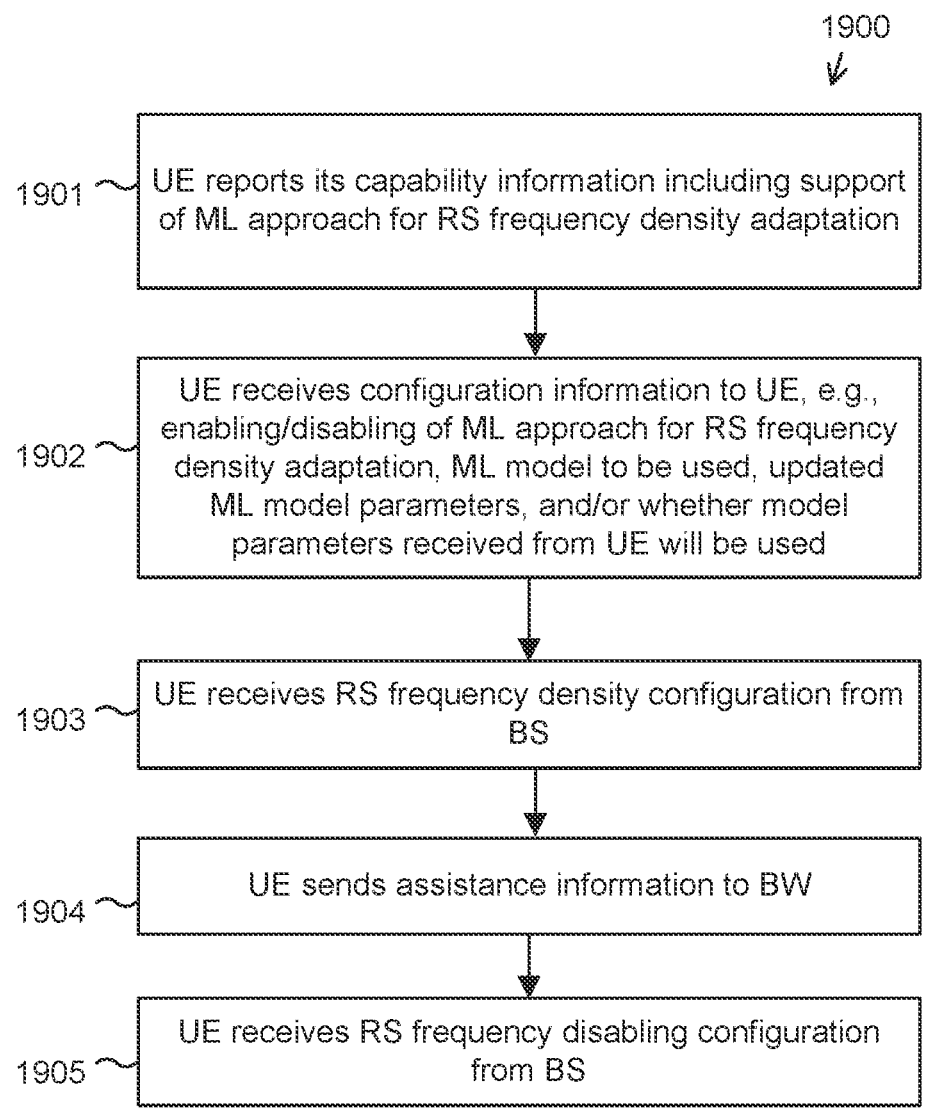
FIG. 19 illustrates a high-level flowchart for an example of UE operation to support RS frequency disabling according to various embodiments of this disclosure.

FIG. 19 illustrates a high-level flowchart for an example of UE operation to support RS frequency disabling according to various embodiments of this disclosure. The embodiment of FIG. 19 is for illustration only. Other embodiments of the process 1900 could be used without departing from the scope of this disclosure.

FIG. 19 is an example of a method 1900 for operations at a UE to support AI/ML techniques for RS frequency disabling. At operation 1901, a UE reports capability information to a BS, including the support of an ML approach for RS frequency density adaptation. At operation 1902, a UE receives configuration information from a BS, which can include ML-related configuration information such as enabling/disabling of an ML approach for RS frequency density adaptation, an ML model to be used, trained model parameters, and/or whether model parameter updates reported by a UE will be used or not. At operation 1903, a UE receives an RS frequency density configuration message from a BS. In one example, this message can correspond to one SB A. At operation 1904, a UE sends assistance information to a BS; the assistance information can include a recommendation for RS frequency disabling. At operation 1905, a UE receives an RS frequency disabling configuration message from a BS. In one example, this message can correspond to SB A.

Figure 20:
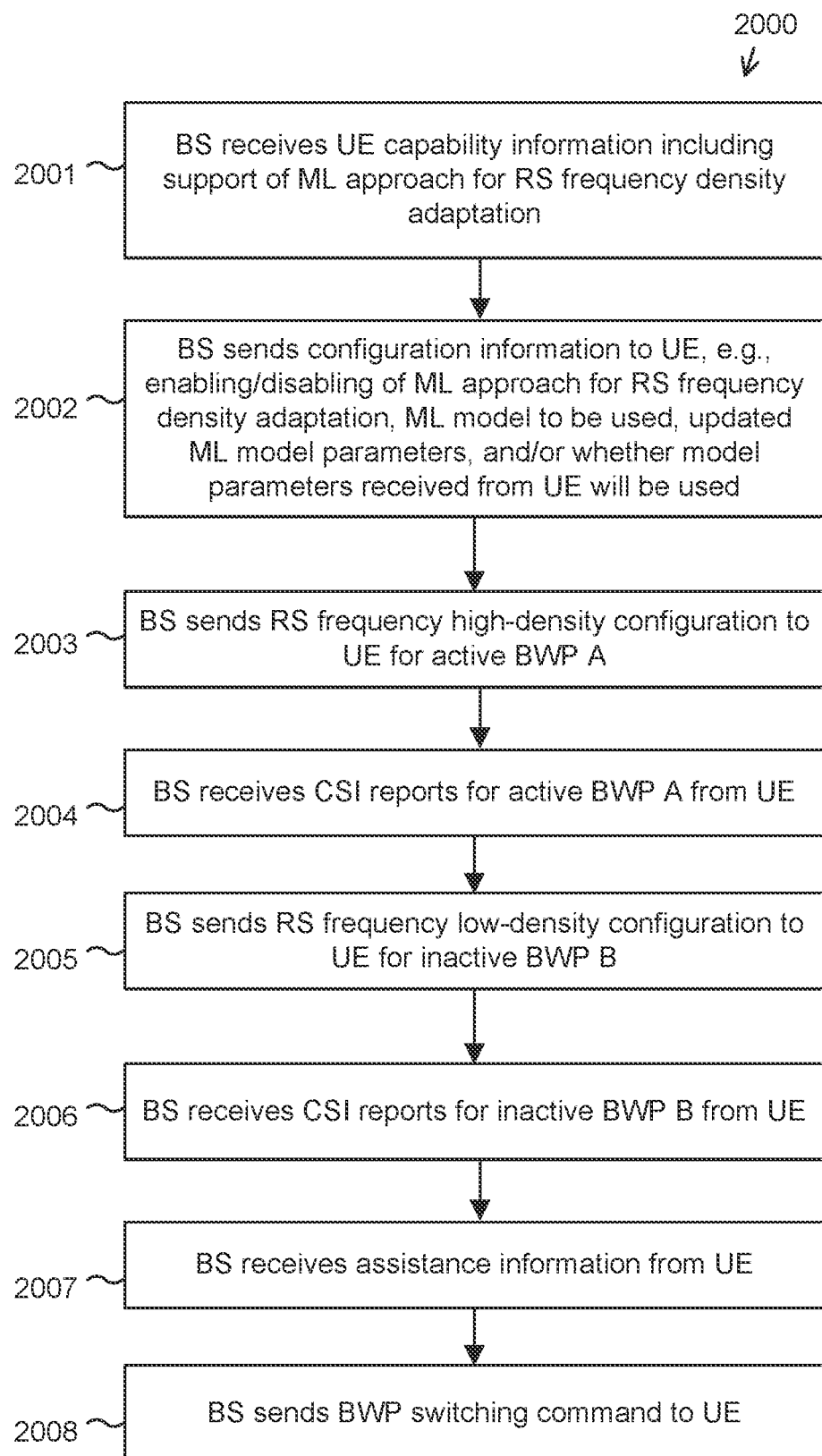
FIG. 20 illustrates a high-level flowchart for an example of BS operation to support RS frequency-based BWP switching according to various embodiments of this disclosure.

FIG. 20 illustrates a high-level flowchart for an example of BS operation to support RS frequency-based BWP switching according to various embodiments of this disclosure. The embodiment of FIG. 20 is for illustration only. Other embodiments of the process 2000 could be used without departing from the scope of this disclosure.

FIG. 20 is an example of a method 2000 for operations at a BS to support AI/ML techniques for RS frequency-based BWP switching. At operation 2001, a BS receives UE capability information from a UE, including the support of an ML approach for RS frequency density adaptation. At operation 2002, a BS sends configuration information to a UE, which can include ML-related configuration information such as enabling/disabling of an ML approach for RS frequency density adaptation, an ML model to be used, trained model parameters, and/or whether model parameter updates reported by a UE will be used or not. At operation 2003, a BS sends an RS frequency high-density configuration message to a UE for an active BWP A. In one example, a BS can configure a UE to receive high-density CSI-RS in BWP A. At operation 2004, a BS receives CSI reports from a UE for an active BWP A. At operation 2005, a BS sends an RS frequency low-density configuration message to a UE for an inactive BWP B. In one example, a BS can configure a UE to receive low-density CSI-RS in BWP B. At operation 2006, a BS receives CSI reports from a UE for an inactive BWP B. At operation 2007, a BS receives assistance information from a UE; the assistance information can include a recommendation for BWP switching. At operation 2008, a BS sends a BWP switching command message to a UE. In on example, this command can correspond to a BWP switch from BWP A to BWP B.

Figure 21:
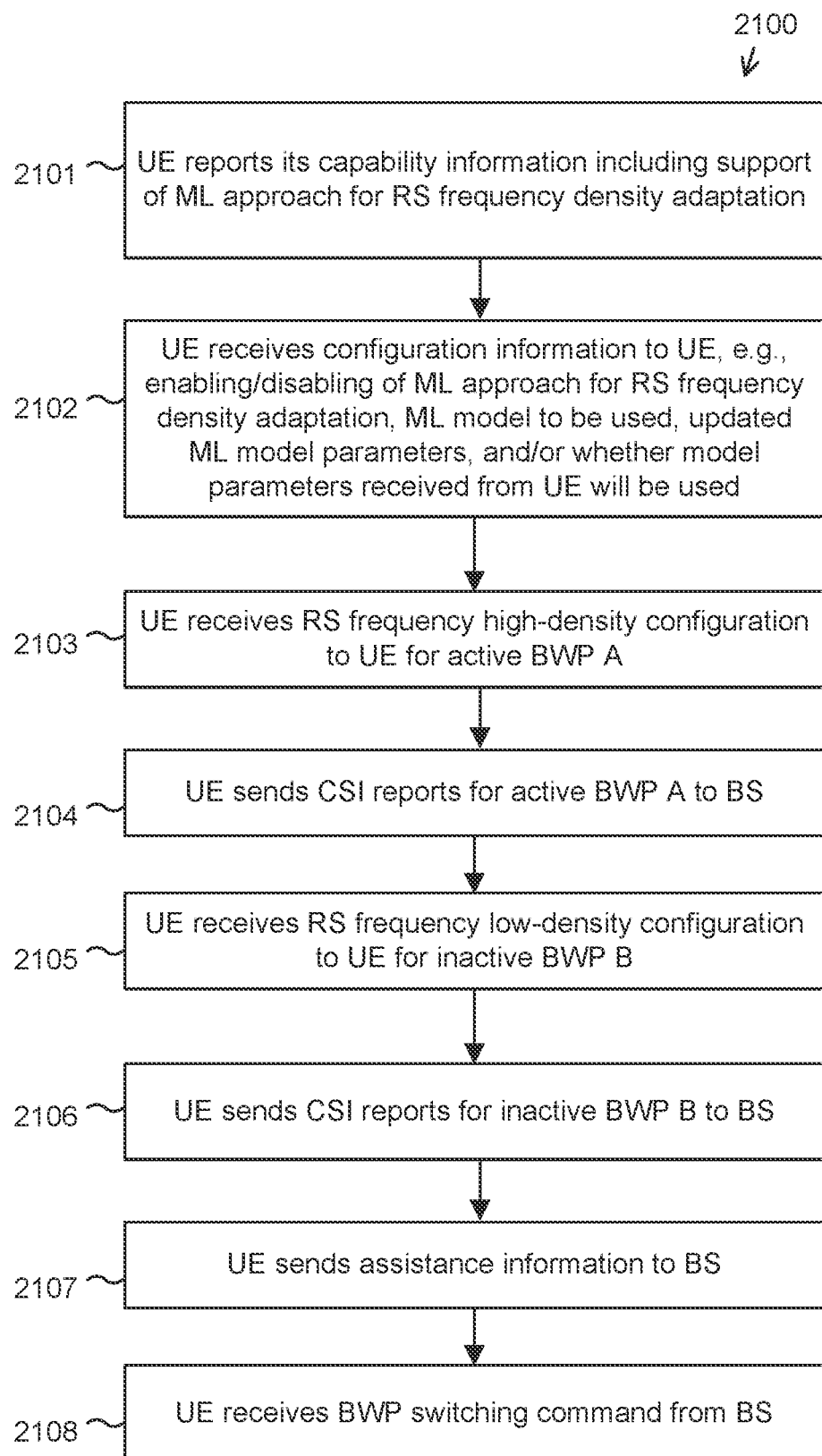
FIG. 21 illustrates a high-level flowchart for an example of UE operation to support RS frequency-based BWP switching according to various embodiments of this disclosure.

FIG. 21 illustrates a high-level flowchart for an example of UE operation to support RS frequency-based BWP switching according to various embodiments of this disclosure. The embodiment of FIG. 21 is for illustration only. Other embodiments of the process 2100 could be used without departing from the scope of this disclosure.

FIG. 21 is an example of a method 2100 for operations at a UE to support AI/ML techniques for RS frequency-based BWP switching. At operation 2101, a UE reports capability information to a BS, including the support of an ML approach for RS frequency density adaptation. At operation 2102, a UE receives configuration information from a BS, which can include ML-related configuration information such as enabling/disabling of an ML approach for RS frequency density adaptation, an ML model to be used, trained model parameters, and/or whether model parameter updates reported by a UE will be used or not. At operation 2103, a UE receives an RS frequency high-density configuration message from a BS for an active BWP A. At operation 2104, a UE sends CSI reports to a BS for an active BWP A. At operation 2105, a UE receives an RS frequency low-density configuration message from a BS for an inactive BWP B. At operation 2106, a UE sends CSI reports to a BS for an inactive BWP B. At operation 2107, a UE sends assistance information to a BS; the assistance information can include a recommendation for BWP switching. At operation 2108, a UE receives a BWP switching command message from a BS. In on example, this command can correspond to a BWP switch from BWP A to BWP B.

Figure 22:
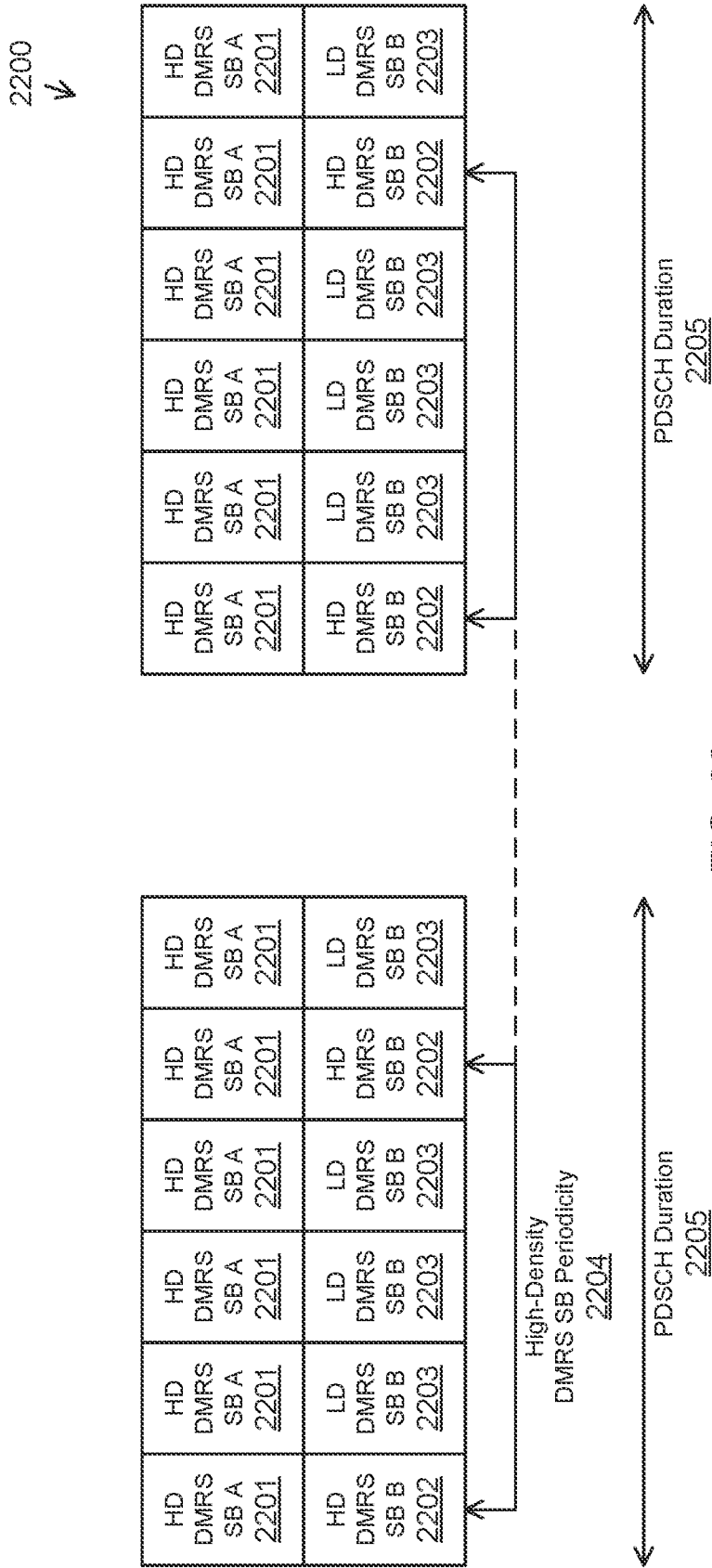
FIG. 22 illustrates an example of RS frequency density adaptation according to various embodiments of this disclosure.

FIG. 22 illustrates an example of RS frequency density adaptation according to various embodiments of this disclosure. The embodiment of FIG. 22 is for illustration only. Other embodiments could be used without departing from the scope of this disclosure.

In 5G NR, a slot consists of 14 OFDM symbols. For example, in the frequency domain, a "frequency resource" can correspond to a subcarrier, a resource block, a sub-band, etc. An example 2200 of RS frequency density adaptation is shown in FIG. 22, where the rectangles represent slots, and each slot contains multiple SBs. Within a slot and an SB, a certain number of subcarriers can contain DMRS; the ratio of that number to the total number of subcarriers in that SB can represent the DMRS frequency density. In this example, for a given SB B, slots 2202 with a high DMRS frequency density can be configured with a certain periodicity 2204; other slots 2203 within the duration 2205 of a PDSCH transmission can be configured with a low DMRS frequency density. For another SB A, every slot 2201 has a high DMRS frequency density.

In one embodiment, a BS can configure a UE with a DMRS temporal density via PDCCH signaling. In another example, a BS can configure a UE with a DMRS temporal density via RRC configuration. TABLE 4 is an example of defining an information element (IE) DMRS-DownlinkConfigH to configure DMRS with a high temporal density. In this example, for each SB, highDensity determines whether a high frequency density is utilized. If a high frequency density is utilized for a given SB, then the corresponding DMRS pattern can be configured to be periodic, semi-persistent, or aperiodic. A distinct high frequency density can be defined for each SB via timeFreqAllocation, where DMRS-Sym represents a tuple of (OFDM symbol index, frequency density) values; one tuple is specified for each OFDM symbol in a slot. Similarly, an IE DMRS-DownlinkConfigL can be defined to configure DMRS with a low frequency density. These IEs can facilitate switching between DMRS patterns with high and low frequency densities for a given SB in consecutive slots. For example, for a given SB, if a DMRS pattern with a high frequency density is configured to be periodic, then a UE can expect to receive that pattern in certain slots. In other slots for a given SB within the duration of a PDSCH transmission, a UE can expect to receive a DMRS pattern with low frequency density, assuming that pattern has been configured to be semi-persistent.

TABLE 4

An example of IE DMRS-DownlinkConfigH to configure DMRS with a high frequency density

| | |
|---|---|
| DMRS-DownlinkConfigH ::= | SEQUENCE { |
| dmrs-Type | ENUMERATED {type2} OPTIONAL, -- Need S |
| ..., | |
| highDensity | SEQUENCE (SIZE(1..numSubBands)) OF BOOLEAN |
| resourceType | SEQUENCE (SIZE(1..numSubBands)) OF CHOICE { |
| aperiodic | SEQUENCE { |
| slotOffset | INTEGER (1...32) OPTIONAL, -- Need S |
| }, | |
| semi-persistent | SEQUENCE { |
| slotOffset | INTEGER (1...32) OPTIONAL, -- Need S |
| periodicity | INTEGER (1...maxPeriodicity) OPTIONAL, -- Need S |
| }, | |
| periodic | SEQUENCE { |
| slotOffset | INTEGER (1...32) OPTIONAL, Need S |
| periodicity | INTEGER (1...maxPeriodicity) OPTIONAL, -- Need S |
| } | |
| }, | |
| timeFreqAllocation | SEQUENCE (SIZE(1..numSubBands) ) OF DMRS-Slot, |
| DMRS-Slot ::= | SEQUENCE (SIZE (1..numSymInSlot) ) OF DMRS-Sym |
| DMRS-Sym ::= | SEQUENCE { |
| SymIndex | INTEGER (1.. 32) OPTIONAL, -- NEED S |
| FreqDensity | INTEGER (1..numHighDensity) OPTIONAL, -- NEED S |
| } | |
| } | |

In another embodiment, a BS can configure a UE with a CSI-RS frequency density via RRC configuration. TABLE 5 is an example of modifying an IE CSI-RS-ResourceMapping to configure the frequency density of CSI-RS. In this example, densityH and densityL represent pre-defined frequency density values (in addition to the values of 0.5, 1, and 3 that have already been defined in this IE); one frequency density value is specified for each SB. This IE can facilitate switching between CSI-RS patterns with high and low frequency densities for a given SB in consecutive slots, as the information is contained in an IE NZP-CSI-RS-Resource. An NZP-CSI-RS-Resource IE can configure a CSI-RS pattern to be periodic, semi-persistent, or aperiodic. For example, for a given SB, if a CSI-RS pattern with high frequency density is configured to be periodic, then a UE can expect to receive that pattern in certain slots. In other slots, for a given SB, a UE can expect to receive a CSI-RS pattern with low frequency density, assuming that pattern has been configured to be semi-persistent. For example, in the frequency domain, a "frequency resource" can correspond to a subcarrier, a resource block, a sub-band, etc.

TABLE 5

An example of IE CSI-RS-ResourceMapping modification to configure CSI-RS frequency density

```
CSI-RS-ResourceMapping ::=         SEQUENCE {
    frequencyDomainAllocation          CHOICE {
        row1                               BIT STRING (SIZE (4)),
        row2                               BIT STRING (SIZE (12)),
        row4                               BIT STRING (SIZE (3)),
        other                              BIT STRING (SIZE (6))
    },
    nrofPorts                          ENUMERATED
        (p1,p2,p4,p8,p12,p16,p24,p32},
    firstOFDMSymbolInTimeDomain            INTEGER (0..13),
    firstOFDMSymbolInTimeDomain2   INTEGER (2 .. 12) OPTIONAL, -- Need R
    cdm-Type                       ENUMERATED { noCDM, fd-CDM2, cdm4-FD2-
        TD2, cdm8-FD2-TD4},
    csi-rsDensity                      SEQUENCE   (SIZE (1..numSubBands) )
        OF CHOICE {
        dot5                               ENUMERATED (evenPRBs, oddPRBs) ,
        one                                NULL,
        three                              NULL,
        densityH                           NULL,
        densityL                           NULL,
        spare                              NULL
    },
    ...
}
```

In another embodiment, a BS can configure a UE with DMRS frequency density hopping via RRC configuration. TABLE 6 is an example of defining IEs DMRS-DownlinkConfigH and DMRS-DownlinkConfigL to configure DMRS frequency density hopping. For DMRS-DownlinkConfigH, frequencyHopping, if present, determines whether a particular high-density DMRS pattern hops within a slot or between slots; frequencyHoppingOffset, if present, determines the hopping pattern of this high-density DMRS pattern across the available SBs. For DMRS-DownlinkConfigL, useDensityHHopping and useDensityHHoppingOffset, if present, are set to the same value as frequencyHopping and frequencyHoppingOffset, respectively, in DMRS-DownlinkConfigH. If a hopping pattern of a high-density DMRS pattern is enabled, then the UE can use this hopping pattern to determine the DMRS density within a particular SB for a particular slot.

TABLE 6

An example of IE DMRS-DownlinkConfig modification to configure DMRS frequency density hopping

```
DMRS-DownlinkConfigH ::=           SEQUENCE {
    dmrs-Type                          ENUMERATED (type2) OPTIONAL, -- Need S
    ...,
    frequencyHopping                   ENUMERATED   (intraSlot,  interSlot)
        OPTIONAL, -- Need S
    frequencyHoppingOffset             SEQUENCE (SIZE(1..numHops)) OF INTEGER
        (1..numSubBands) OPTIONAL, -- Need M
    timeFreqAllocation ::=             SEQUENCE   (SIZE (1..numHops) ) OF
        DMRS-Sym
    DMRS-Sym :: =                      SEQUENCE {
```

TABLE 6-continued

An example of IE DMRS-DownlinkConfig modification to configure
DMRS frequency density hopping

```
        SymIndex                    INTEGER (1..32) OPTIONAL, -- Need
        S
        FreqDensity                 INTEGER      (1..numHighDensity)
            OPTIONAL, -- Need S
        }
    }
}
DMRS-DownlinkConfigL ::=    SEQUENCE {
    dmrs Type                       ENUMERATED (type2) OPTIONAL, -- Need S
...,
    useDensityHHopping              ENUMERATED (intraSlot, interSlot)
        OPTIONAL, -- Need S
    useDensityHHoppingOffset        SEQUENCE (SIZE (1..numHops) ) OF INTEGER
        (1..numSubBands) OPTIONAL, --Need M
    timeFreqAllocation ::=          SEQUENCE   (SIZE (1..numSymInSlot)) OF
        DMRS-Sym
    DMRS-Sym :: =               SEQUENCE {
        SymIndex                    INTEGER (1..32) OPTIONAL, -- Need
        S
        FreqDensity                 INTEGER      (1..numHighDensity)
            OPTIONAL, -- Need S
    }
}
```

In another embodiment, a BS can configure a UE with CSI-RS frequency density hopping via RRC configuration. TABLE 7 is an example of defining IEs CSI-RS-ResourceMappingH and CSI-RS-ResourceMappingL to configure CSI-RS frequency density hopping. For CSI-RS-ResourceMappingH, frequencyHopping, if present, determines whether a particular high-density CSI-RS pattern hops within a slot or between slots; frequencyHoppingOffset, if present, determines the hopping pattern of this high-density CSI-RS pattern across the available SBs. For CSI-RS-ResourceMappingL, useDensityHHopping and useDensityHHoppingOffset, if present, are set to the same value as frequencyHopping and frequencyHoppingOffset, respectively, in CSI-RS-ResourceMappingH. If a hopping pattern of a high-density CSI-RS pattern is enabled, then the UE can use this hopping pattern to determine the CSI-RS density within a particular SB for a particular slot.

TABLE 7

An example of IE CSI-RS-ResourceMapping modification to configure CSI-RS
frequency density hopping

```
CSI-RS-ResourceMappingH ::=  SEQUENCE {
    frequencyDomainAllocation       CHOICE {
        row1                        BIT STRING (SIZE (4)) ,
        row2                        BIT STRING (SIZE (12)) ,
        row4                        BIT STRING (SIZE (3)) ,
        other                       BIT STRING (SIZE (6))
    }
    frequencyHopping                ENUMERATED    (intraSlot,   interSlot)
        OPTIONAL, -- Need S
    frequencyHoppingOffset SEQUENCE (SIZE(1..numHops)) OF   INTEGER
        (1..numSubBands) OPTIONAL, -- Need M
    ...
}
CSI-RS-ResourceMappingL ::=  SEQUENCE {
    frequencyDomainAllocation       CHOICE {
        row1                        BIT STRING (SIZE (4)),
        row2                        BIT STRING (SIZE (12)),
        row4                        BIT STRING (SIZE (3)),
        other                       BIT STRING (SIZE (6))
    },
    useDensityHHopping              ENUMERATED    (intraSlot,   interSlot)
        OPTIONAL, -- Need S
    useDensityHHoppingOffset        SEQUENCE (SIZE (1..numHops) ) OF INTEGER
        (1..numSubBands) OPTIONAL, -- Need M
    ...
}
```

As another example, a BS can configure a UE to (at least temporarily) disable DMRS in certain SBs for subsequent slots. TABLE 8 is an example of modifying an IE DMRS-DownlinkConfig to disable DMRS in certain SBs for subsequent slots. In another example, a new DCI format can be defined to support DMRS frequency disabling. For this DCI format, the CRC can be scrambled by the C-RNTI of this UE. This DCI format can consist of a set of tuples (DMRS frequency disabling indication, SB index) for this UE, where one tuple is included for each SB.

TABLE 8

An example of IE DMRS-DownlinkConfig modification to support DMRS frequency disabling

| DMRS-DownlinkConfig ::= | SEQUENCE { |
|---|---|
| dmrs-Type | ENUMERATED (type2) OPTIONAL, -- Need S |
| dmrs-AdditionalPosition -- Need S | ENUMERATED (pos0, pos1, pos3) OPTIONAL, |
| maxLength | ENUMERATED (len2) OPTIONAL, -- Need S |
| scramblingID0 | INTEGER (0..65535) OPTIONAL, -- Need S |
| scramblingID1 | INTEGER (0..65535) OPTIONAL, -- Need S |
| phaseTrackingRS OPTIONAL, -- Need M | SetupRelease PTRS-DownlinkConfig |
| ..., | |
| dmrsDisable BOOLEAN, } | SEQUENCE (SIZE (1..numSubBands)) OF |

In one embodiment, a new MAC CE can be defined for the UE assistance information report. This MAC CE can be identified by a MAC subheader with a logical channel ID that can be specified in Table 6.2.1-2 in [3]. This MAC CE can have a variable size and consist of the following fields:

Block Error Rate: This field indicates the observed block error rate of the UE, e.g. the block error rate that has been computed over the last 1000 received transport blocks.

Throughput: This field indicates the observed throughput of the UE, e.g. the throughput in megabits/second that has been computed over the last 1000 received transport blocks.

UE Speed: This field indicates the UE's measurement of its speed in meters/second.

1UE Acceleration: This field indicates the UE's measurement of its acceleration in meters/(second*second).

IR1: This field indicates the presence of the octet(s) containing the Recommended RS Frequency Density field. If the IR1 field is set to 1, the octet(s) containing the Recommended RS Frequency Density field is (are) present. If the IR1 field is set to 0, the octet(s) containing the Recommended RS Frequency Density field is (are) not present.

Recommended RS Frequency Density: This field indicates, for each SB, the UE's recommended RS frequency density, e.g. an index to a table of RS frequency density values.

If the recommended RS frequency density is equal to 0 for a given SB, then this message can function as a recommendation for RS frequency disabling for that SB.

IR2: This field indicates the presence of the octet containing the Recommended BWP field. If the IR2 field is set to 1, the octet containing the Recommended BWP field is present. If the IR2 field is set to 0, the octet containing the Recommended BWP field is not present.

Recommended BWP: This field indicates the UE's recommended active BWP, e.g. an index to a table of BWPs.

Figure 23:
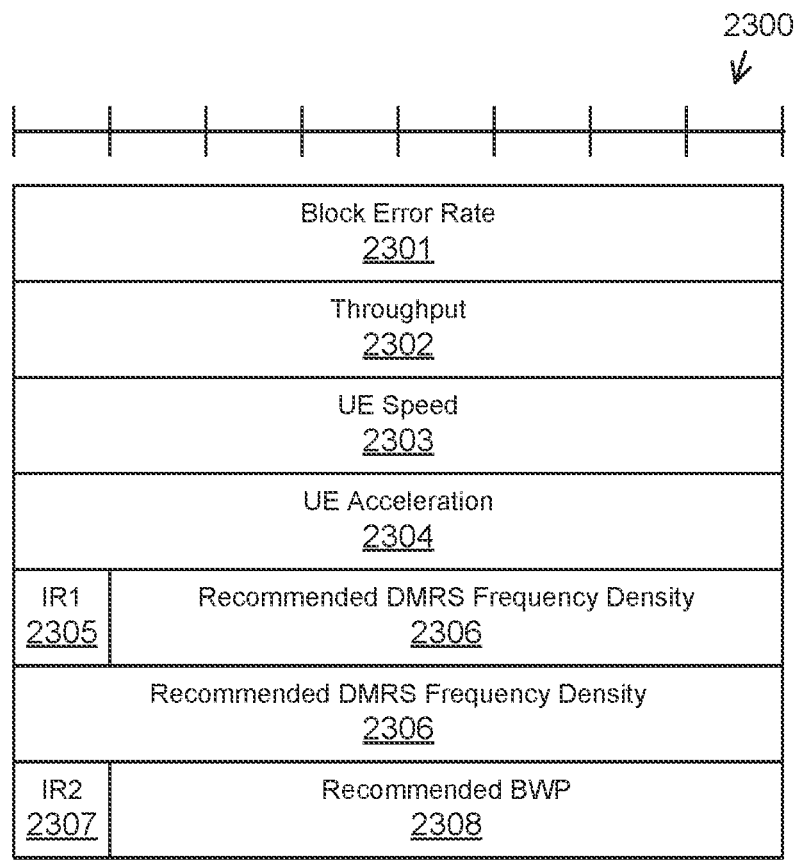
FIG. 23 illustrates an example of a new MAC CE for the UE assistance information report according to various embodiments of this disclosure.

FIG. 23 illustrates an example of a new MAC CE for the UE assistance information report according to various embodiments of this disclosure. The embodiment of FIG. 23 is for illustration only. Other embodiments could be used without departing from the scope of this disclosure.

FIG. 23 shows an example of a new MAC CE 2300 for the UE assistance information report, where the Block Error Rate field 2301, the UE Throughput field 2302, the UE Speed field 2303, and the UE Acceleration field 2304 each have a length of 8 bits. The Recommended RS Frequency Density field 2306 has a length of 15 bits for two SBs. The Recommended BWP field 2308 has a length of 7 bits.

In one embodiment, a new MAC CE can be defined for the RS frequency high-density fallback request. This MAC CE can be identified by a MAC subheader with a logical channel ID that can be specified in Table 6.2.1-2 in [3]. This MAC CE can have a variable size and consist of the following field (with one entry for each SB):

DMRS Frequency High-Density Fallback: This field indicates that the UE is requesting that the BS fall back to a DMRS frequency high-density pattern for a given SB, e.g. the index of that pattern in a table of DMRS frequency density values.

Figure 24:
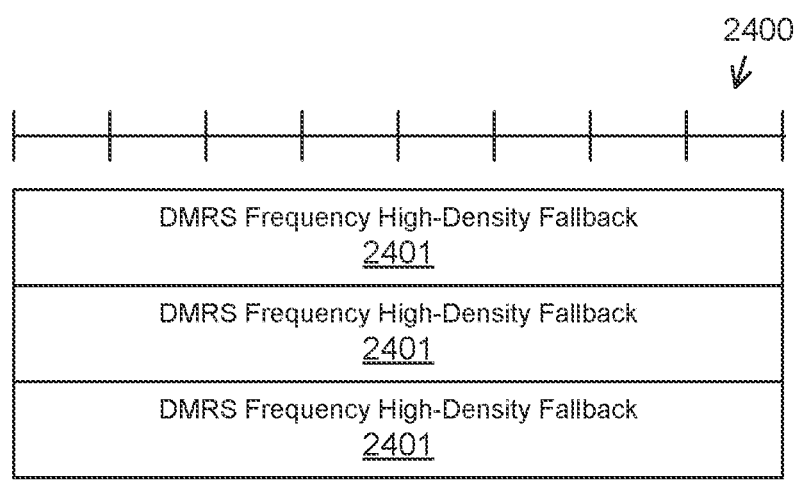
FIG. 24 illustrates an example of a new MAC CE for the RS frequency high-density fallback request according to various embodiments of this disclosure.

FIG. 24 illustrates an example of a new MAC CE for the RS frequency high-density fallback request according to various embodiments of this disclosure. The embodiment of FIG. 24 is for illustration only. Other embodiments could be used without departing from the scope of this disclosure.

FIG. 24 shows an example of a new MAC CE 2400 for the RS frequency high-density fallback request, where the DMRS Frequency High-Density Fallback field has a length of 24 bits for three SBs.

Figure 25:
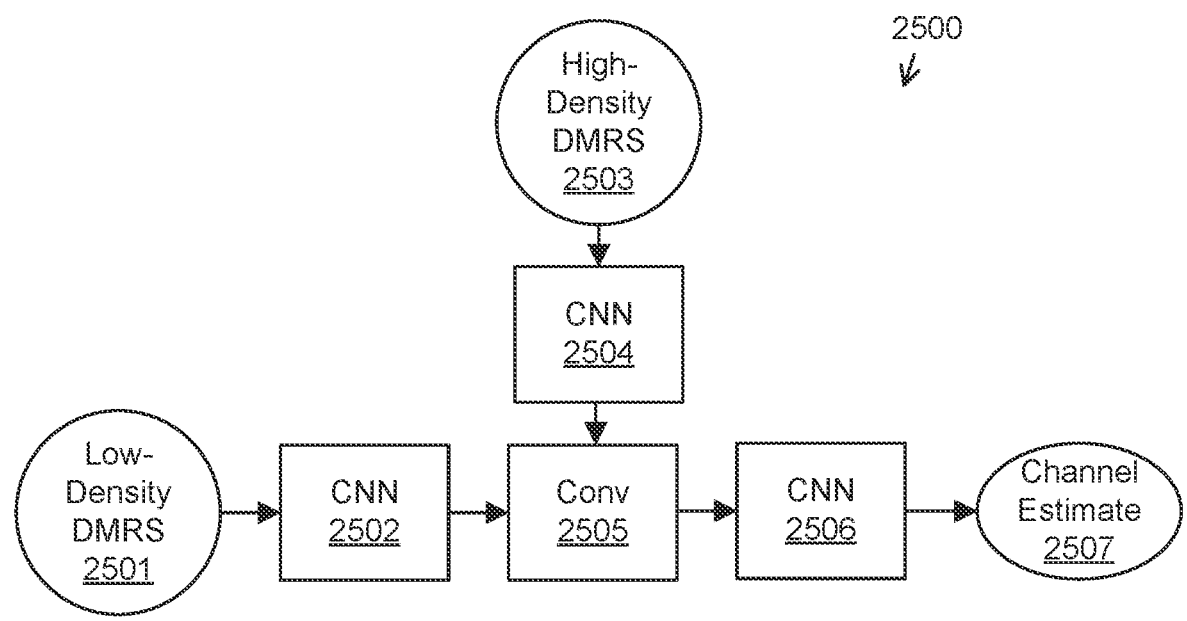
FIG. 25 illustrates an example of an AI/ML model architecture to support RS frequency density adaptation according to various embodiments of this disclosure.

FIG. 25 illustrates an example of an AI/ML model architecture to support RS frequency density adaptation according to various embodiments of this disclosure. The embodiment of FIG. 25 is for illustration only. Other embodiments could be used without departing from the scope of this disclosure.

FIG. 25 shows an example of an AI/ML model architecture 2500 that can support RS frequency density adaptation. In this example, a DMRS low-density pattern 2501 in one SB A is provided as input to a CNN 2502. A DMRS high-density pattern 2503 in another SB B, which serves as auxiliary information [6] to this model, is provided as input to another CNN 2504. The outputs of these two CNNs 2502, 2504 are then convolved (block 2505), and the output of that convolution is provided as input to another CNN 2506, which infers a channel estimate 2507 in SB A. For SBs A and B, all REs that do not contain DMRS are filled with zeros.

Examples of inputs to an AI/ML model that can support RS frequency density adaptation include:
- Full two-dimensional received channel over all subcarriers and OFDM symbols for one slot and one SB A.
  - All REs that do not contain RS are filled with zeros.
- Ground truth of full two-dimensional channel over all subcarriers and OFDM symbols for one slot and one SB A.
  - This can be a training label.
- Auxiliary information:
  - Full two-dimensional received channel over all subcarriers and OFDM symbols for one slot and another SB B.
    - All REs that do not contain RS are filled with zeros
  - UE speed.
  - UE trajectory.
  - UE location.
  - Coherence time.
  - Coherence bandwidth.
  - Delay spread.
  - Doppler spread.
  - Block error rate.
  - Throughput.

Examples of outputs from an AI/ML model that can support RS frequency density adaptation include:
- Full two-dimensional estimated channel over all subcarriers and OFDM symbols for one slot and one SB A.
- Value of (inferred) RS frequency density for SB A.

It may be advantageous to vary the spatial density of the RS pattern based on the statistics of an underlying randomly-varying wireless channel. For example, if the channel selectivity in space decreases, then decreasing the spatial density of the RS pattern could have a negligible effect on the CSI estimation error—while reducing the signaling overhead. As another example, if the channel is static over space, then RS signaling can be (at least temporarily) disabled for certain antenna ports, assuming that the receiver can estimate the channel for at least one other antenna port.

5G NR supports flexibility in the selection of an RS pattern, where the selection of an RS pattern is based on the statistics of the underlying randomly-varying wireless channel. For example, the parameter dmrs-AdditionalPosition can be used to increase the number of DMRS in a given slot in high-mobility scenarios. As another example, the parameters periodicityAndOffset-p and periodicityAndOffset-sp can be used to vary the periodicity (and slot offset) of SRS. The details of the algorithm for selecting an RS pattern are typically left to the network.

The present disclosure describes a framework for supporting AI/ML techniques for RS spatial density adaptation based on the statistics of the underlying randomly-varying wireless channel. The corresponding signaling details are discussed in this disclosure.

This disclosure addresses the issue that RS spatial density adaptation is currently left up to network implementation. This disclosure provides methods that the network can use to configure the spatial density of an RS pattern using AI/ML-based solutions. This disclosure also provides a framework for adapting the spatial density of an RS pattern based on UE inference and information.

Details on the support of AI/ML techniques for RS spatial density adaptation are disclosed, including information elements to be exchanged between a transmitter and a receiver.

Figure 26:
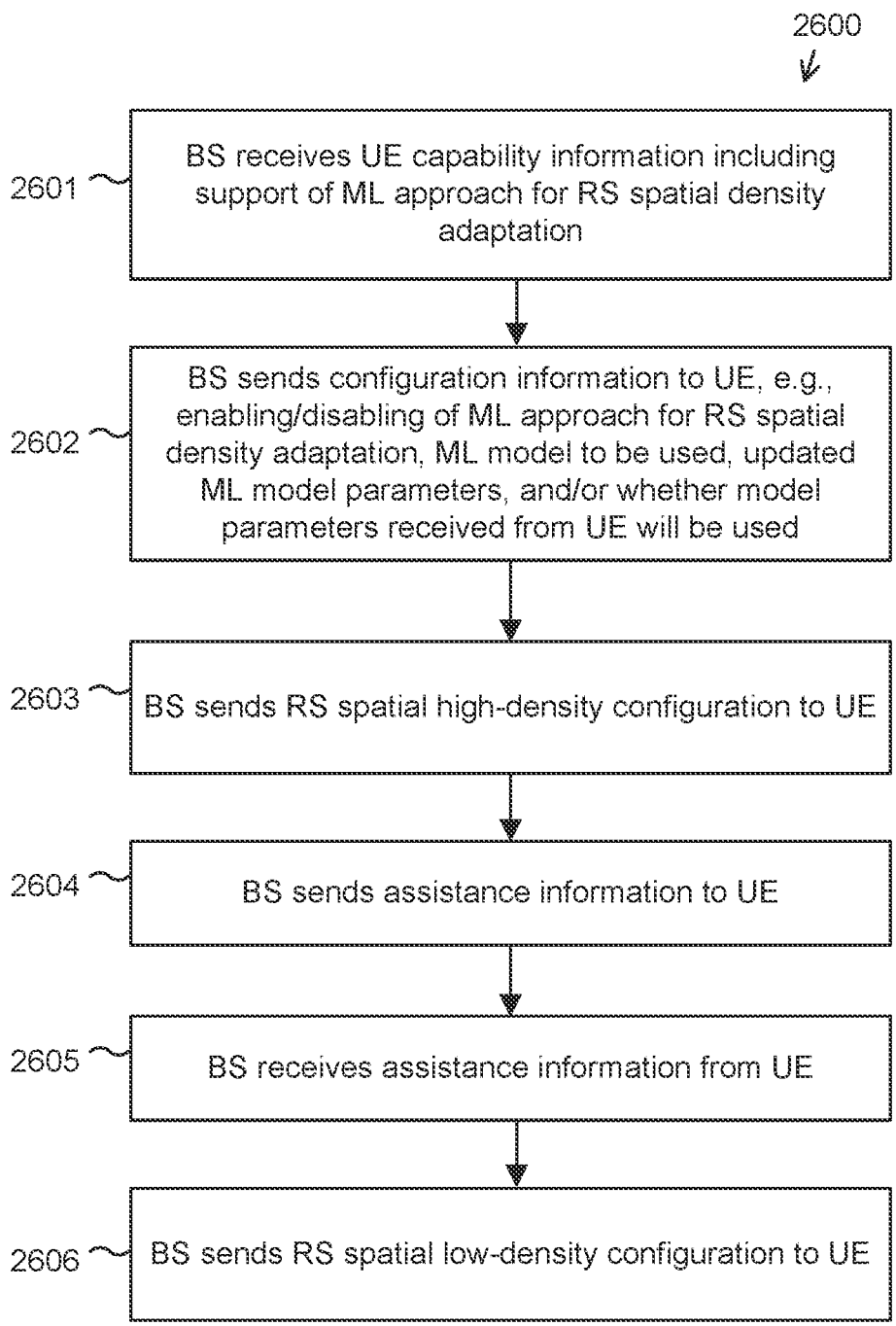
FIG. 26 illustrates a high-level flowchart for an example of BS operation to support RS spatial density adaptation according to various embodiments of this disclosure.

FIG. 26 illustrates a high-level flowchart for an example of BS operation to support RS spatial density adaptation according to various embodiments of this disclosure. The embodiment of FIG. 26 is for illustration only. Other embodiments of the process 2600 could be used without departing from the scope of this disclosure.

FIG. 26 is an example of a method 2600 for operations at a BS to support AI/ML techniques for RS spatial density adaptation. At operation 2601, a BS receives UE capability information from a UE, including the support of an ML approach for RS spatial density adaptation. At operation 2602, a BS sends configuration information to a UE, which can include ML-related configuration information such as enabling/disabling of an ML approach for RS spatial density adaptation, an ML model to be used, trained model parameters, and/or whether model parameter updates reported by a UE will be used or not. At operation 2603, a BS sends an RS spatial high-density configuration message to a UE. In one example, this message can correspond to one antenna port A. At operation 2604, a BS sends assistance information to a UE; the assistance information can include beamforming information, which will be described below. At operation 2605, a BS receives assistance information from a UE; the assistance information can include a recommended RS spatial density for a second antenna port B. At operation 2606, a BS sends an RS spatial low-density configuration message to a UE. In one example, this message can correspond to antenna port B.

Figure 27:
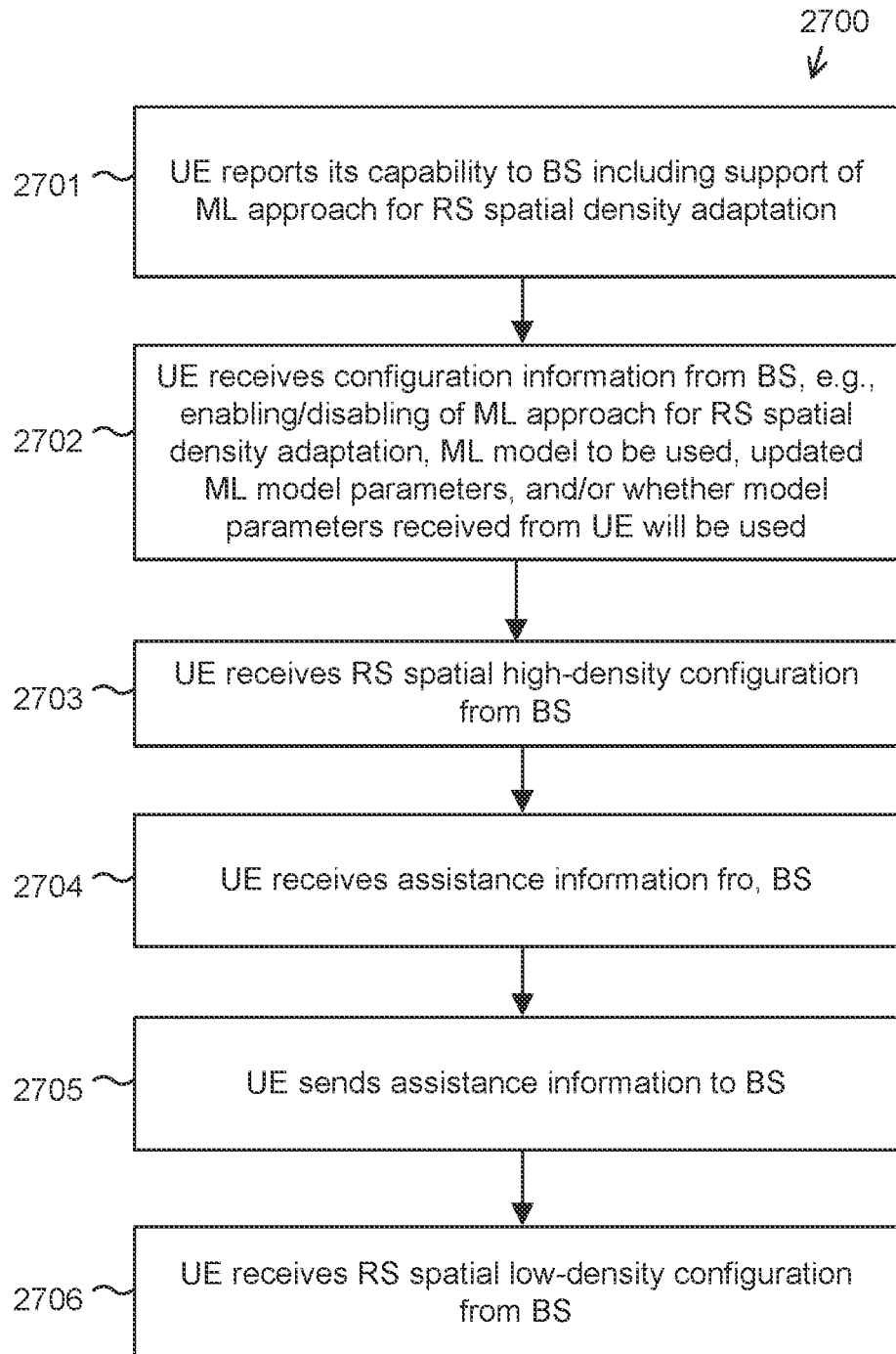
FIG. 27 illustrates a high-level flowchart for an example of UE operation to support RS spatial density adaptation according to various embodiments of this disclosure.

FIG. 27 illustrates a high-level flowchart for an example of UE operation to support RS spatial density adaptation according to various embodiments of this disclosure. The embodiment of FIG. 27 is for illustration only. Other embodiments of the process 2700 could be used without departing from the scope of this disclosure.

FIG. 27 is an example of a method 2700 for operations at a UE to support AI/ML techniques for RS spatial density adaptation. At operation 2701, a UE reports capability information to a BS, including the support of an ML approach for RS spatial density adaptation. At operation 2702, a UE receives configuration information from a BS, which can include ML-related configuration information such as enabling/disabling of an ML approach for RS spatial density adaptation, an ML model to be used, trained model parameters, and/or whether model parameter updates reported by a UE will be used or not. At operation 2703, a UE receives an RS spatial high-density configuration message from a BS. In one example, this message can correspond to one antenna port A. At operation 2704, a UE receives assistance information from a BS; the assistance information can include beamforming information, which will be described below. At operation 2705, a UE sends assistance information to a BS; the assistance information can include a recommended RS spatial density for a second antenna port B. At operation 2706, a UE receives an RS spatial low-density configuration message from a BS. In one example, this message can correspond to antenna port B.

Figure 28:
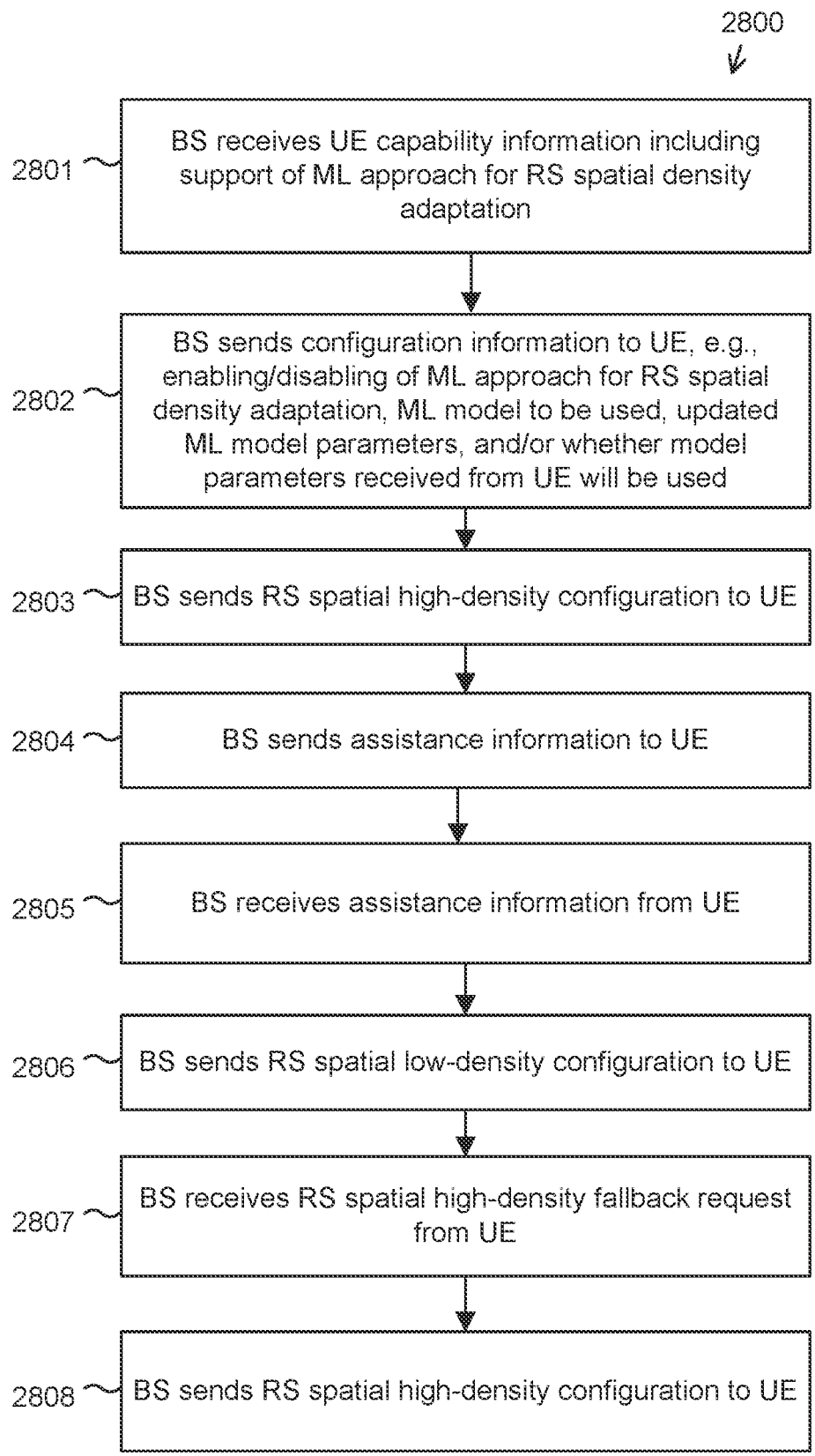
FIG. 28 illustrates a high-level flowchart for an example of BS operation to support fallback to an RS spatial high-density configuration according to various embodiments of this disclosure.

FIG. 28 illustrates a high-level flowchart for an example of BS operation to support fallback to an RS spatial high-density configuration according to various embodiments of this disclosure. The embodiment of FIG. 28 is for illustration only. Other embodiments of the process 2800 could be used without departing from the scope of this disclosure.

FIG. 28 is an example of a method 2800 for operations at a BS to support a request to fall back from an RS spatial low-density pattern to an RS spatial high-density pattern. At operation 2801, a BS receives UE capability information from a UE, including the support of an ML approach for RS spatial density adaptation. At operation 2802, a BS sends configuration information to a UE, which can include ML-related configuration information such as enabling/disabling of an ML approach for RS spatial density adaptation, an ML model to be used, trained model parameters, and/or whether model parameter updates reported by a UE will be used or not. At operation 2803, a BS sends an RS spatial high-density configuration message to a UE. In one example, this message can correspond to one antenna port A. At operation 2804, a BS sends assistance information to a UE; the assistance information can include beamforming information, which will be described below. At operation 2805, a BS receives assistance information from a UE; the assistance information can include a recommended RS spatial density for a second antenna port B. At operation 2806, a BS sends an RS spatial low-density configuration message to a UE. In one example, this message can correspond to antenna port B. At operation 2807, a BS receives a request from a UE to fall back to an RS spatial high-density pattern. At operation 2808, a BS sends an RS spatial high-density configuration message to a UE. In one example, this message can correspond to antenna port B.

Figure 29:
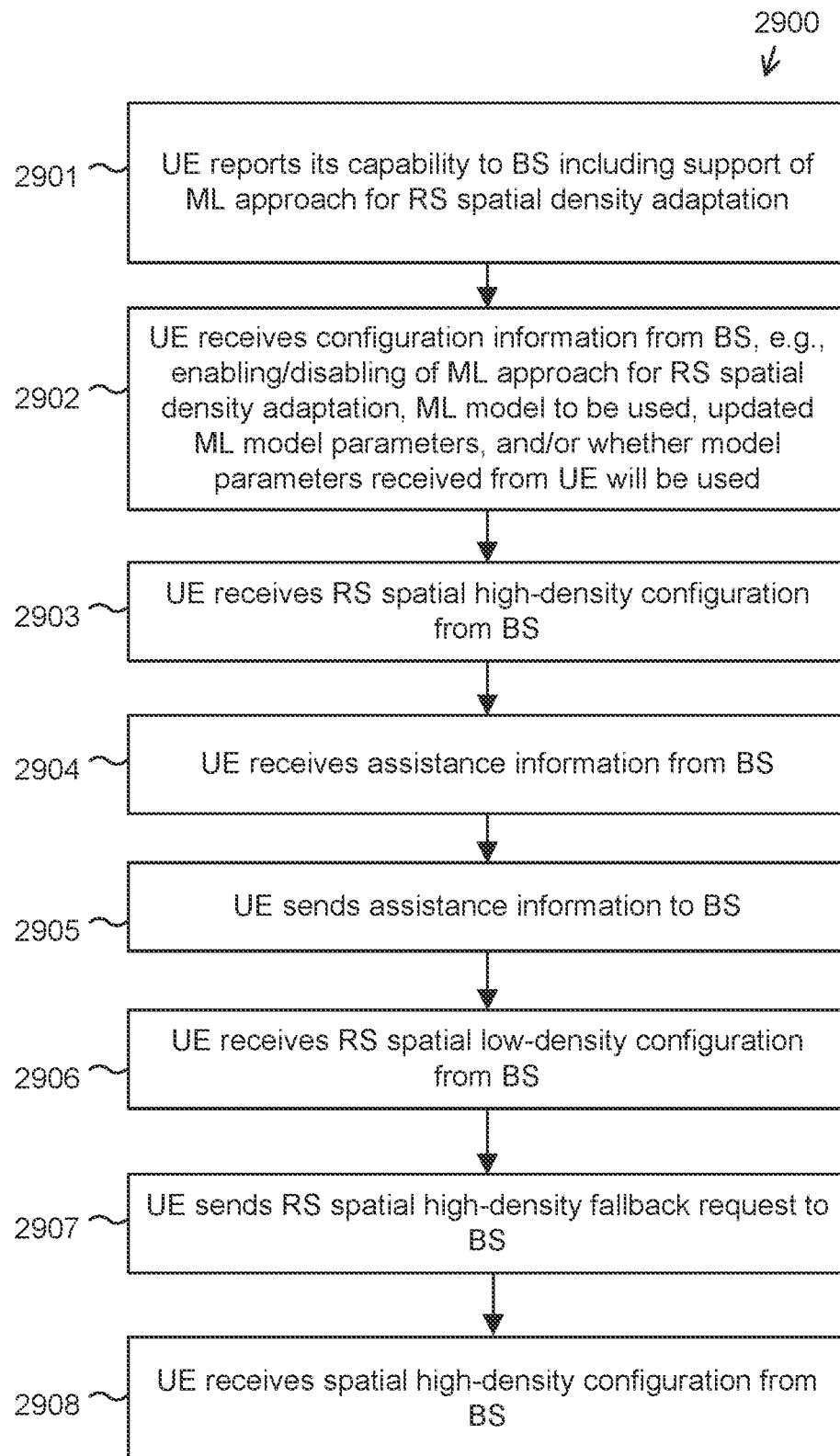
FIG. 29 illustrates a high-level flowchart for an example of UE operation to support fallback to an RS spatial high-density configuration according to various embodiments of this disclosure.

FIG. 29 illustrates a high-level flowchart for an example of UE operation to support fallback to an RS spatial high-density configuration according to various embodiments of this disclosure. The embodiment of FIG. 29 is for illustration only. Other embodiments of the process 2900 could be used without departing from the scope of this disclosure.

FIG. 29 is an example of a method 2900 for operations at a UE to support a request to fall back from an RS spatial low-density pattern to an RS spatial high-density pattern. At operation 2901, a UE reports capability information to a BS, including the support of an ML approach for RS spatial density adaptation. At operation 2902, a UE receives configuration information from a BS, which can include ML-related configuration information such as enabling/disabling of an ML approach for RS spatial density adaptation, an ML model to be used, trained model parameters, and/or whether model parameter updates reported by a UE will be used or not. At operation 2903, a UE receives an RS spatial high-density configuration message from a BS. In one example, this message can correspond to one antenna port A. At operation 2904, a UE receives assistance information from a BS; the assistance information can include beamforming information, which will be described below. At operation 2905, a UE sends assistance information to a BS; the assistance information can include a recommended RS spatial density for a second antenna port B. At operation 2906, a UE receives an RS spatial low-density configuration message from a BS. In one example, this message can correspond to antenna port B. At operation 2907, a UE sends a request to a BS to fall back to an RS spatial high-density pattern. At operation 2908, a UE receives an RS spatial high-density configuration message from a BS. In one example, this message can correspond to antenna port B.

Figure 30:
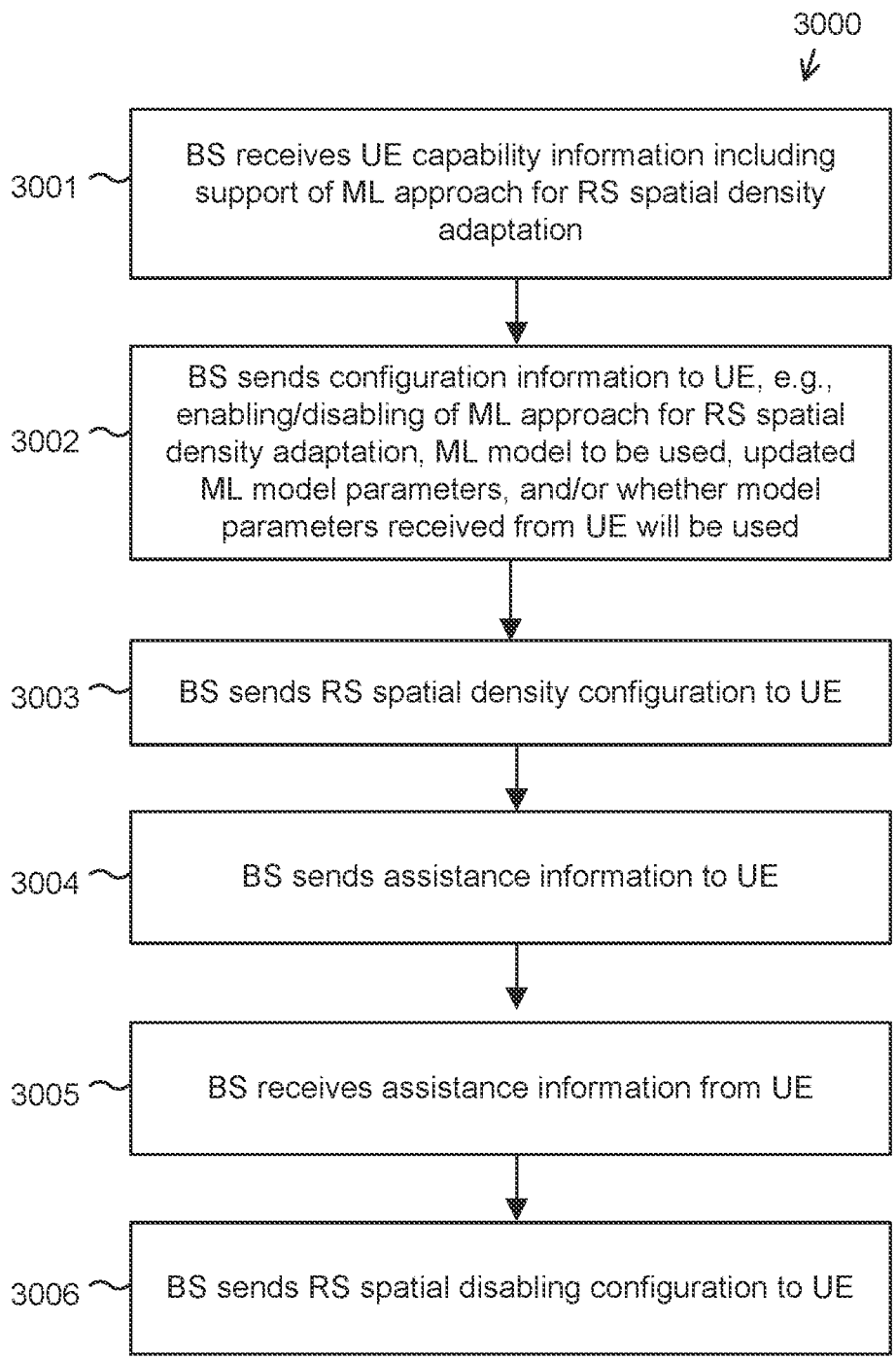
FIG. 30 illustrates a high-level flowchart for an example of BS operation to support RS spatial disabling according to various embodiments of this disclosure.

FIG. 30 illustrates a high-level flowchart for an example of BS operation to support RS spatial disabling according to various embodiments of this disclosure. The embodiment of FIG. 30 is for illustration only. Other embodiments of the process 3000 could be used without departing from the scope of this disclosure.

FIG. 30 is an example of a method 3000 for operations at a BS to support AI/ML techniques for RS spatial disabling. At operation 3001, a BS receives UE capability information from a UE, including the support of an ML approach for RS spatial density adaptation. At operation 3002, a BS sends configuration information to a UE, which can include ML-related configuration information such as enabling/disabling of an ML approach for RS spatial density adaptation, an ML model to be used, trained model parameters, and/or whether model parameter updates reported by a UE will be used or not. At operation 3003, a BS sends an RS spatial density configuration message to a UE. In one example, this message can correspond to one antenna port A. At operation 3004, a BS sends assistance information to a UE; the assistance information can include beamforming information. At operation 3005, a BS receives assistance information from a UE; the assistance information can include a recommendation for RS spatial disabling. At operation 3006, a BS sends an RS spatial disabling configuration message to a UE. In one example, this message can correspond to antenna port A.

Figure 31:
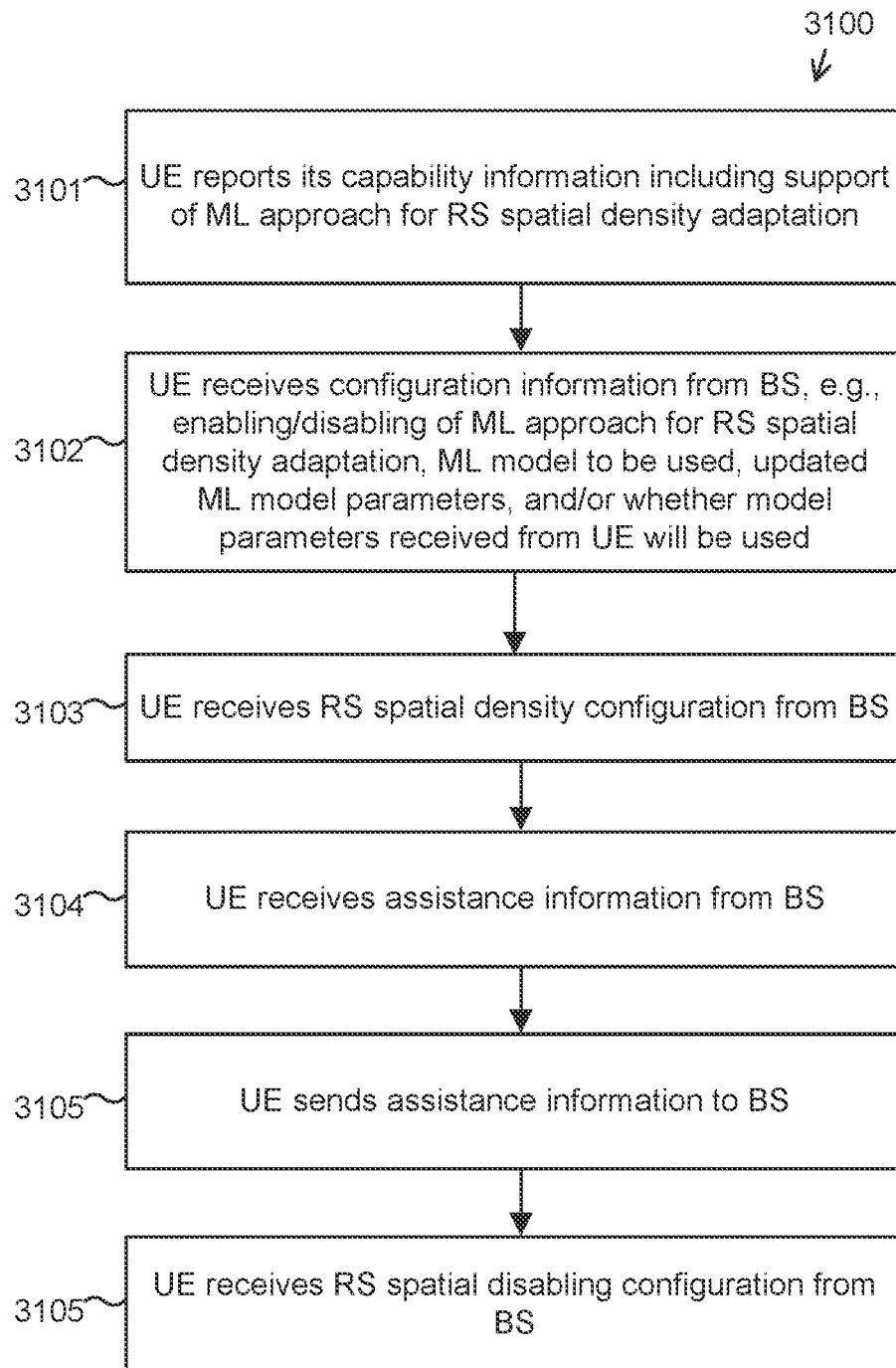
FIG. 31 illustrates a high-level flowchart for an example of UE operation to support RS spatial disabling according to various embodiments of this disclosure.

FIG. 31 illustrates a high-level flowchart for an example of UE operation to support RS spatial disabling according to various embodiments of this disclosure. The embodiment of FIG. 31 is for illustration only. Other embodiments of the process 3100 could be used without departing from the scope of this disclosure.

FIG. 31 is an example of a method 3100 for operations at a UE to support AI/ML techniques for RS spatial disabling. At operation 3101, a UE reports capability information to a BS, including the support of an ML approach for RS spatial density adaptation. At operation 3102, a UE receives configuration information from a BS, which can include ML-related configuration information such as enabling/disabling of an ML approach for RS spatial density adaptation, an ML model to be used, trained model parameters, and/or whether model parameter updates reported by a UE will be used or not. At operation 3103, a UE receives an RS spatial density configuration message from a BS. In one example, this message can correspond to one antenna port A. At operation 3104, a UE receives assistance information from a BS; the assistance information can include beamforming information. At operation 3105, a UE sends assistance information to a BS; the assistance information can include a recommendation for RS spatial disabling. At operation 3106, a UE receives an RS spatial disabling configuration message from a BS. In one example, this message can correspond to antenna port A.

Figure 32:
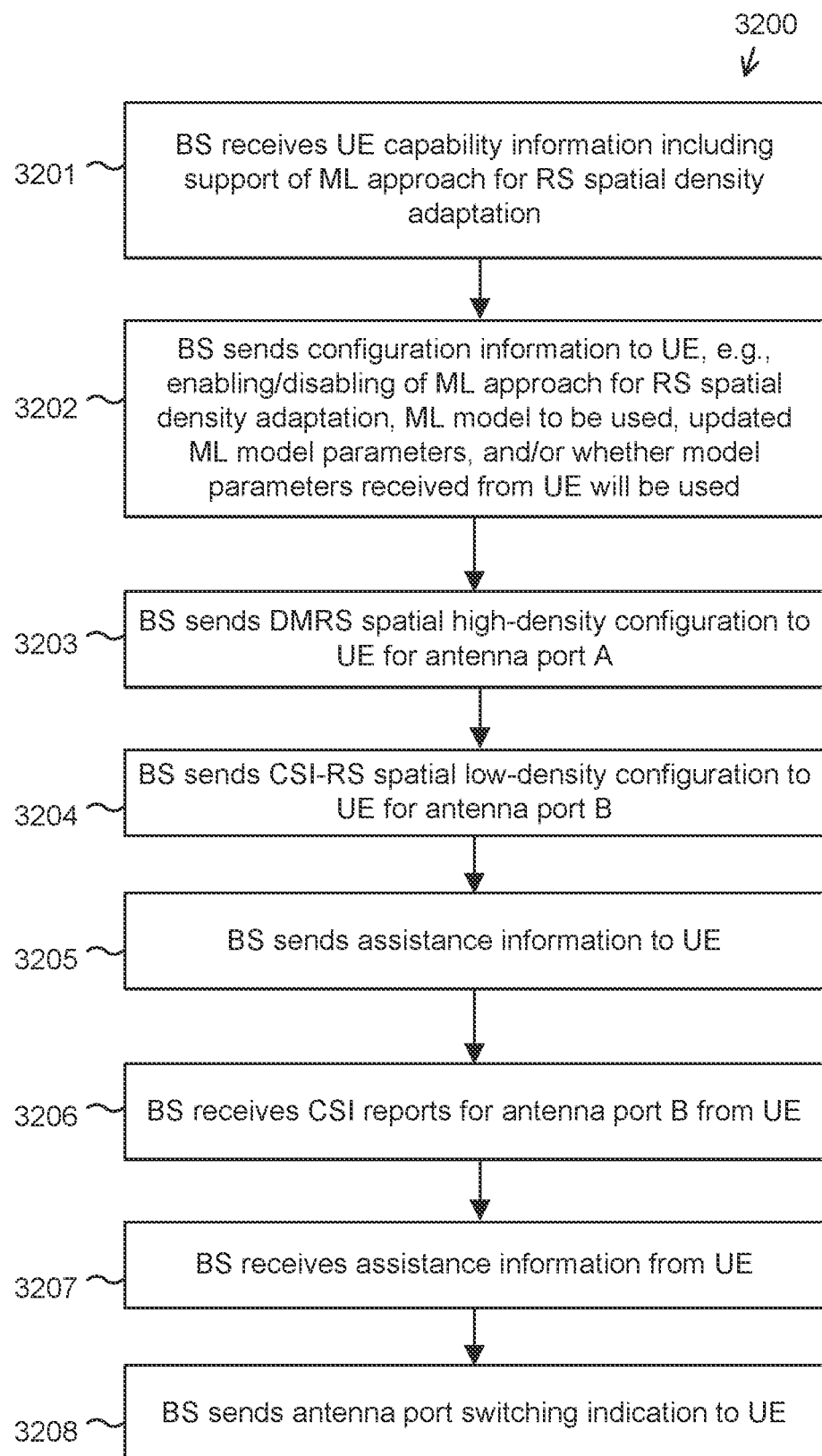
FIG. 32 illustrates a high-level flowchart for an example of BS operation to support RS spatial-based port switching according to various embodiments of this disclosure.

FIG. 32 illustrates a high-level flowchart for an example of BS operation to support RS spatial-based port switching according to various embodiments of this disclosure. The embodiment of FIG. 32 is for illustration only. Other embodiments of the process 3200 could be used without departing from the scope of this disclosure.

FIG. 32 is an example of a method 3200 for operations at a BS to support AI/ML techniques for RS spatial-based port switching. At operation 3201, a BS receives UE capability information from a UE, including the support of an ML approach for RS spatial density adaptation. At operation 3202, a BS sends configuration information to a UE, which can include ML-related configuration information such as enabling/disabling of an ML approach for RS spatial density adaptation, an ML model to be used, trained model parameters, and/or whether model parameter updates reported by a UE will be used or not. At operation 3203, a BS sends a DMRS spatial high-density configuration message to a UE for an antenna port A. At operation 3204, a BS sends a CSI-RS spatial low-density configuration message to a UE for an antenna port B. In one example, a BS uses antenna port A for a PDSCH transmission and does not use antenna port B for that transmission. At operation 3205, a BS sends assistance information to a UE; the assistance information can include beamforming information. At operation 3206, a BS receives CSI reports from a UE for an antenna port B. At operation 3207, a BS receives assistance information from a UE; the assistance information can include a recommendation for antenna port switching. At operation 3208, a BS sends a port switching indication to a UE. In one example, this indication can correspond to a port switch from antenna port A to antenna port B.

Figure 33:
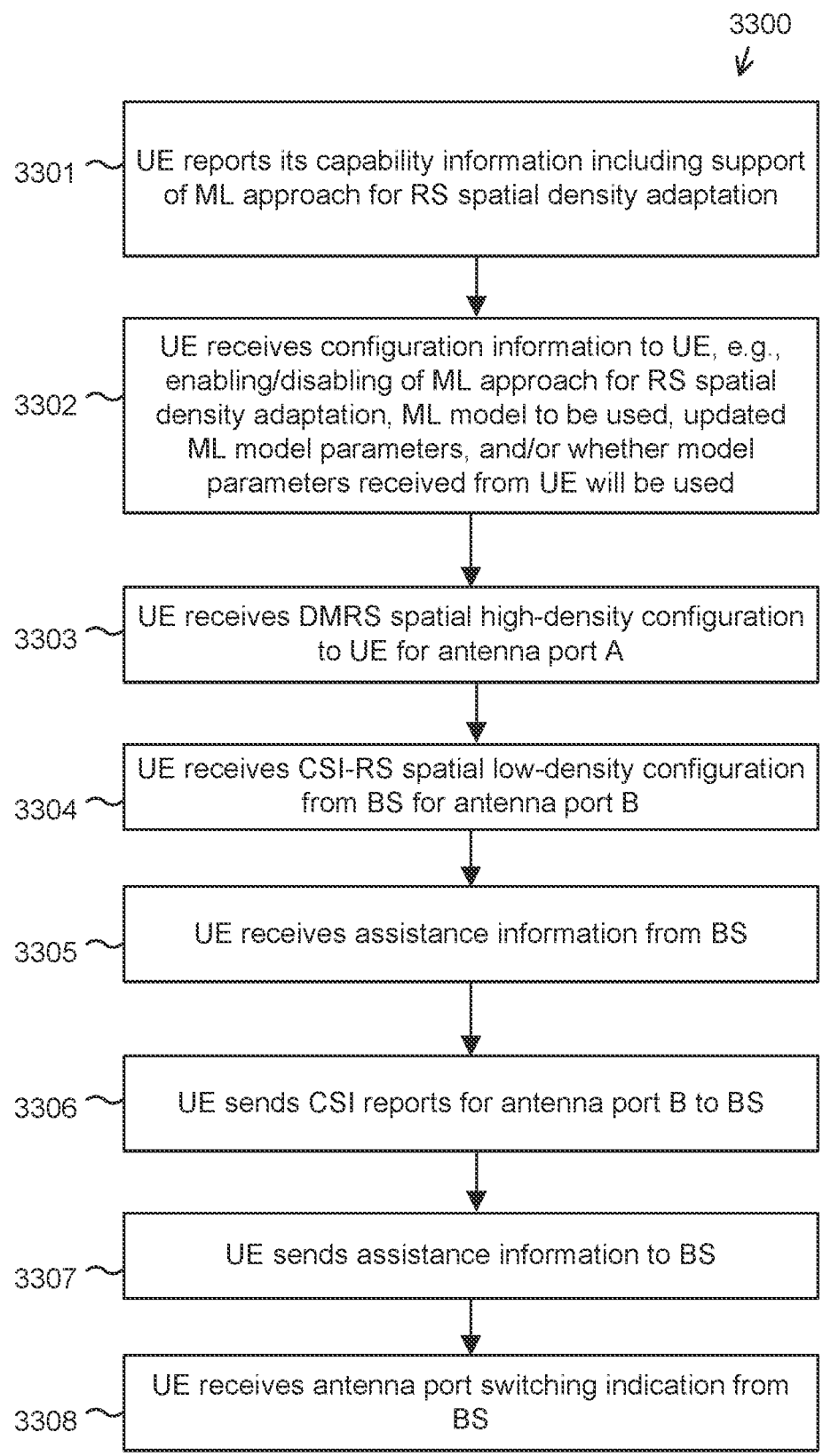
FIG. 33 illustrates a high-level flowchart for an example of UE operation to support RS spatial-based port switching according to various embodiments of this disclosure.

FIG. 33 illustrates a high-level flowchart for an example of UE operation to support RS spatial-based port switching according to various embodiments of this disclosure. The embodiment of FIG. 33 is for illustration only. Other embodiments of the process 3300 could be used without departing from the scope of this disclosure.

FIG. 33 is an example of a method 3300 for operations at a UE to support AI/ML techniques for RS spatial-based port switching. At operation 3301, a UE reports capability information to a BS, including the support of an ML approach for RS spatial density adaptation. At operation 3302, a UE receives configuration information from a BS, which can include ML-related configuration information such as enabling/disabling of an ML approach for RS spatial density adaptation, an ML model to be used, trained model parameters, and/or whether model parameter updates reported by a UE will be used or not. At operation 3303, a UE receives a DMRS spatial high-density configuration message from a BS for an antenna port A. At operation 3304, a UE receives a CSI-RS spatial low-density configuration message from a BS for an antenna port B. In one example, a BS uses antenna port A for a PDSCH transmission and does not use antenna port B for that transmission. At operation 3305, a UE receives assistance information from a BS; the assistance information can include beamforming information. At operation 3306, a UE sends CSI reports to a BS for an antenna port B. At operation 3307, a UE sends assistance information to a BS; the assistance information can include a recommendation for antenna port switching. At operation 3208, a UE receives a port switching indication from a BS. In on example, this indication can correspond to a port switch from antenna port A to antenna port B.

Figure 34:
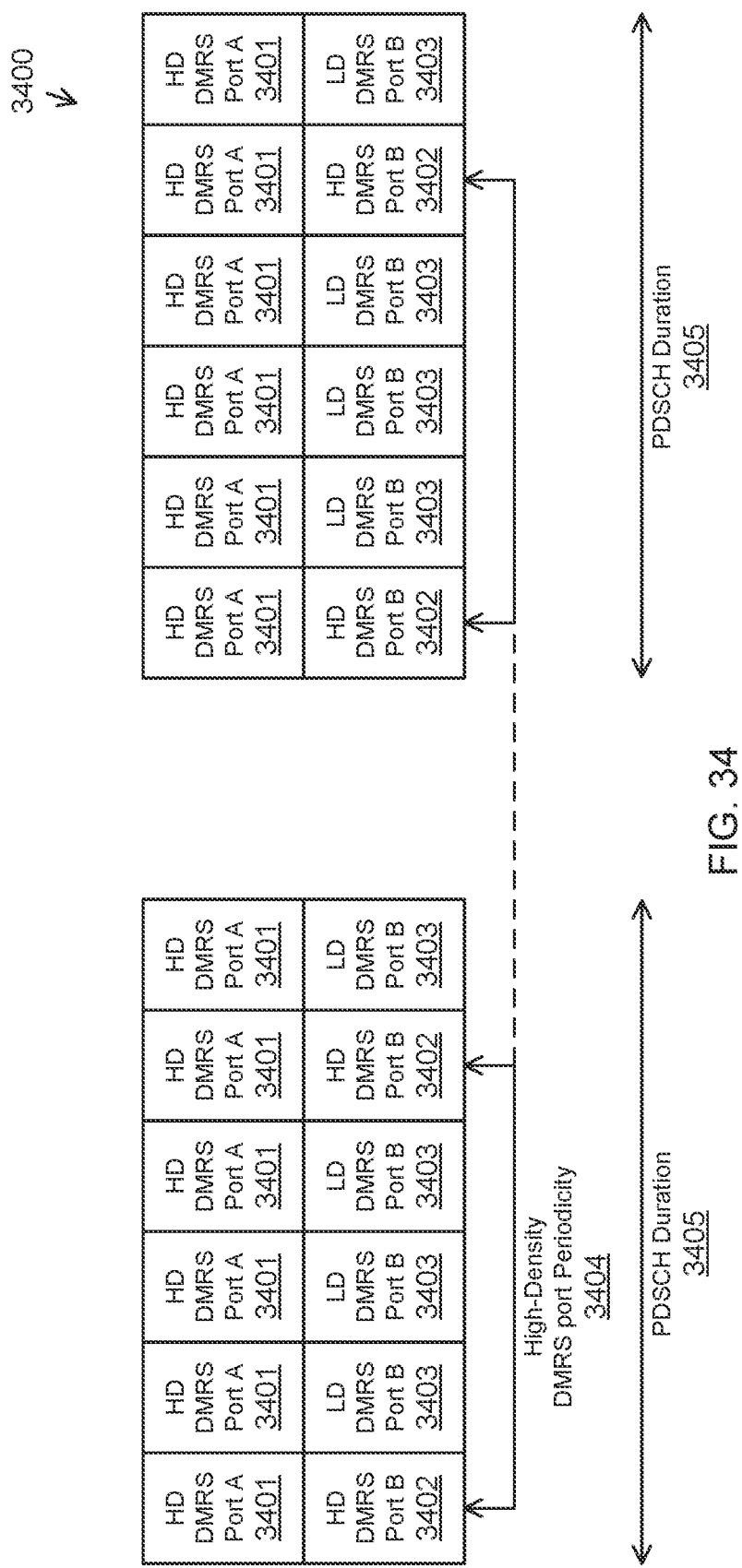
FIG. 34 illustrates an example of RS spatial density adaptation according to various embodiments of this disclosure.

FIG. 34 illustrates an example of RS spatial density adaptation according to various embodiments of this disclosure. The embodiment of FIG. 34 is for illustration only. Other embodiments could be used without departing from the scope of this disclosure.

In 5G NR, a slot consists of 14 OFDM symbols. An example of RS spatial density adaptation is shown in FIG. 34, where the rectangles represent slots, and multiple antenna ports are used for transmissions during each slot. Within a slot, for each antenna port, a certain number of REs can contain DMRS; the ratio of that number to the total number of REs within that slot for that antenna port can represent the DMRS spatial density. In this example, for a given antenna port B, slots 3402 with a high DMRS spatial density can be configured with a certain periodicity 3404; other slots 3403 within the duration of a PDSCH transmission 3405 can be configured with a low DMRS spatial density. For another antenna port A, every slot 3401 has a high DMRS spatial density.

In one embodiment, a BS can configure a UE with a DMRS spatial density via PDCCH signaling. In another example, a BS can configure a UE with a DMRS spatial density via RRC configuration. TABLE 9 is an example of defining an IE DMRS-DownlinkConfigH to configure DMRS with a high spatial density. In this example, for each antenna port, highDensity determines whether a high spatial density is utilized. If a high spatial density is utilized for a given antenna port, then the corresponding DMRS pattern can be configured to be periodic, semi-persistent, or aperiodic. A distinct high spatial density can be defined for each antenna port via timeFreqAllocation, where DMRS-Sym represents a tuple of (OFDM symbol index, frequency density) values; one tuple is specified for each OFDM symbol in a slot. Similarly, an IE DMRS-DownlinkConfigL can be defined to configure DMRS with a low spatial density. These IEs can facilitate switching between DMRS patterns with high and low spatial densities for a given antenna port in consecutive slots. For example, for a given antenna port, if a DMRS pattern with a high spatial density is configured to be periodic, then a UE can expect to receive that pattern in certain slots. In other slots for a given antenna port within the duration of a PDSCH transmission, a UE can expect to receive a DMRS pattern with low spatial density, assuming that pattern has been configured to be semi-persistent.

TABLE 9

An example of IE DMRS-DownlinkConfigH to configure DMRS with a high spatial density

| | |
|---|---|
| DMRS-DownlinkConfigH ::= | SEQUENCE { |
| dmrs-Type | ENUMERATED {type2} OPTIONAL, -- Need S |
| ..., | |
| highDensity | SEQUENCE  (SIZE (1..numPorts))   OF BOOLEAN |
| resourceType | SEQUENCE (SIZE (1..numPorts)) OF CHOICE |
| { | |
| aperiodic | SEQUENCE { |
| slotOffset | INTEGER (1...32) OPTIONAL, -- Need S |
| }, | |
| semi-persistent | SEQUENCE { |
| slotOffset | INTEGER (1...32) OPTIONAL, Need S |
| periodicity | INTEGER    (1...maxPeriodicity) OPTIONAL, -- Need S |
| }, | |
| periodic | SEQUENCE { |
| slotOffset | INTEGER (1...32) OPTIONAL, -- Need S |
| periodicity | INTEGER    (1...maxPeriodicity) OPTIONAL, -- Need S |
| } | |
| }, | |
| timeFreqAllocation | SEQUENCE (SIZE (1..numPorts)) OF |

TABLE 9-continued

An example of IE DMRS-DownlinkConfigH to configure DMRS with a high spatial density

```
DMRS-Slot,
DMRS-Slot ::=           SEQUENCE    (SIZE (1..numSymInSlot))    OF
    DMRS-Sym
DMRS-Sym ::=            SEQUENCE {
    SymIndex                INTEGER (1..32) OPTIONAL, -- NEED S
    FreqDensity             INTEGER    (1..numHighDensity)    OPTIONAL, -- NEED S
    }
}
```

In another embodiment, a BS can configure a UE with a CSI-RS spatial density via RRC configuration. TABLE 10 is an example of modifying an IE CSI-RS-ResourceMapping to configure the spatial density of CSI-RS. In this example, densityH and densityL represent pre-defined spatial density values (in addition to the values of 0.5, 1, and 3 that have already been defined in this IE); one spatial density value is specified for each antenna port. This IE can facilitate switching between CSI-RS patterns with high and low spatial densities for a given antenna port in consecutive slots, as the information is contained in an IE NZP-CSI-RS-Resource. An NZP-CSI-RS-Resource IE can configure a CSI-RS pattern to be periodic, semi-persistent, or aperiodic. For example, for a given antenna port, if a CSI-RS pattern with high spatial density is configured to be periodic, then a UE can expect to receive that pattern in certain slots. In other slots, for a given antenna port, a UE can expect to receive a CSI-RS pattern with low spatial density, assuming that pattern has been configured to be semi-persistent.

In another embodiment, a BS can configure a UE with DMRS spatial density hopping via RRC configuration. TABLE 11 is an example of defining IEs DMRS-DownlinkConfigH and DMRS-DownlinkConfigL to configure DMRS spatial density hopping. For DMRS-DownlinkConfigH, portHopping, if present, determines whether a particular high-density DMRS pattern hops within a slot or between slots; portHoppingOffset, if present, determines the hopping pattern of this high-density DMRS pattern across the available antenna ports. For DMRS-DownlinkConfigL, useDensityHHopping and useDensityHHoppingOffset, if present, are set to the same value as portHopping and portHoppingOffset, respectively, in DMRS-DownlinkConfigH. If a hopping pattern of a high-density DMRS pattern is enabled, then the UE can use this hopping pattern to determine the DMRS density for a particular antenna port for a particular slot.

TABLE 10

An example of IE CSI-RS-ResourceMapping modification to configure CSI-RS spatial density

```
CSI-RS-ResourceMapping ::=      SEQUENCE {
    frequencyDomainAllocation       CHOICE {
        row1                            BIT STRING (SIZE (4)),
        row2                            BIT STRING (SIZE (12)),
        row4                            BIT STRING (SIZE (3)),
        other                           BIT STRING (SIZE (6)),
    },
    portEnable                      SEQUENCE    (SIZE (1..numPorts))    OF
        BOOLEAN,
    firstOFDMSymbolInTimeDomain     INTEGER (0..13),
    firstOFDMSymbolInTimeDomain2    INTEGER (2..12) OPTIONAL, -- Need R
    cdm-Type                        ENUMERATED { noCDM, fd-CDM2, cdm4-FD2-
        TD2, cdm8-FD2-TD4},
    csi-rsDensity                   SEQUENCE    (SIZE (1..numPorts))    OF
        CHOICE {
        dot5                            ENUMERATED (evenPRBs, oddPRBs) ,
        one                             NULL,
        three                           NULL,
        densityH                        NULL,
        densityL                        NULL,
        spare                           NULL
    },
    ...
}
```

TABLE 11

An example of IE DMRS-DownlinkConfig modification to configure DMRS spatial density hopping

```
DMRS-DownlinkConfigH ::=      SEQUENCE {
  dmrs-Type                    ENUMERATED (type2) OPTIONAL, -- Need S
  ...,
  portHopping                  ENUMERATED (intraSlot, interSlot) OPTIONAL,
    -- Need
  portHoppingOffset            SEQUENCE  (SIZE (1..numHops))  OF  INTEGER
    (1..numPorts) OPTIONAL, -- Need M
  timeFreqAllocation ::=       SEQUENCE (SIZE (1..numSymInSlot)) OF
    DMRS-Sym
  DMRS-Sym ::=                 SEQUENCE {
    SymIndex                       INTEGER (1..32) OPTIONAL, -- Need
      S
    FreqDensity                    INTEGER    (1..numHighDensity)
      OPTIONAL, -- Need S
  }
}
DMRS-DownlinkConfigL ::=     SEQUENCE {
  dmrs-Type                   ENUMERATED (type2) OPTIONAL, -- Need S
  ...,
  useDensityHHopping          ENUMERATED   {intraSlot,   interSlot}
    OPTIONAL, -- Need S
  useDensityHHoppingOffset -- Need M
    (1..numPorts) OPTIONAL,   SEQUENCE (SIZE (1..numHops) ) OF INTEGER
  timeFreqAllocation ::=      SEQUENCE  (SIZE (1..numSymInSlot))  OF
    DMRS-Sym
  DMRS-Sym : :=               SEQUENCE {
    SymIndex                      INTEGER (1..32) OPTIONAL, -- Need
      S
    FreqDensity                   INTEGER    (1..numHighDensity)
      OPTIONAL, -- Need S
  }
}
```

In another embodiment, a BS can configure a UE with CSI-RS spatial density hopping via RRC configuration. TABLE 12 is an example of defining IEs CSI-RS-ResourceMappingH and CSI-RS-ResourceMappingL to configure CSI-RS spatial density hopping. For CSI-RS-ResourceMappingH, portHopping, if present, determines whether a particular high-density CSI-RS pattern hops within a slot or between slots; portHoppingOffset, if present, determines the hopping pattern of this high-density CSI-RS pattern across the available antenna ports. For CSI-RS-ResourceMappingL, useDensityHHopping and useDensityHHoppingOffset, if present, are set to the same value as portHopping and portHoppingOffset in CSI-RS-ResourceMappingH, respectively. If a hopping pattern of a high-density CSI-RS pattern is enabled, then the UE can use this hopping pattern to determine the CSI-RS density for a particular antenna port for a particular slot.

TABLE 12

An example of IE CSI-RS-ResourceMapping modification to configure CSI-RS spatial density hopping

```
CSI-RS-ResourceMappingH ::=    SEQUENCE {
  frequencyDomainAllocation     CHOICE {
    row1                          BIT STRING (SIZE (4)) ,
    row2                          BIT STRING (SIZE (12)) ,
    row4                          BIT STRING (SIZE (3)) ,
    other                         BIT STRING (SIZE (6))
  },
  portHopping                   ENUMERATED (intraSlot, interSlot) OPTIONAL,
    -- Need S
  portHoppingOffset SEQUENCE     (SIZE (1..numHops))    OF    INTEGER
    (1..numPorts) OPTIONAL, -- Need M
  ...
}
CSI-RS-ResourceMappingL ::=    SEQUENCE {
  frequencyDomainAllocation     CHOICE {
    row1                          BIT STRING (SIZE (4)) ,
    row2                          BIT STRING (SIZE (12)) ,
    row4                          BIT STRING (SIZE (3)) ,
    other                         BIT STRING (SIZE (6))
  },
  useDensityHHopping            ENUMERATED    (intraSlot,    interSlot)
    OPTIONAL, -- Need S
```

TABLE 12-continued

An example of IE CSI-RS-ResourceMapping modification to configure CSI-RS spatial density hopping

```
    useDensityHHoppingOffset      SEQUENCE (SIZE (1..numHops)) OF INTEGER
        (1..numPorts) OPTIONAL, -- Need M
    ...
}
```

As another example, a BS can configure a UE to (at least temporarily) disable DMRS for certain antenna ports for subsequent slots. TABLE 13 is an example of modifying an IE DMRS-DownlinkConfig to disable DMRS for certain antenna ports for subsequent slots. In another example, a new DCI format can be defined to support DMRS spatial disabling. For this DCI format, the CRC can be scrambled by the C-RNTI of this UE. This DCI format can consist of a set of tuples (DMRS spatial disabling indication, antenna port index) for this UE, where one tuple is included for each antenna port.

TABLE 13

An example of IE DMRS-DownlinkConfig modification to support DMRS spatial disabling

```
DMRS-DownlinkConfig ::=   SEQUENCE {
    dmrs-Type             ENUMERATED (type2) OPTIONAL, -- Need S
    dmrs-AdditionalPosition  ENUMERATED (pos0, pos1, pos3) OPTIONAL,
        -- Need S
    maxLength             ENUMERATED (len2) OPTIONAL, -- Need S
    scramblingID0         INTEGER (0..65535) OPTIONAL, -- Need S
    scramblingID1         INTEGER (0..65535) OPTIONAL, -- Need S
    phaseTrackingRS       SetupRelease { PTRS-DownlinkConfig }
        OPTIONAL, -- Need M
    ...,
    dmrsDisable           SEQUENCE    (SIZE (1 .. numPorts))    OF
        BOOLEAN,
}
```

In one embodiment, a new MAC CE can be defined for the BS assistance information report. This MAC CE can be identified by a MAC subheader with a logical channel ID that can be specified in Table 6.2.1-2 in [3]. This MAC CE can have a variable size and consist of the following field:
  Beamforming Information: This field indicates information that can be used by the UE to infer the channel for a particular antenna port, including:
    PMI that the BS uses for transmissions to the UE.
    BS-side mapping from (logical) antenna ports to physical antenna elements.
    BS-side spacing between physical antenna elements (e.g., in centimeters).

Figures 35, 36:
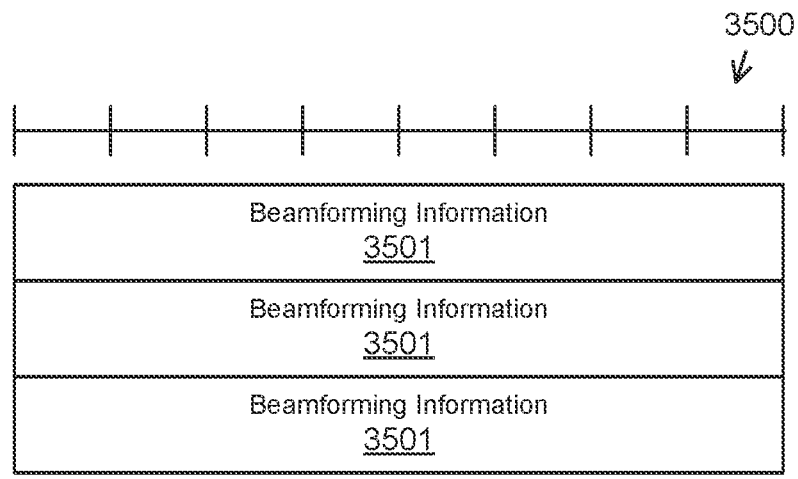
FIG. 35 illustrates an example of a new MAC CE for the BS assistance information report according to various embodiments of this disclosure.
FIG. 36 illustrates an example of a new MAC CE for the UE assistance information report according to various embodiments of this disclosure.

FIG. 35 illustrates an example of a new MAC CE for the BS assistance information report according to various embodiments of this disclosure. The embodiment of FIG. 35 is for illustration only. Other embodiments could be used without departing from the scope of this disclosure.

FIG. 35 shows an example of a new MAC CE 3500 for the BS assistance information report, where the Beamforming Information field 3501 has a length of 24 bits.

The UE assistance information report offers several advantages over relying on existing signaling. For example, a BS can use SRS to estimate the UL (and DL, depending on reciprocity) channel from a UE. However, the minimum periodicity of SRS is 2 milliseconds (ms); in contrast, the spacing between consecutive DMRS can be configured to be less than 1 ms. Thus, a UE can perform finer-grained measurements of the DL channel using received DMRS, compared to a BS measuring the UL channel using received SRS.

As another example, a UE can report local information that may not be available to a BS. A UE can use cameras therein to detect an oncoming vehicle that will cross its line-of-sight with a BS in T seconds. A UE can then report this information to a BS and make a pre-emptive recommendation for a transmission mode switch in T seconds (e.g., switching to a relatively robust mode such as transmit diversity).

In one embodiment, a new MAC CE can be defined for the UE assistance information report. This MAC CE can be identified by a MAC subheader with a logical channel ID that can be specified in Table 6.2.1-2 in [3]. This MAC CE can have a variable size and consist of the following fields:
  Block Error Rate: This field indicates the observed block error rate of the UE, e.g., the block error rate that has been computed over the last 1000 received transport blocks.
  1Throughput: This field indicates the observed throughput of the UE, e.g., the throughput in megabits/second that has been computed over the last 1000 received transport blocks.
  1UE Speed: This field indicates the UE's measurement of the UE's speed in meters/second.
  UE Acceleration: This field indicates the UE's measurement of the UE's acceleration in meters/(second*second).
  IR1: This field indicates the presence of the octet(s) containing the Recommended RS Spatial Density field. If the IR1 field is set to 1, the octet(s) containing the Recommended RS Spatial Density field is (are) present. If the IR1 field is set to 0, the octet(s) containing the Recommended RS Spatial Density field is (are) not present.
  Recommended RS Spatial Density: This field indicates, for each antenna port, the UE's recommended RS spatial density, e.g., an index to a table of RS spatial density values.

If the recommended RS spatial density is equal to 0 for a given antenna port, then this message can function as a recommendation for RS spatial disabling for that antenna port.

This field can also include a reason for the recommended RS spatial density, e.g., an index to a table of codes. For example, one code could correspond to the reason "oncoming vehicle," while another code could correspond to the reason "reported traffic accident at mile marker 30."

IR2: This field indicates the presence of the octet containing the Recommended Port field. If the IR2 field is set to 1, the octet containing the Recommended Port field is present. If the IR2 field is set to 0, the octet containing the Recommended Port field is not present.

Recommended Port: This field indicates the UE's recommended BS antenna port(s), e.g., an index (or indices) to a table of antenna ports.

This field can also include a reason for the recommended port, e.g., an index to a table of codes. For example, one code could correspond to the reason "oncoming vehicle," while another code could correspond to the reason "reported traffic accident at mile marker 30."

ABS can configure a UE with an RS spatial density threshold T, where the UE can compare the UE's recommended RS spatial density for each port with T. A UE can be configured to apply the UE's recommended RS spatial density for each port on the UE's UL transmissions—without needing to wait for a configuration message from a BS—if the UE's recommended RS spatial density for each port exceeds T.

FIG. 36 illustrates an example of a new MAC CE for the UE assistance information report according to various embodiments of this disclosure. The embodiment of FIG. 36 is for illustration only. Other embodiments could be used without departing from the scope of this disclosure.

FIG. 36 shows an example of a new MAC CE 3600 for the UE assistance information report, where the Block Error Rate field 3601, the UE Throughput field 3602, the UE Speed field 3603, and the UE Acceleration field 3604 each have a length of 8 bits. The Recommended RS Spatial Density field 3606 (dependent on IR1 field 3605) has a length of 15 bits for two antenna ports. The Recommended Port field 3608 (dependent on IR2 field 3607) has a length of 7 bits.

In one embodiment, a new MAC CE can be defined for the RS spatial high-density fallback request. This MAC CE can be identified by a MAC subheader with a logical channel ID that can be specified in Table 6.2.1-2 in [3]. This MAC CE can have a variable size and consist of the following field (with one entry for each antenna port):

DMRS Spatial High-Density Fallback: This field indicates that the UE is requesting that the BS fall back to a DMRS spatial high-density pattern for a given antenna port, e.g., the index of that pattern in a table of DMRS spatial density values.

Figure 37:
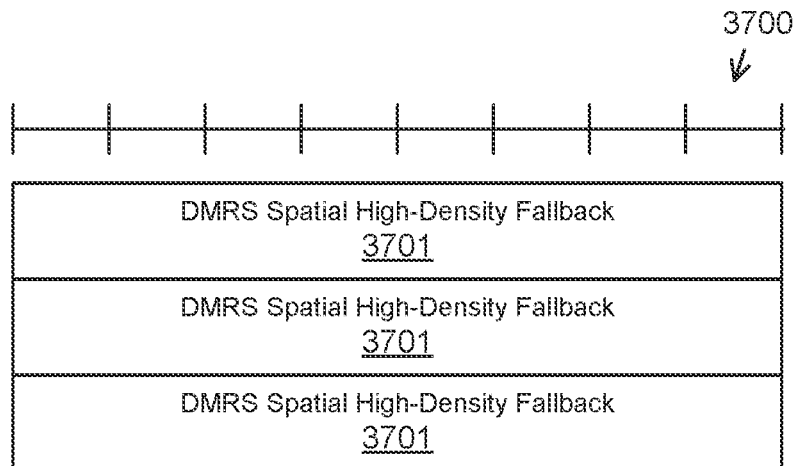
FIG. 37 illustrates an example of a new MAC CE for the RS spatial high-density fallback request according to various embodiments of this disclosure.

FIG. 37 illustrates an example of a new MAC CE for the RS spatial high-density fallback request according to various embodiments of this disclosure. The embodiment of FIG. 37 is for illustration only. Other embodiments could be used without departing from the scope of this disclosure.

FIG. 37 shows an example of a new MAC CE 3700 for the RS spatial high-density fallback request, where the DMRS Spatial High-Density Fallback field 3701 has a length of 24 bits for three antenna ports.

Figure 38:
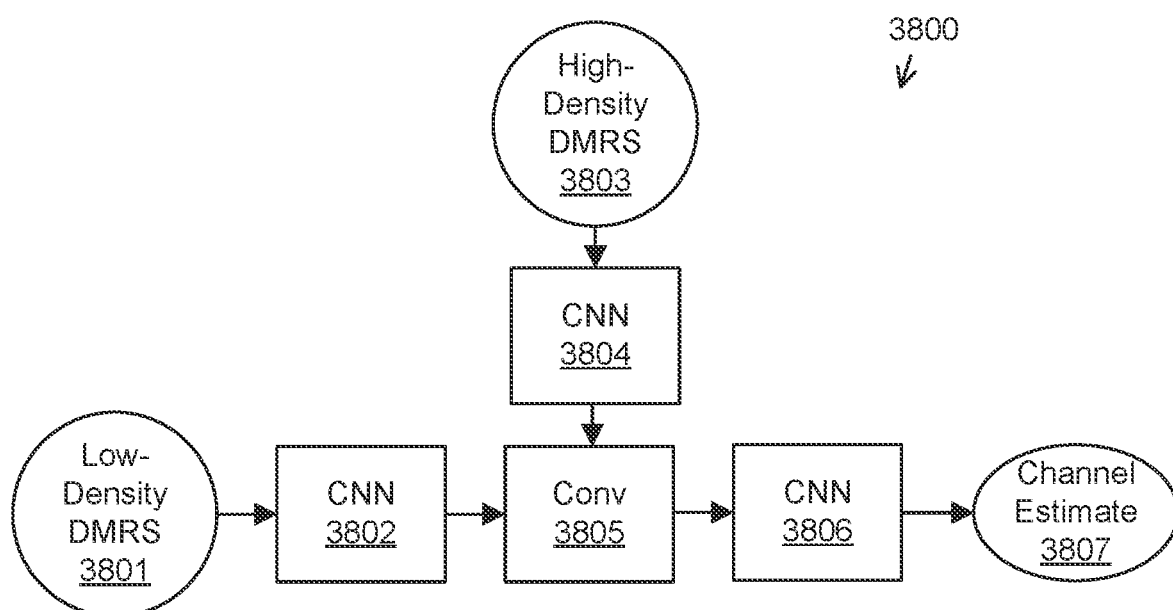
FIG. 38 illustrates an example of an AI/ML model architecture to support RS spatial density adaptation according to various embodiments of this disclosure.

FIG. 38 illustrates an example of an AI/ML model architecture to support RS spatial density adaptation according to various embodiments of this disclosure. The embodiment of FIG. 38 is for illustration only. Other embodiments could be used without departing from the scope of this disclosure.

FIG. 38 shows an example of an AI/ML model architecture 3800 that can support RS spatial density adaptation. In this example, a DMRS low-density pattern 3801 for one antenna port A is provided as input to a CNN 3802. A DMRS high-density pattern 3803 for another antenna port B, which serves as auxiliary information [6] to this model, is provided as input to another CNN 3804. The outputs of these two CNNs 3802, 3804 are then convolved (block 3805), and the output of that convolution is provided as input to another CNN 3806, which infers a channel estimate 3807 for antenna port A. For antenna ports A and B, all REs that do not contain DMRS are filled with zeros.

Examples of inputs to an AI/ML model that can support RS spatial density adaptation include:
Full two-dimensional received channel over all subcarriers and OFDM symbols for one slot and one antenna port A.
All REs that do not contain RS are filled with zeros.
Ground truth of full two-dimensional channel over all subcarriers and OFDM symbols for one slot and one antenna port A.
This can be a training label.
Auxiliary information.
Full two-dimensional received channel over all subcarriers and OFDM symbols for one slot and another antenna port B.
All REs that do not contain RS are filled with zeros.
UE speed.
UE trajectory.
UE location.
Coherence time.
Coherence bandwidth.
Delay spread.
Doppler spread.
Block error rate.
Throughput.
PMI that the BS uses for transmissions to the UE.
BS-side mapping from (logical) antenna ports to physical antenna elements.
BS-side spacing between physical antenna elements.

Examples of outputs from an AI/ML model that can support RS spatial density adaptation include:
Full two-dimensional estimated channel over all subcarriers and OFDM symbols for one slot and one antenna port A.
Value of (inferred) RS spatial density for antenna port A.

It may be advantageous to vary the density of the RS pattern based on the statistics of an underlying randomly-varying wireless channel when multi-TRP transmission is utilized. For example, if the UE moves along a straight line between two TRPs in an indoor environment, then the channels between the UE and each TRP should have similar statistics. As another example, if the UE moves along a straight line between two TRPs in a rural environment, then the channels between the UE and each TRP should have similar statistics. Decreasing the density of the RS pattern from one TRP could have a negligible effect on the CSI estimation error—while reducing the signaling overhead—as the UE could utilize the RS pattern from the other TRP to estimate its channel with the first TRP.

5G NR supports flexibility in the selection of an RS pattern, where the selection of an RS pattern is based on the statistics of the underlying randomly-varying wireless channel. For example, the parameter dmrs-AdditionalPosition can be used to increase the number of DMRS in a given slot in high-mobility scenarios. As another example, the parameters periodicityAndOffset-p and periodicityAndOffset-sp can be used to vary the periodicity (and slot offset) of SRS. The details of the algorithm for selecting an RS pattern are typically left to the network.

The present disclosure describes a framework for supporting AI/ML techniques for multi-TRP RS density adaptation based on the statistics of the underlying randomly-varying wireless channel. The corresponding signaling details are discussed in this disclosure.

This disclosure addresses the issue that multi-TRP RS density adaptation is currently left up to network implementation. This disclosure provides methods that the network can use to configure the density of multi-TRP RS using AI/ML-based solutions. This disclosure also provides a framework for adapting the density of multi-TRP RS based on UE inference and information.

Details on the support of AI/ML techniques for multi-TRP RS density adaptation are disclosed, including information elements to be exchanged between a transmitter and a receiver.

Figure 39:
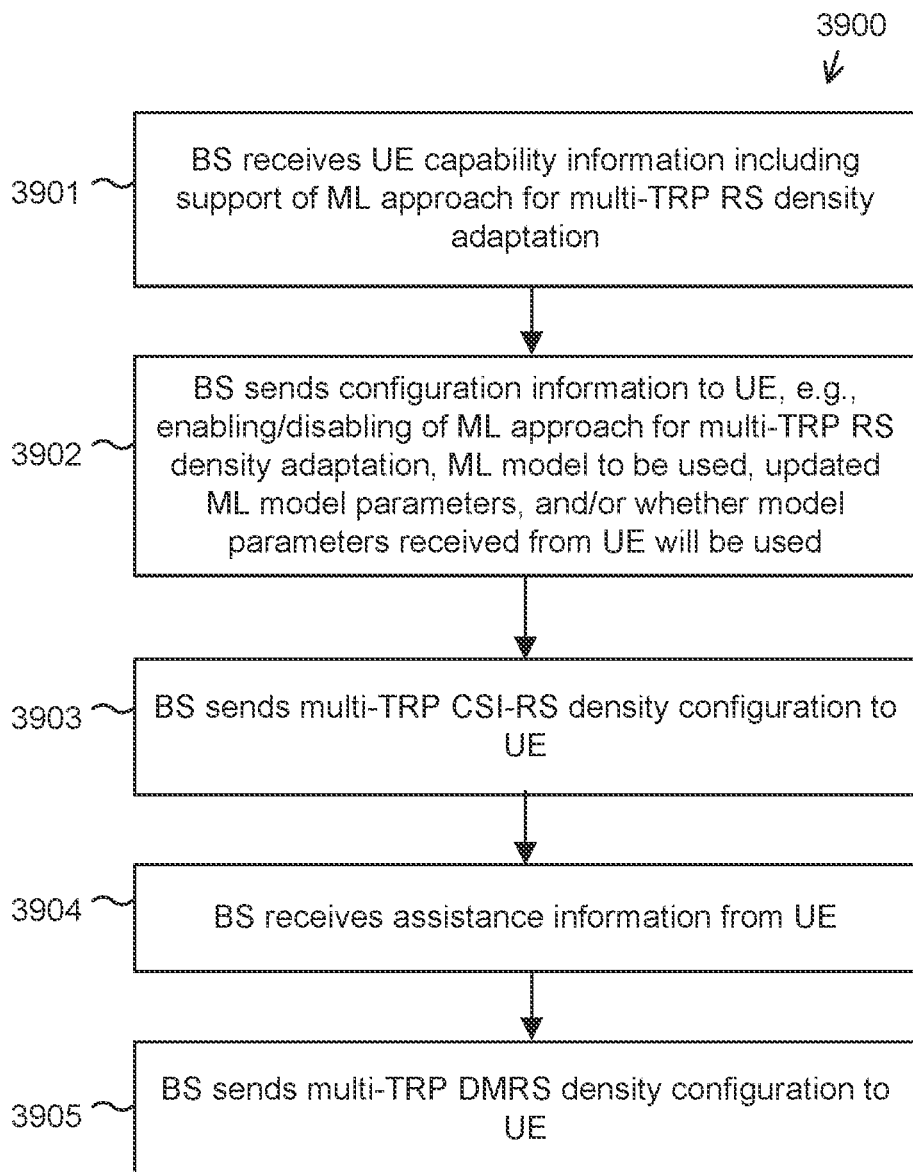
FIG. 39 illustrates a high-level flowchart for an example of BS operation to support multi-TRP RS density adaptation according to various embodiments of this disclosure.

FIG. 39 illustrates a high-level flowchart for an example of BS operation to support multi-TRP RS density adaptation according to various embodiments of this disclosure. The embodiment of FIG. 39 is for illustration only. Other embodiments of the process 3900 could be used without departing from the scope of this disclosure.

FIG. 39 is an example of a method 3900 for operations at a BS to support AI/ML techniques for multi-TRP RS density adaptation. At operation 3901, a BS receives UE capability information from a UE, including the support of an ML approach for multi-TRP RS density adaptation. At operation 3902, a BS sends configuration information to a UE, which can include ML-related configuration information such as enabling/disabling of an ML approach for multi-TRP RS density adaptation, an ML model to be used, trained model parameters, and/or whether model parameter updates reported by a UE will be used or not. At operation 3903, a BS sends a multi-TRP CSI-RS density configuration message to a UE. In one example, this message can correspond to two TRPs A and B. At operation 3904, a BS receives assistance information from a UE; the assistance information can include a measure of multi-TRP channel similarity, which will be described below. At operation 3905, a BS sends a multi-TRP DMRS density configuration message to a UE. In one example, this message can correspond to TRP B.

Figure 40:
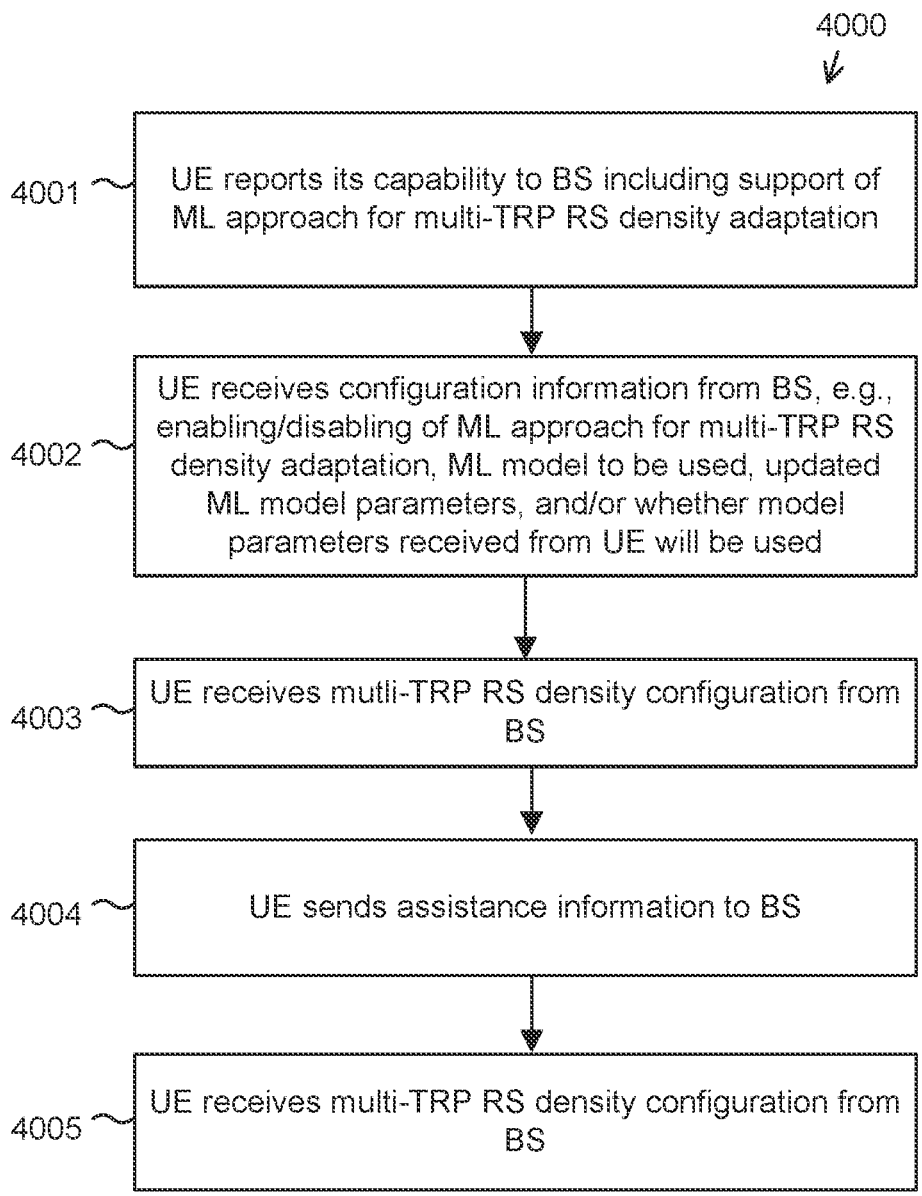
FIG. 40 illustrates a high-level flowchart for an example of UE operation to support multi-TRP RS density adaptation according to various embodiments of this disclosure.

FIG. 40 illustrates a high-level flowchart for an example of UE operation to support multi-TRP RS density adaptation according to various embodiments of this disclosure. The embodiment of FIG. 40 is for illustration only. Other embodiments of the process 4000 could be used without departing from the scope of this disclosure.

FIG. 40 is an example of a method 4000 for operations at a UE to support AI/ML techniques for multi-TRP RS density adaptation. At operation 4001, a UE reports capability information to a BS, including the support of an ML approach for multi-TRP RS density adaptation. At operation 4002, a UE receives configuration information from a BS, which can include ML-related configuration information such as enabling/disabling of an ML approach for multi-TRP RS density adaptation, an ML model to be used, trained model parameters, and/or whether model parameter updates reported by a UE will be used or not. At operation 4003, a UE receives a multi-TRP CSI-RS density configuration message from a BS. In one example, this message can correspond to two TRPs A and B. At operation 4004, a UE sends assistance information to a BS; the assistance information can include a measure of multi-TRP channel similarity, which will be described below. At operation 4005, a UE receives a multi-TRP DMRS density configuration message from a BS. In one example, this message can correspond to TRP B.

Figure 41:
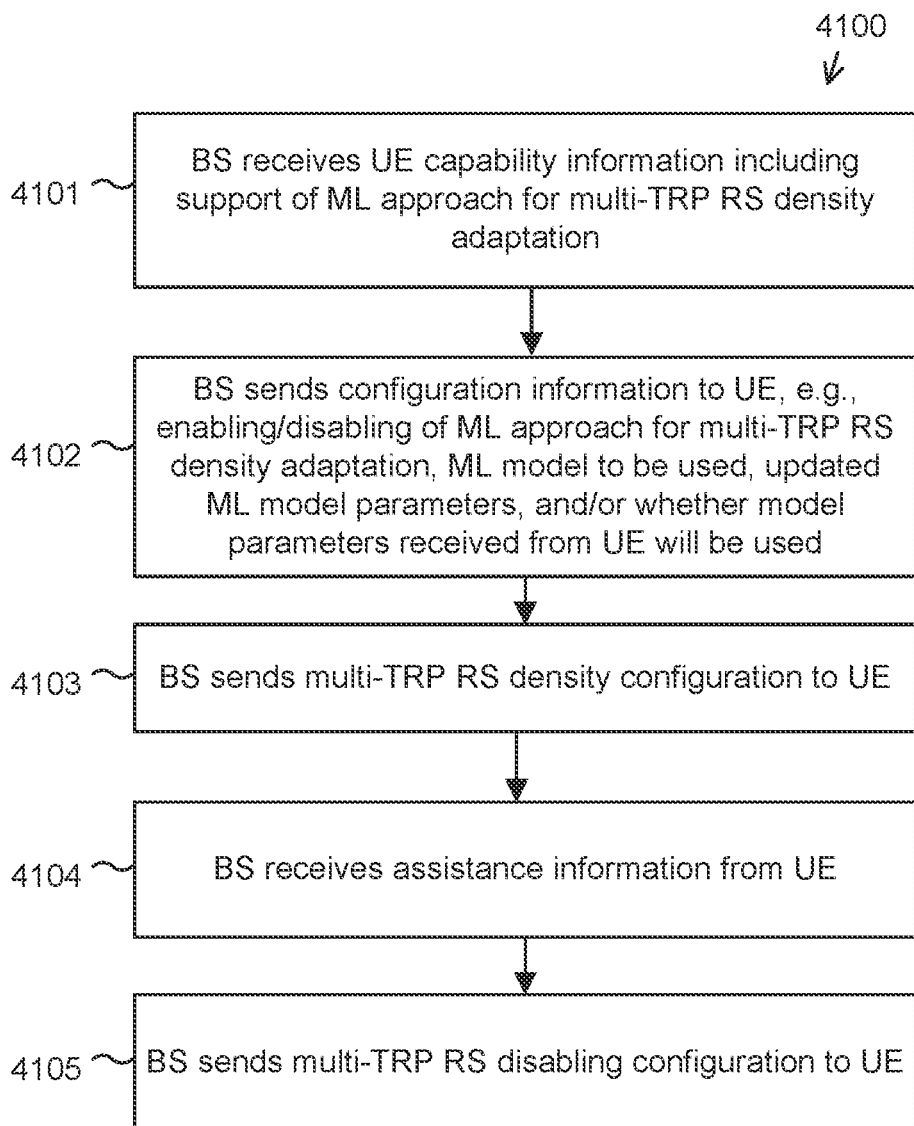
FIG. 41 illustrates a high-level flowchart for an example of BS operation to support multi-TRP RS disabling according to various embodiments of this disclosure.

FIG. 41 illustrates a high-level flowchart for an example of BS operation to support multi-TRP RS disabling according to various embodiments of this disclosure. The embodiment of FIG. 41 is for illustration only. Other embodiments of the process 4100 could be used without departing from the scope of this disclosure.

FIG. 41 is an example of a method 4100 for operations at a BS to support AI/ML techniques for multi-TRP RS disabling. At operation 4101, a BS receives UE capability information from a UE, including the support of an ML approach for multi-TRP RS density adaptation. At operation 4102, a BS sends configuration information to a UE, which can include ML-related configuration information such as enabling/disabling of an ML approach for multi-TRP RS density adaptation, an ML model to be used, trained model parameters, and/or whether model parameter updates reported by a UE will be used or not. At operation 4103, a BS sends a multi-TRP RS density configuration message to a UE. In one example, this message can correspond to two TRPs A and B. At operation 4104, a BS receives assistance information from a UE; the assistance information can include a recommendation for multi-TRP RS disabling, which will be described below. In one example, this message can correspond to TRP B. At operation 4105, a BS sends a multi-TRP RS disabling configuration message to a UE. In one example, this message can correspond to TRP B.

Figure 42:
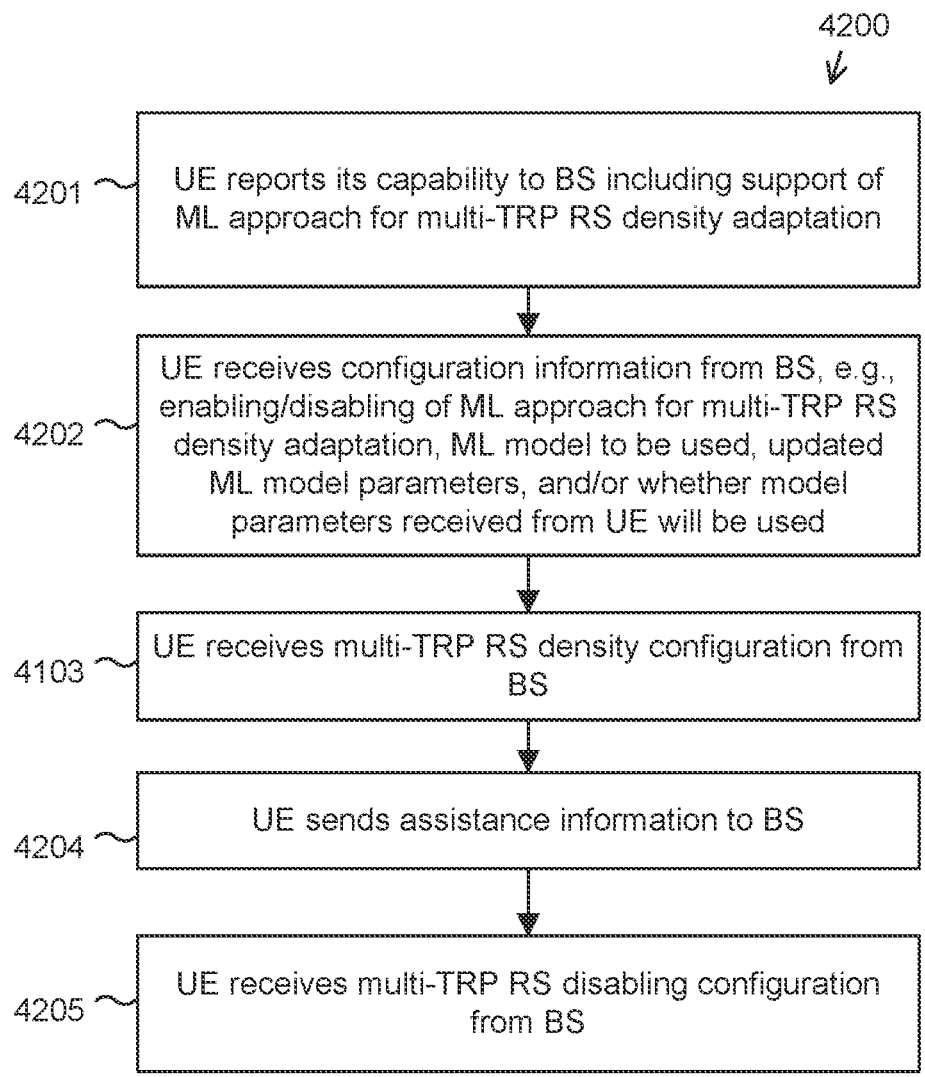
FIG. 42 illustrates a high-level flowchart for an example of UE operation to support multi-TRP RS disabling according to various embodiments of this disclosure.

FIG. 42 illustrates a high-level flowchart for an example of UE operation to support multi-TRP RS disabling according to various embodiments of this disclosure. The embodiment of FIG. 42 is for illustration only. Other embodiments of the process 4200 could be used without departing from the scope of this disclosure.

FIG. 42 is an example of a method 4200 for operations at a UE to support AI/ML techniques for multi-TRP RS disabling. At operation 4201, a UE reports capability information to a BS, including the support of an ML approach for multi-TRP RS density adaptation. At operation 4204, a UE receives configuration information from a BS, which can include ML-related configuration information such as enabling/disabling of an ML approach for multi-TRP RS density adaptation, an ML model to be used, trained model parameters, and/or whether model parameter updates reported by a UE will be used or not. At operation 4203, a UE receives a multi-TRP RS density configuration message from a BS. In one example, this message can correspond to two TRPs A and B. At operation 4204, a UE sends assistance information to a BS; the assistance information can include a recommendation for multi-TRP RS disabling, which will be described below. In one example, this message can correspond to TRP B. At operation 4205, a UE receives a multi-TRP RS disabling configuration message from a BS. In one example, this message can correspond to TRP B.

A UE can also support AI/ML techniques for inferring its channel with a TRP B, given received CSI from another TRP A, assuming that these channels have similar statistics. In one example, an AI/ML model can be trained offline with a dataset where each (training example, training label) pair maps to (CSI for TRP A, CSI for TRP B). This dataset can be collected over a range of distances between the UE and TRPs A and B. The UE can then run this AI/ML model in inference mode.

Figure 43:
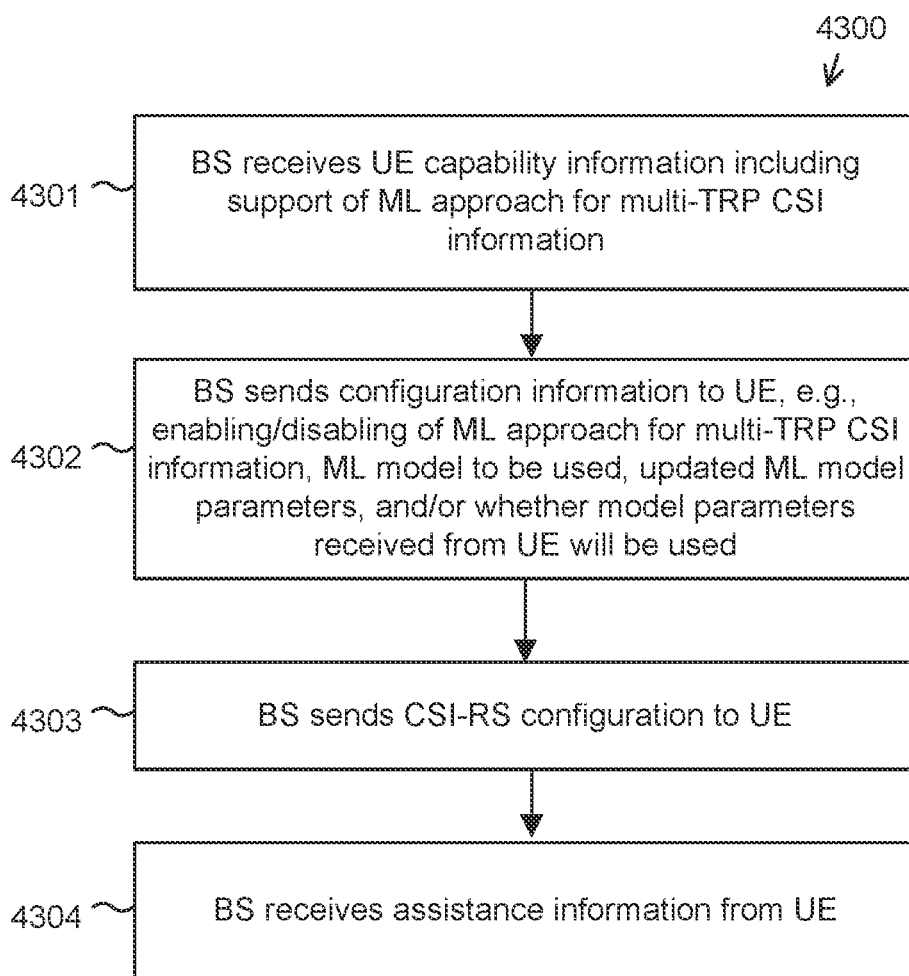
FIG. 43 illustrates a high-level flowchart for an example of BS operation to support multi-TRP CSI information according to various embodiments of this disclosure.

FIG. 43 illustrates a high-level flowchart for an example of BS operation to support multi-TRP CSI information according to various embodiments of this disclosure. The embodiment of FIG. 43 is for illustration only. Other embodiments of the process 4300 could be used without departing from the scope of this disclosure.

FIG. 43 is an example of a method 4300 for operations at a BS to support AI/ML techniques for multi-TRP CSI information. At operation 4301, a BS receives UE capability information from a UE, including the support of an ML approach for multi-TRP CSI information. At operation 4302, a BS sends configuration information to a UE, which can include ML-related configuration information such as enabling/disabling of an ML approach for multi-TRP CSI information, an ML model to be used, trained model parameters, and/or whether model parameter updates reported by a UE will be used or not. At operation 4303, a BS sends a CSI-RS configuration message to a UE. In one example, this message can correspond to a TRP A. At operation 4304, a BS receives assistance information from a UE; in one example, the assistance information can include CSI information for another TRP B, which will be described below.

Figure 44:
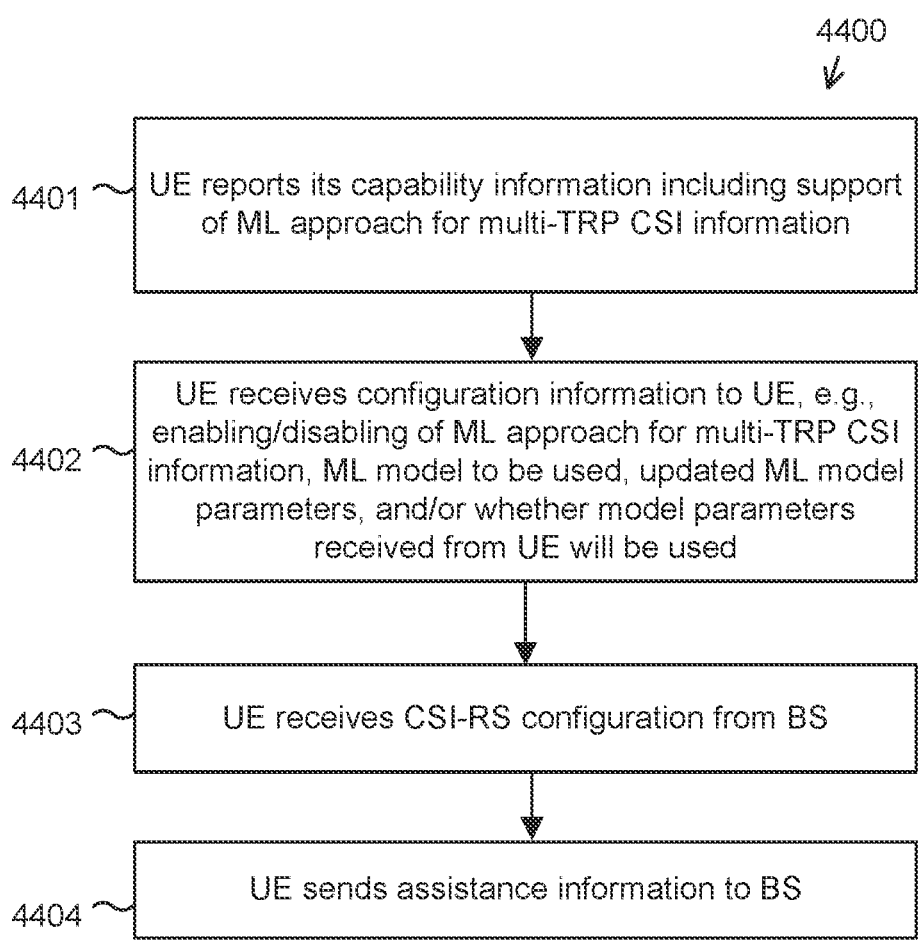
FIG. 44 illustrates a high-level flowchart for an example of UE operation to support multi-TRP CSI information according to various embodiments of this disclosure.

FIG. 44 illustrates a high-level flowchart for an example of UE operation to support multi-TRP CSI information according to various embodiments of this disclosure. The embodiment of FIG. 44 is for illustration only. Other embodiments of the process 4400 could be used without departing from the scope of this disclosure.

FIG. 44 is an example of a method 4400 for operations at a UE to support AI/ML techniques for multi-TRP CSI information. At operation 4401, a UE reports capability information to a BS, including the support of an ML approach for multi-TRP CSI information. At operation 4402, a UE receives configuration information from a BS, which can include ML-related configuration information such as enabling/disabling of an ML approach for multi-TRP CSI information, an ML model to be used, trained model parameters, and/or whether model parameter updates reported by a UE will be used or not. At operation 4403, a UE receives a CSI-RS configuration message from a BS. In one example, this message can correspond to a TRP A. At operation 4404, a UE sends assistance information to a BS; in one example, the assistance information can include CSI information for another TRP B, which will be described below.

In one embodiment, a BS can configure a UE to (at least temporarily) disable DMRS in subsequent slots for a given TRP. TABLE 14 is an example of modifying an IE DMRS-DownlinkConfig to disable DMRS in subsequent slots for a given TRP, where this IE is included in an IE PDSCH-Config that has been configured for this TRP. In another example, a new DCI format can be defined to support DMRS temporal disabling for a given TRP. This DCI format can include a TCI state that corresponds to a QCL relationship between 1) the DM-RS ports of the PDSCH for this TRP and 2) the CSI-RS ports of a given CSI-RS resource for this TRP. This DCI format can include a DMRS temporal disabling indication for a given TRP for this UE.

TABLE 14

An example of IE DMRS-DownlinkConfig modification to support DMRS temporal disabling for a TRP

| | |
|---|---|
| DMRS-DownlinkConfig ::= | SEQUENCE { |
| dmrs-Type | ENUMERATED {type2} OPTIONAL, -- Need S |
| dmrs-AdditionalPosition -- Need S | ENUMERATED {pos0, pos1, pos3} OPTIONAL, |
| maxLength | ENUMERATED {len2} OPTIONAL, -- Need S |
| scramblingID0 | INTEGER (0..65535) OPTIONAL, -- Need S |
| scramblingID1 | INTEGER (0..65535) OPTIONAL, -- Need S |
| phaseTrackingRS OPTIONAL, -- Need M | SetupRelease ( PTRS-DownlinkConfig ) |
| ..., | |
| dmrs-Disable | BOOLEAN |
| [[ | |
| dmrs-Downlink-r16 R ]] } | ENUMERATED (enabled ) OPTIONAL - Need |

The UE assistance information report offers several advantages over relying on existing signaling. For example, a BS can use SRS to estimate the UL (and DL, depending on reciprocity) channel from a UE. The minimum periodicity of SRS is 2 ms, though; in contrast, the spacing between consecutive DMRS can be configured to be less than 1 ms. Thus, a UE can perform finer-grained measurements of the DL channel using received DMRS, compared to a BS measuring the UL channel using received SRS.

As another example, a UE can report local information that may not be available to a BS. A UE can use its cameras to detect an oncoming vehicle that will cross its line-of-sight with a BS in T seconds. A UE can then report this information to a BS and make a pre-emptive recommendation for a transmission mode switch in T seconds (e.g., switching to a relatively robust mode such as transmit diversity).

In one embodiment, a new MAC CE can be defined for the UE assistance information report. This MAC CE can be identified by a MAC subheader with a logical channel ID that can be specified in Table 6.2.1-2 in [2]. This MAC CE can have a variable size and consist of the following fields:

Block Error Rate: This field indicates the observed block error rate of the UE, e.g., the block error rate that has been computed over the last 1000 received transport blocks.

Throughput: This field indicates the observed throughput of the UE, e.g., the throughput in megabits/second that has been computed over the last 1000 received transport blocks.

UE Speed: This field indicates the UE's measurement of the UE's speed in meters/second.

UE Acceleration: This field indicates the UE's measurement of the UE's acceleration in meters/(second*second).

IR1: This field indicates the presence of the octet containing the TRP Channel Similarity field. If the IR1 field is set to 1, the octet containing the TRP Channel Similarity field is present. If the IR1 field is set to 0, the octet containing the TRP Channel Similarity field is not present.

TRP Channel Similarity: This field indicates the UE's measure of the similarity between its channels with two TRPs; examples of a similarity metric include NMSE, cosine similarity, etc.

The UE can use either AI/ML methods or non-AI/ML methods to estimate its channel with both TRPs before computing this similarity metric.

IR2: This field indicates the presence of the octet containing the Recommended TRP DMRS Temporal Density field. If the IR2 field is set to 1, the octet containing the Recommended TRP DMRS Temporal Density field is present. If the IR2 field is set to 0, the octet containing the Recommended TRP DMRS Temporal Density field is not present.

Recommended TRP DMRS Temporal Density: This field indicates the UE's recommended TRP DMRS temporal density, e.g., an index to a table of DMRS temporal density values for a given TRP.

This field can also include a reason for the recommended TRP DMRS temporal density, e.g., an index to a table of codes. For example, one code could correspond to the reason "oncoming vehicle," while another code could correspond to the reason "reported traffic accident at mile marker 30."

A BS can configure a UE with a TRP DMRS temporal density threshold T, where the UE can compare its recommended DMRS temporal density for each TRP with T. A UE can be configured to apply its recommended DMRS temporal density for each TRP on the PUSCH—without needing to wait for a configuration message from a BS—if its recommended DMS temporal density for each TRP exceeds T.

Figure 45:
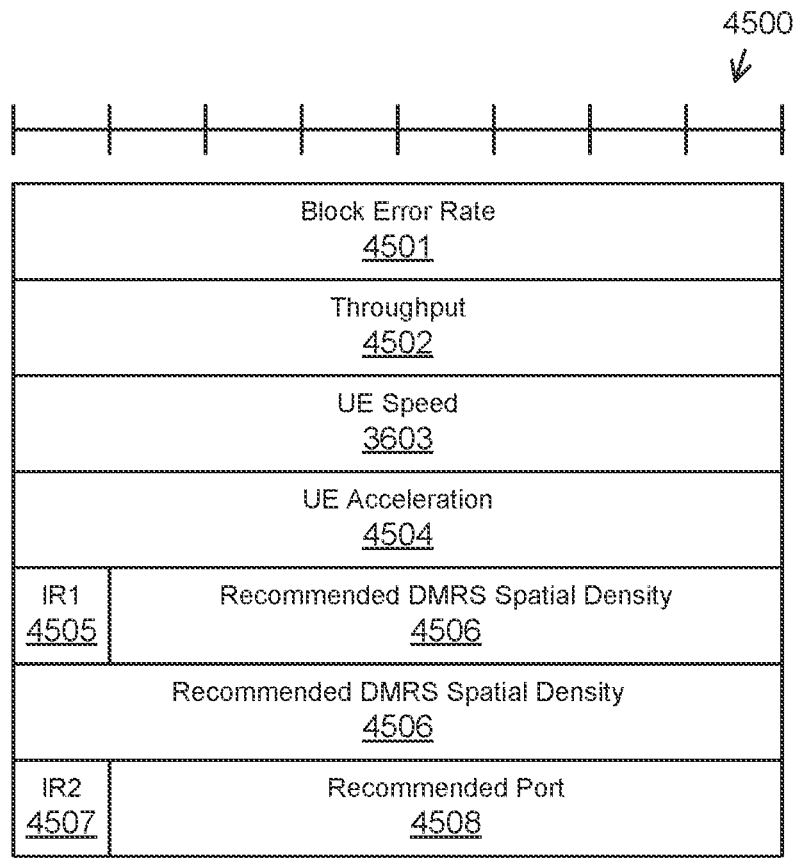
FIG. 45 illustrates an example of a new MAC CE for the UE assistance information report according to various embodiments of this disclosure.

FIG. 45 illustrates an example of a new MAC CE for the UE assistance information report according to various embodiments of this disclosure. The embodiment of FIG. 45 is for illustration only. Other embodiments could be used without departing from the scope of this disclosure.

FIG. 45 shows an example of a new MAC CE 4500 for the UE assistance information report, where the Block Error Rate field 4501, the UE Throughput 4502, the UE Speed 4503, and the UE Acceleration field 4504 each have a length of 8 bits; the TRP Channel Similarity field 4506 and the Recommended TRP DMRS Temporal Density field 4508 each have a length of 7 bits.

In another embodiment, a new MAC CE can be defined for the DMRS disabling recommendation for a given TRP. This MAC CE can be identified by a MAC subheader with a logical channel ID that can be specified in Table 6.2.1-2 in [2]. This MAC CE can have a variable size and consist of the following fields:

CSI-RS Process ID: This field indicates the ID of the CSI-RS process that corresponds to a given TRP; the CSI-RS ports of the associated CSI-RS resource have a QCL relationship with the DM-RS ports of the PDSCH for this TRP.

TCI State: This field indicates the ID of the TCI state for the QCL relationship between the CSI-RS ports of a CSI-RS resource and the DM-RS ports of the PDSCH for a given TRP.

IR: This field indicates the presence of the octet containing the CORESET Pool ID field. If the IR field is set to 1, the octet containing the CORESET Pool ID field is present. If the IR field is set to 0, the octet containing the CORESET Pool ID field is not present.

CORESET Pool ID: This field indicates the ID of the CORESET pool that corresponds to a given TRP; a CORESET pool is used to support multi-DCI-based NC-JT.

Figure 46:
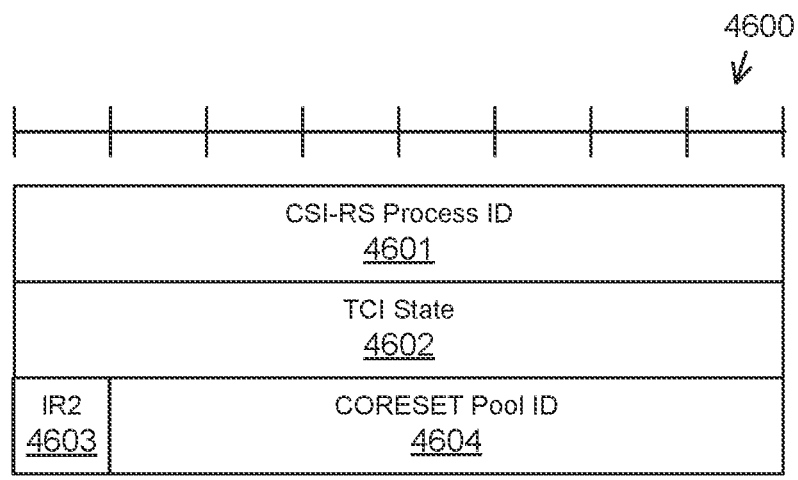
FIG. 46 illustrates an example of a new MAC CE for the DMRS disabling recommendation for a given TRP according to various embodiments of this disclosure.

FIG. 46 illustrates an example of a new MAC CE for the DMRS disabling recommendation for a given TRP according to various embodiments of this disclosure. The embodiment of FIG. 46 is for illustration only. Other embodiments could be used without departing from the scope of this disclosure.

FIG. 46 shows an example of a new MAC CE 4600 for the DMRS disabling recommendation for a given TRP, where the CSI-RS Process ID field 4601 and the TCI State field 4602 each have a length of 8 bits; the CORESET Pool ID field 4604 has a length of 7 bits.

In another embodiment, a new MAC CE can be defined for CSI information for a given TRP. This MAC CE can be identified by a MAC subheader with a logical channel ID that can be specified in Table 6.2.1-2 in [3]. This MAC CE can have a variable size and consist of the following fields:

CQI: This field indicates the value of the inferred CQI for a given TRP, e.g., an index to a table of CQIs. In one example, this value can be an inferred wideband CQI.

PMI: This field indicates the value of the inferred PMI for a given TRP, e.g., an index to a table of PMIs. In one example, this value can be an inferred wideband PMI.

Figure 47:
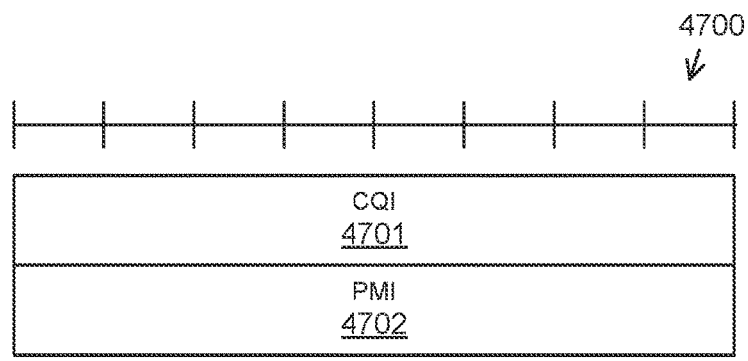
FIG. 47 illustrates an example of a new MAC CE for CSI information for a given TRP according to various embodiments of this disclosure.

FIG. 47 illustrates an example of a new MAC CE for CSI information for a given TRP according to various embodiments of this disclosure. The embodiment of FIG. 47 is for illustration only. Other embodiments could be used without departing from the scope of this disclosure.

FIG. 47 shows an example of a new MAC CE 4700 for CSI information for a given TRP, where the CQI field 4701 and the PMI field 4702 each have a length of 8 bits.

Figure 48:
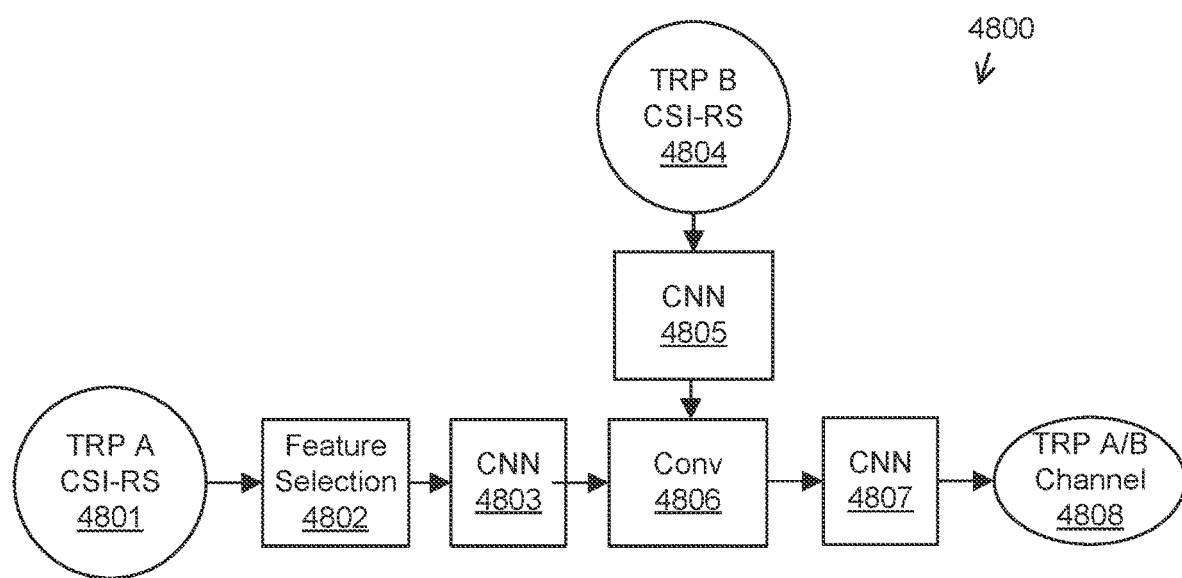
FIG. 48 illustrates an example of an AI/ML model architecture to support multi-TRP RS density adaptation according to various embodiments of this disclosure.

FIG. 48 illustrates an example of an AI/ML model architecture to support multi-TRP RS density adaptation according to various embodiments of this disclosure. The embodiment of FIG. 48 is for illustration only. Other embodiments could be used without departing from the scope of this disclosure.

FIG. 48 shows an example of an AI/ML model architecture 4800 that can support multi-TRP RS density adaptation. A standard CNN can be augmented in this example as follows:

A feature selection layer 4802 [8] can be placed before a CNN 4803 to learn a relative weighting of the different CSI-RS tones 4801 for TRP A; the learned weights can be used to infer a throughput-maximizing RS density for TRP A.

A CSI-RS pattern 4804 for another TRP B can serve as auxiliary information [6] to infer channel information for TRP A (e.g., full CSI, throughput-maximizing RS density) in a CNN 4805.

The outputs of these two CNNs 4803, 4805 are then convolved (block 4806), and the output of that convolution is provided as input to another CNN 4807, which infers a channel 4808 for TRPs A and B.

In each slot, the full two-dimensional channel over all subcarriers and OFDM symbols is provided as input to this AI/ML model architecture 4800, where all REs that do not contain CSI-RS are filled with zeros.

Examples of inputs to an AI/ML model that can support multi-TRP RS density adaptation include:

Full two-dimensional received channel over all subcarriers and OFDM symbols for one slot and one TRP A.
All REs that do not contain RS are filled with zeros.
Ground truth of full two-dimensional channel over all subcarriers and OFDM symbols for one slot and one TRP A (or another TRP B, as in operation 4404).
This can be a training label.
Auxiliary information.
Full two-dimensional received channel over all subcarriers and OFDM symbols for one slot and another TRP B.
All REs that do not contain RS are filled with zeros.
UE speed.
UE trajectory.
UE location.
Coherence time.
Coherence bandwidth.
Delay spread.
Doppler spread.
Block error rate.
Throughput.
Spatial separation between TRPs A and B.
Examples of outputs from an AI/ML model that can support multi-TRP RS density adaptation include:
Full two-dimensional estimated channel over all subcarriers and OFDM symbols for one slot and one TRP A (or another TRP B, as in operation 4404).
Value of (inferred) throughput-maximizing RS density for TRP A.

For illustrative purposes the steps of algorithms above are described serially. However, some of these steps may be performed in parallel to each other. The operation diagrams illustrate example methods that can be implemented in accordance with the principles of the present disclosure and various changes could be made to the methods illustrated in the flowcharts. For example, while shown as a series of steps, various steps in each figure could overlap, occur in parallel, occur in a different order, or occur multiple times. In another example, steps may be omitted or replaced by other steps.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method, comprising:
transmitting, to a base station (BS), information indicating capability of a UE to support machine learning (ML) adaptation of reference signal (RS) density in a domain;
receiving a first configuration information from the BS, the first configuration information indicating one or more of enabling or disabling of ML adaptation of the RS density in the domain, an ML model used for adaptation of the RS density in the domain, updated model parameters for the ML model, or whether model parameters received from the UE will be used for ML adaptation of the RS density in the domain;
receiving a second configuration information from the BS, the second configuration information indicating a first RS density in the domain;
receiving an RS with the first RS density in the domain;
transmitting, to the BS, assistance information;
in response to transmitting the assistance information, receiving, from the BS, a third configuration information indicating a second RS density in the domain, wherein the first RS density in the domain is larger than the second RS density in the domain; and
receiving an RS with the second RS density in the domain.

2. The method of claim 1, wherein the domain is one of a time domain, a frequency domain, or a spatial domain.

3. The method of claim 1, comprising:
transmitting, to the BS, a fallback request, the fallback request indicating an RS density in the domain;
receiving, from the BS, a fourth configuration indicating a third RS density in the domain; and
receiving an RS with the third RS density in the domain.

4. The method of claim 3, wherein the third RS density in the domain is larger than the second RS density in the domain.

5. The method of claim 1, comprising:
receiving an information element indicating one of an RS frequency or time density value for consecutive resources or a number of resources mapped to consecutive antenna ports configured for the RS; and
receiving an RS in one of the consecutive resources or resources mapped to consecutive antenna ports by switching between the first RS density in the domain and the second RS density in the domain, based on the information element.

6. The method of claim 1, wherein:
the assistance information comprises one or more of block error rate, UE speed, UE acceleration, or recommended RS density in the domain.

7. The method of claim 1, further comprising:
receiving, from the BS, a configuration disabling the RS density in the domain.

8. A user equipment (UE), comprising:
a processor; and
a transceiver operably coupled to the processor, the transceiver configured to:
transmit, to a base station (BS), information indicating capability of a UE to support machine learning (ML) adaptation of reference signal (RS) density in a domain,
receive a first configuration information from the BS, the first configuration information indicating one or more of enabling or disabling of ML adaptation of the RS density in the domain, an ML model used for adaptation of the RS density in the domain, updated model parameters for the ML model, or whether model parameters received from the UE will be used for ML adaptation of the RS density in the domain,
receive a second configuration information from the BS, the second configuration information indicating a first RS density in the domain,
receive an RS with the first RS density in the domain,
transmit, to the BS, assistance information;
in response to transmitting the assistance information, receive, from the BS, a third configuration information indicating a second RS density in the domain, wherein the first RS density in the domain is larger than the second RS density in the domain, and
receive an RS with the second RS density in the domain.

9. The UE of claim 8, wherein the domain is one of a time domain, a frequency domain, or a spatial domain.

10. The UE of claim 8, wherein the transceiver is further configured to:
transmit, to the BS, a fallback request, the fallback request requesting indicating an RS density in the domain, receive, from the BS, a fourth configuration indicating a third RS density in the domain, and receive an RS with the third RS density in the domain.

11. The UE of claim 10, wherein the third RS density in the domain is larger than the second RS density in the domain.

12. The UE of claim 8, wherein the transceiver is further configured to:

receive an information element indicating one of an RS frequency or time density value for consecutive resources or a number of resources mapped to consecutive antenna ports configured for the RS, and receive an RS in one of the consecutive resources or resources mapped to consecutive antenna ports by switching between the first RS density in the domain and the second RS density in the domain, based on the information element.

13. The UE of claim 8, wherein:

the assistance information comprises one or more of block error rate, UE speed, UE acceleration, or recommended RS density in the domain.

14. The UE of claim 8, wherein the transceiver is further configured to:

receive, from the BS, a configuration disabling the RS density in the domain.

15. A base station (BS), comprising:

a processor; and a transceiver operably coupled to the processor, the transceiver configured to receive, from a user equipment (UE), information indicating capability of a UE to support machine learning (ML) adaptation of reference signal (RS) density in a domain, transmit a first configuration information to the UE, the first configuration information indicating one or more of enabling or disabling of ML adaptation of the RS density in the domain, an ML model used for adaptation of the RS density in the domain, updated model parameters for the ML model, or whether model parameters received from the UE will be used for ML adaptation of the RS density in the domain, transmit a second configuration information to the UE, the second configuration information indicating a first RS density in the domain, transmit an RS with the first RS density in the domain, receive, from the UE, assistance information;

in response to receiving the assistance information, transmit, to the UE, a third configuration information indicating a second RS density in the domain, wherein the first RS density in the domain is larger than the second RS density in the domain, and transmit an RS with the second RS density in the domain.

16. The BS of claim 15, wherein the domain is one of a time domain, a frequency domain, or a spatial domain.

17. The BS of claim 15, wherein the transceiver is further configured to:

receive, from the UE, a fallback request, the fallback request requesting indicating an RS density in the domain, transmit, to the UE, a fourth configuration indicating a third RS density in the domain, and transmit an RS with the third RS density in the domain.

18. The BS of claim 17, wherein the third RS density in the domain is larger than the second RS density in the domain.

19. The BS of claim 15, wherein the transceiver is further configured to:

transmit an information element indicating one gdof an RS frequency or time density value for consecutive resources or a number of resources mapped to consecutive antenna ports configured for the RS, and transmit an RS in one of the consecutive resources or resources mapped to consecutive antenna ports by switching between the first RS density in the domain and the second RS density in the domain, based on the information element.

20. The BS of claim 15, wherein:

the assistance information comprises one or more of block error rate, UE speed, UE acceleration, or recommended RS density in the domain.

* * * * *